US008109821B2

(12) United States Patent
Kovacs et al.

(10) Patent No.: US 8,109,821 B2
(45) Date of Patent: Feb. 7, 2012

(54) GAMING SYSTEM AND METHOD WHICH ENABLES MULTIPLE PLAYERS TO SIMULTANEOUSLY PLAY MULTIPLE INDIVIDUAL GAMES OR GROUP GAMES ON A CENTRAL DISPLAY

(75) Inventors: James K. Kovacs, Reno, NV (US); Anthony J. Baerlocher, Reno, NV (US); Michael M. Oberberger, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 1162 days.

(21) Appl. No.: 11/847,957

(22) Filed: Aug. 30, 2007

(65) Prior Publication Data

US 2008/0102916 A1 May 1, 2008

Related U.S. Application Data

(60) Provisional application No. 60/825,040, filed on Sep. 8, 2006.

(51) Int. Cl.
*A63F 13/00* (2006.01)

(52) U.S. Cl. ................ 463/16; 463/17; 463/18; 463/19; 463/20; 463/40; 463/41; 463/42

(58) Field of Classification Search .............. 463/16–20, 463/40–42
See application file for complete search history.

(56) References Cited

U.S. PATENT DOCUMENTS 4,621,814 A 11/1986 Stepan et al.
4,624,459 A 11/1986 Kaufman
4,669,731 A 6/1987 Clarke
4,695,053 A 9/1987 Vazquez, Jr. et al.
4,805,907 A 2/1989 Hagiwara
4,838,552 A 6/1989 Hagiwara
4,856,787 A 8/1989 Itkis
4,991,848 A 2/1991 Greenwood et al.
5,088,737 A 2/1992 Frank et al.
5,116,055 A 5/1992 Tracy
(Continued)

FOREIGN PATENT DOCUMENTS

AU 200245837 12/2002
(Continued)

OTHER PUBLICATIONS

Derby Champion 2 Advertisement, written by Changmyung, published prior to Aug. 30, 2007.*
(Continued)

*Primary Examiner* — Dmitry Suhol
*Assistant Examiner* — David Duffy
(74) *Attorney, Agent, or Firm* — K&L Gates LLP

(57) ABSTRACT

The present disclosure provides a gaming system including a central controller, a central display which includes a plurality of display segments and a plurality player stations. The display segments are configured to each separately display one of a plurality of games, to co-act to display a plurality of games, or to co-act to display one game. Each player station is configured to enable a player to play one or more of the games displayed by the display segments. The gaming system enables a plurality of players to play a group game on the central display, a plurality of players to simultaneously play multiple group games on the central display, and a plurality of players to each simultaneously play multiple individual games on the central display.

21 Claims, 66 Drawing Sheets

U.S. PATENT DOCUMENTS

| | | | |
|---|---|---|---|
| 5,342,047 | A | 8/1994 | Heidel et al. |
| 5,344,144 | A | 9/1994 | Canon |
| 5,375,830 | A | 12/1994 | Takemoto et al. |
| 5,377,973 | A | 1/1995 | Jones et al. |
| 5,393,057 | A | 2/1995 | Marnell, II |
| 5,395,119 | A | 3/1995 | Jacob et al. |
| 5,397,125 | A | 3/1995 | Adams |
| 5,511,781 | A | 4/1996 | Wood et al. |
| 5,542,669 | A | 8/1996 | Charron et al. |
| 5,544,892 | A | 8/1996 | Breeding |
| 5,560,603 | A | 10/1996 | Seelig et al. |
| 5,580,055 | A | 12/1996 | Hagiwara |
| 5,584,764 | A | 12/1996 | Inoue |
| 5,611,535 | A | 3/1997 | Tiberio |
| 5,645,485 | A | 7/1997 | Clapper, Jr. |
| 5,664,998 | A | 9/1997 | Seelig et al. |
| 5,678,821 | A | 10/1997 | Hedman |
| 5,711,525 | A | 1/1998 | Breeding |
| D392,340 | S | 3/1998 | DeSimone |
| 5,722,891 | A | 3/1998 | Inoue |
| 5,732,950 | A | 3/1998 | Moody |
| 5,766,074 | A | 6/1998 | Cannon et al. |
| 5,769,716 | A | 6/1998 | Saffari et al. |
| 5,772,509 | A | 6/1998 | Weiss |
| 5,775,692 | A | 7/1998 | Watts et al. |
| 5,779,544 | A | 7/1998 | Seelig et al. |
| 5,788,573 | A | 8/1998 | Baerlocher et al. |
| 5,806,847 | A | 9/1998 | White et al. |
| 5,807,172 | A | 9/1998 | Piechowiak |
| 5,816,918 | A | 10/1998 | Kelly et al. |
| 5,823,873 | A | 10/1998 | Moody |
| 5,823,874 | A | 10/1998 | Adams |
| 5,830,068 | A | 11/1998 | Brenner et al. |
| 5,882,105 | A | 3/1999 | Barlow |
| 5,890,962 | A | 4/1999 | Takemoto |
| 5,902,184 | A | 5/1999 | Bennett |
| 5,910,048 | A | 6/1999 | Feinberg |
| 5,911,418 | A | 6/1999 | Adams |
| 5,934,672 | A | 8/1999 | Sines et al. |
| 5,947,820 | A | 9/1999 | Morro et al. |
| 5,951,397 | A | 9/1999 | Dickinson |
| 5,954,335 | A | 9/1999 | Moody |
| 5,967,893 | A | 10/1999 | Lawrence et al. |
| D416,054 | S | 11/1999 | McGahn et al. |
| 5,976,015 | A | 11/1999 | Seelig et al. |
| 5,976,016 | A | 11/1999 | Moody et al. |
| 5,980,384 | A | 11/1999 | Barrie |
| 5,984,310 | A | 11/1999 | English |
| 5,984,781 | A | 11/1999 | Sunaga |
| 5,993,316 | A | 11/1999 | Coyle et al. |
| 5,997,400 | A | 12/1999 | Seelig et al. |
| 5,997,401 | A | 12/1999 | Crawford |
| 6,004,207 | A | 12/1999 | Wilson, Jr. et al. |
| 6,007,066 | A | 12/1999 | Moody |
| 6,012,983 | A | 1/2000 | Walker et al. |
| 6,019,374 | A | 2/2000 | Breeding |
| 6,032,955 | A | 3/2000 | Luciano et al. |
| 6,056,642 | A | 5/2000 | Bennett |
| 6,062,980 | A | 5/2000 | Luciano |
| 6,079,712 | A | 6/2000 | Eaton et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,098,985 | A | 8/2000 | Moody |
| 6,102,400 | A | 8/2000 | Scott et al. |
| 6,105,962 | A | 8/2000 | Malavazos et al. |
| 6,110,041 | A | 8/2000 | Walker et al. |
| 6,113,098 | A | 9/2000 | Adams |
| 6,120,378 | A | 9/2000 | Moody et al. |
| 6,126,165 | A | 10/2000 | Sakamoto |
| 6,126,542 | A | 10/2000 | Fier |
| 6,129,632 | A | 10/2000 | Luciano |
| 6,135,884 | A | 10/2000 | Hedrick et al. |
| 6,142,872 | A | 11/2000 | Walker et al. |
| 6,142,874 | A | 11/2000 | Kodachi et al. |
| 6,155,925 | A | 12/2000 | Giobbi et al. |
| 6,158,741 | A | 12/2000 | Koelling |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,203,428 | B1 | 3/2001 | Giobbi et al. |
| 6,203,429 | B1 | 3/2001 | Demar et al. |
| 6,206,782 | B1 | 3/2001 | Walker et al. |
| 6,210,275 | B1 | 4/2001 | Olsen |
| 6,210,277 | B1 | 4/2001 | Stefan |
| 6,217,448 | B1 | 4/2001 | Olsen |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,241,608 | B1 | 6/2001 | Torango |
| 6,244,957 | B1 | 6/2001 | Walker et al. |
| 6,254,482 | B1 | 7/2001 | Walker et al. |
| 6,270,409 | B1 | 8/2001 | Shuster |
| 6,270,410 | B1 | 8/2001 | DeMar et al. |
| 6,270,412 | B1 | 8/2001 | Crawford et al. |
| 6,299,165 | B1 | 10/2001 | Nagano |
| 6,302,396 | B1 | 10/2001 | Eaton et al. |
| 6,302,790 | B1 | 10/2001 | Brossard |
| 6,302,791 | B1 | 10/2001 | Frohm et al. |
| 6,309,299 | B1 | 10/2001 | Weiss |
| 6,311,978 | B1 | 11/2001 | Moody |
| 6,312,331 | B1 | 11/2001 | Tamaki |
| 6,312,334 | B1 | 11/2001 | Yoseloff |
| 6,315,291 | B1 | 11/2001 | Moody |
| 6,315,662 | B1 | 11/2001 | Jorasch et al. |
| 6,334,614 | B1 | 1/2002 | Breeding |
| 6,336,862 | B1 | 1/2002 | Byrne |
| 6,358,147 | B1 | 3/2002 | Jaffe et al. |
| 6,361,441 | B1 | 3/2002 | Walker et al. |
| 6,364,313 | B1 | 4/2002 | Moody |
| 6,368,214 | B1 | 4/2002 | Luciano |
| 6,375,569 | B1 | 4/2002 | Acres |
| 6,394,899 | B1 | 5/2002 | Walker |
| 6,394,902 | B1 | 5/2002 | Glavich et al. |
| 6,398,218 | B1 | 6/2002 | Vancura |
| 6,416,408 | B2 | 7/2002 | Tracy et al. |
| 6,428,412 | B1 | 8/2002 | Anderson et al. |
| 6,435,968 | B1 | 8/2002 | Torango |
| 6,439,995 | B1 | 8/2002 | Hughs-Baird et al. |
| 6,443,452 | B1 | 9/2002 | Brune |
| 6,443,456 | B1 | 9/2002 | Gajor |
| 6,450,884 | B1 | 9/2002 | Seelig et al. |
| 6,461,241 | B1 | 10/2002 | Webb et al. |
| 6,491,584 | B2 | 12/2002 | Graham et al. |
| 6,503,145 | B1 | 1/2003 | Webb |
| 6,533,279 | B2 | 3/2003 | Moody et al. |
| 6,537,152 | B2 | 3/2003 | Seelig et al. |
| 6,550,772 | B1 | 4/2003 | Streeks et al. |
| 6,569,018 | B2 | 5/2003 | Jaffe |
| 6,592,460 | B2 | 7/2003 | Torango |
| 6,599,193 | B2 | 7/2003 | Baerlocher et al. |
| 6,609,969 | B1 | 8/2003 | Luciano et al. |
| 6,609,970 | B1 | 8/2003 | Juciano, Jr. |
| 6,634,942 | B2 | 10/2003 | Walker et al. |
| 6,648,753 | B1 | 11/2003 | Tracy et al. |
| 6,652,377 | B1 | 11/2003 | Moody |
| 6,652,378 | B2 | 11/2003 | Cannon et al. |
| 6,656,040 | B1 | 12/2003 | Brosnan et al. |
| 6,656,043 | B2 | 12/2003 | Seelig et al. |
| 6,682,073 | B2 | 1/2004 | Bryant et al. |
| 6,682,419 | B2 | 1/2004 | Webb et al. |
| 6,682,420 | B2 | 1/2004 | Webb et al. |
| 6,695,696 | B1 | 2/2004 | Kaminkow |
| 6,712,695 | B2 | 3/2004 | Mothwurf et al. |

6,712,699 B2 3/2004 Walker et al.
6,726,563 B1 4/2004 Baerlocher et al.
6,733,389 B2 5/2004 Webb et al.
6,733,390 B2 5/2004 Walker et al.
6,739,970 B2 5/2004 Luciano
6,764,396 B2 7/2004 Seelig et al.
6,780,111 B2 8/2004 Cannon et al.
6,786,819 B2 9/2004 Baerlocher et al.
6,796,899 B2 9/2004 Baerlocher
6,832,957 B2 12/2004 Falconer
6,837,788 B2 1/2005 Cannon
6,848,991 B2 2/2005 Kusuda
6,860,810 B2 3/2005 Cannon et al.
6,878,060 B2 4/2005 Moody
6,890,255 B2 5/2005 Jarvis et al.
6,913,532 B2 7/2005 Baerlocher et al.
6,916,245 B1 7/2005 Vancura et al.
6,923,720 B2 8/2005 Loose
6,939,224 B2 9/2005 Palmer et al.
6,955,356 B2 10/2005 Moody
6,955,600 B2 10/2005 Glavich et al.
6,964,418 B2 11/2005 Moody
6,981,917 B2 1/2006 Webb et al.
7,008,324 B1 3/2006 Johnson et al.
7,029,395 B1 4/2006 Baerlocher
7,037,190 B2 5/2006 Moody et al.
7,052,395 B2 5/2006 Glavich et al.
7,056,213 B2 6/2006 Ching et al.
7,056,214 B2 6/2006 Miereau et al.
7,066,814 B2 6/2006 Glavich et al.
7,070,501 B2 7/2006 Cormack et al.
7,070,505 B2 7/2006 Vancura et al.
7,074,127 B2 7/2006 Cuddy et al.
7,077,746 B2 7/2006 Torango
7,090,580 B2 8/2006 Rodgers et al.
7,094,148 B2 8/2006 Baerlocher et al.
7,121,942 B2 10/2006 Baerlocher
7,137,628 B2 11/2006 Moody
7,156,735 B2 1/2007 Brosnan et al.
7,156,741 B2 1/2007 Hornik et al.
7,169,046 B2 1/2007 Webb et al.
7,175,522 B2 2/2007 Hartl
7,204,757 B2 4/2007 Newton et al.
7,222,857 B2 5/2007 Moody
7,222,858 B2 5/2007 Moody
7,238,108 B2 7/2007 Webb
7,252,590 B2 8/2007 Palmer et al.
7,252,591 B2 8/2007 VanAsdale
7,300,347 B1 11/2007 Forbes
7,306,517 B1 12/2007 Forbes
7,311,598 B2 12/2007 Kaminkow et al.
7,311,604 B2 12/2007 Kaminkow et al.
7,322,887 B2 1/2008 Belger et al.
7,326,115 B2 2/2008 Baerlocher
7,329,179 B2 2/2008 Baerlocher
7,331,859 B2 2/2008 Hornik et al.
2002/0086725 A1 7/2002 Fasbender et al.
2002/0137559 A1 9/2002 Baerlocher
2002/0187827 A1 12/2002 Blankstein
2003/0027623 A1 2/2003 Rose
2003/0032479 A1 2/2003 LeMay et al.
2003/0054873 A1 3/2003 Peterson
2003/0060266 A1 3/2003 Baerlocher
2003/0060269 A1 3/2003 Paulsen et al.
2003/0060281 A1 3/2003 Vancura
2003/0064784 A1 4/2003 Wells et al.
2003/0064805 A1 4/2003 Wells
2003/0069063 A1 4/2003 Bilyeu et al.
2003/0069070 A1 4/2003 Alcorn et al.
2003/0092480 A1 5/2003 White et al.
2003/0092490 A1 5/2003 Gauselmann
2003/0148804 A1 8/2003 Ikeya et al.
2003/0153383 A1 8/2003 Baerlocher et al.
2003/0162585 A1 8/2003 Bigelow, Jr. et al.
2003/0195031 A1 10/2003 O'Donovan et al.
2003/0195045 A1 10/2003 Kaminkow et al.
2004/0023708 A1 2/2004 Kaminkow et al.
2004/0029631 A1 2/2004 Duhamel
2004/0043815 A1 3/2004 Kaminkow
2004/0048649 A1 3/2004 Peterson et al.
2004/0087359 A1 5/2004 Cuddy et al.
2004/0106446 A1 6/2004 Cannon et al.
2004/0147306 A1 7/2004 Randall et al.
2004/0162129 A1 8/2004 Nelson
2004/0242315 A1 12/2004 Paulsen et al.
2005/0032566 A1 2/2005 Baerlocher et al.
2005/0054429 A1 3/2005 Baerlocher et al.
2005/0060050 A1 3/2005 Baerlocher
2005/0070353 A1 3/2005 Webb et al.
2005/0075163 A1 4/2005 Cuddy et al.
2005/0079911 A1 4/2005 Nakatsu
2005/0090306 A1 4/2005 Seelig et al.
2005/0101379 A1 5/2005 Falconer
2005/0143168 A1 6/2005 Torango
2005/0176494 A1 8/2005 Thomas
2005/0181860 A1 8/2005 Nguyen et al.
2005/0197180 A1 9/2005 Kaminkow et al.
2005/0218590 A1 10/2005 O'Halloran et al.
2005/0233794 A1 10/2005 Cannon et al.
2005/0233801 A1 10/2005 Baerlocher et al.
2005/0233803 A1 10/2005 Yang
2005/0239542 A1 10/2005 Olsen
2005/0266917 A1 12/2005 Glavich et al.
2005/0282615 A1 12/2005 Englman et al.
2005/0282629 A1 12/2005 Gagner
2005/0285337 A1 12/2005 Durham et al.
2006/0003834 A1 1/2006 Okada
2006/0009283 A1 1/2006 Englman et al.
2006/0009286 A1 1/2006 Durham et al.
2006/0014580 A1 1/2006 Hawthorn
2006/0025211 A1 2/2006 Wilday et al.
2006/0040723 A1 2/2006 Baerlocher et al.
2006/0040732 A1 2/2006 Baerlocher et al.
2006/0040733 A1 2/2006 Baerlocher et al.
2006/0040734 A1 2/2006 Baerlocher et al.
2006/0040736 A1 2/2006 Baerlocher et al.
2006/0046822 A1 3/2006 Kaminkow et al.
2006/0063585 A1 3/2006 Cuddy
2006/0068884 A1 3/2006 Baerlocher et al.
2006/0068885 A1 3/2006 Cregan et al.
2006/0069619 A1 3/2006 Walker et al.
2006/0073876 A1 4/2006 Cuddy
2006/0073897 A1 4/2006 Englman et al.
2006/0084494 A1 4/2006 Belger et al.
2006/0094495 A1 5/2006 Gelber et al.
2006/0105840 A1 5/2006 Graeve
2006/0148547 A1 7/2006 Montgomery et al.
2006/0199636 A1 9/2006 Ching et al.
2006/0199637 A1 9/2006 Ching et al.
2006/0205480 A1 9/2006 Glavich et al.
2006/0205492 A1 9/2006 Linard et al.
2006/0229122 A1 10/2006 Macke
2006/0247012 A1 11/2006 Walker et al.
2006/0287058 A1 12/2006 Resnick et al.
2007/0004489 A1 1/2007 Rodgers et al.
2007/0010316 A1 1/2007 Baerlocher et al.
2007/0021175 A1 1/2007 Rodgers et al.
2007/0021188 A1 1/2007 Rodgers et al.
2007/0021215 A1 1/2007 Russell et al.
2007/0049372 A1 3/2007 Olivas et al.
2007/0060292 A1 3/2007 Peterson
2007/0060294 A1 3/2007 Cuddy et al.
2007/0060300 A1 3/2007 Baerlocher
2007/0060316 A1 3/2007 O'Halloran
2007/0087809 A1 4/2007 Baerlocher
2007/0087823 A1 4/2007 Walker et al.
2007/0090599 A1 4/2007 Hamilton
2007/0099688 A1 5/2007 Brosnan et al.
2007/0111774 A1 5/2007 Okada
2007/0135950 A1 6/2007 Oliveras
2007/0135951 A1 6/2007 Romik et al.
2007/0149292 A1 6/2007 Kaminkow et al.
2007/0167217 A1 7/2007 Kaminkow et al.
2007/0173310 A1 7/2007 Walker et al.
2007/0270204 A1 11/2007 Palmer et al.

FOREIGN PATENT DOCUMENTS

| | | |
|---|---|---|
| CA | 2 527 416 | 5/2007 |
| EP | 0 558 307 | 2/1993 |
| EP | 0 981 119 | 2/2000 |
| EP | 0 984 407 | 3/2000 |
| EP | 1 175 928 | 1/2002 |
| EP | 1 513 114 | 3/2005 |
| EP | 1 513 116 | 3/2005 |
| EP | 1 536 388 | 6/2005 |
| EP | 1 580 701 | 9/2005 |
| EP | 1 589 501 | 10/2005 |
| EP | 1 783 707 | 5/2007 |
| EP | 1 870 861 | 12/2007 |
| GB | 970806 | 9/1964 |
| GB | 2 137 392 | 10/1984 |
| GB | 2 262 642 | 6/1993 |
| GB | 2 322 217 | 8/1998 |
| GB | 2 387 950 | 10/2003 |
| GB | 2 398 420 | 8/2004 |
| JP | 7213738 | 8/1995 |
| WO | WO 85/00910 | 2/1985 |
| WO | WO 98/00207 | 1/1998 |
| WO | WO 99/03078 | 1/1999 |
| WO | WO 00/32286 | 6/2000 |
| WO | WO 2004/095383 | 11/2004 |
| WO | WO 2005/077480 | 8/2005 |
| WO | WO 2005/083599 | 9/2005 |
| WO | WO 2005/113088 | 12/2005 |
| WO | WO 2006/014833 | 2/2006 |
| WO | WO 2006/015442 | 2/2006 |
| WO | WO 2006/017431 | 2/2006 |
| WO | WO 2006/077383 | 7/2006 |
| WO | WO 2007/142980 | 12/2007 |

OTHER PUBLICATIONS

Draw Poker (Five Play, Triple Play and Ten Play) Advertisement, written by IGT, published in 2003.*

Written Opinion of the International Searching Authority for Application No. PCT/US07/77680 mailed on Mar. 19, 2009. (5 pages).

International Search Report for Application No. I/000561 (606) on Apr. 15, 2009. (6 pages).

Written Opinion of the International Searching Authority for International Application No. PCT/US07/77680 mailed on Sep. 4, 2008.

3RV—Jackpot Party Advertisement, written by WMS Gaming, Inc., published Aug. 8, 2002.

And They're Off Advertisement, written by Project, published to Aug. 30, 2007.

Austin Powers Groooovy Baby Article, written by Strictly Slots, published in Apr. 2002.

Austin Powers Poker and Flex Play Poker Advertisement, written by IGT, published in 2001.

Baccarat Table Layout Advertisement [online] [retrieved on Feb. 20, 2008, available prior to Aug. 30, 2007]. Retrieved from the Internet at <URL: http://www.gambling-baccarat.com>.

Big Time Red, White & Blue Advertisement, written by IGT, published in 2005.

Bonus Games Advertisement, written by IGT, published in 1999.

Capital Off Track Betting Advertisement [online] [retrieved on Feb. 14, 2008, available prior to Aug. 30, 2007]. Retrieved from the Internet at <URL: http://www.capitalotb.com>.

Creepy and Kooky Article, written by Frank Legato, published by Strictly Slots in Jul. 2000.

Double Down Stud Poker—Triple Play/Five Play/Ten Play Advertisement, written by IGT, published in 2004.

ESPN Zone a Taste of ESPN—Sports Arena Advertisement [online] [retrieved on Feb. 14, 2008, available prior to Aug. 30, 2007]. Retrieved from the Internet at http://espnzone.com/sportsarena>.

Fey, Slot Machines, A Pictorial History of the First 100 Years, Liberty Belle Books, 1983, pp. 215 and 219.

Fifty Play Poker Advertisement, written by IGT, published in 2001.

Fifty Play Poker Article [online] [retrieved on Mar. 21, 2001]. Retrieved from the Internet at <URL: http://www.igt.com>.

Flex Play Poker Advertisement, written by IGT, published in 2001.

Gambling Furniture: Craps & Poker Table & Roulette Advertisement [online] [retrieved on Feb. 20, 2008, available prior to Aug. 30, 2007]. Retrieved from the Internet at <URL: http://www.gameroomantiques.com>.

Game King Series Ten Play Draw Poker Advertisement, written by IGT, published in 2001.

Game King Series Triple Play—Five Play Draw Poker Advertisement, written by IGT published in 2001.

IGT Gaming Systems Brochure, written by IGT, published in 2002.

Jackpot Party Advertisement [online] [retrieved on Mar. 21, 2001]. Retrieved from the Internet at <URL: http://www.wmsgaming.com/products/slot/jpp/index.html>.

Jackpot Party Advertisements and Articles, written by WMS Gaming, Inc., published in Mar. 1998.

Jackpot Party Video 9-Line Advertisement, written by WMS Gaming, Inc., available prior to Aug. 30, 2007.

Jeopardy Advertisements, written by IGT, published in 2000.

Jeopardy Video Slots Advertisement, written by IGT, published in 2000.

Jeopardy, MegaJackpots Advertisement, written by IGT, published in 1998.

Las Vegas Hilton Advertisement [online] [retrieved on Feb. 14, 2008, available prior to Aug. 30, 2007]. Retrieved from the Internet at http://www.lvhilton.com/casino/superbook.shtml>.

NYC Off Track Betting Advertisement [online] [retrieved on Feb. 14, 2008, available prior to Aug. 30, 2007]. Retrieved from the Internet at http://www.nycotb.com>.

Party Games Advertisement, written by Astra, published in 2003.

Remote control Definition [online] [retrieved on Feb. 14, 2008, available prior to Aug. 30, 2007]. Retrieved from the Internet at http://en.wikipedia.org>.

Slots 2003 Article, written by Melissa Raimondi, published in Jan. 2003.

Suffolk Off Track Betting Advertisement [online] [retrieved on Feb. 14, 2008, available prior to Aug. 30, 2007]. Retrieved from the Internet at http://ww.suffolkotb.com>.

Triple Play/Five Play/Ten Play Draw Poker Advertisement, written by IGT, published prior to Aug. 30, 2007.

We Make Gaming Fun! Advertisement, written by WMS Gaming Inc., available prior to Aug. 30, 2007.

Supplementary European Search Report for European Patent Application No. 07841917.3, Mailed Feb. 23, 2011 (7 pages).

* cited by examiner

GAMING SYSTEM AND METHOD WHICH ENABLES MULTIPLE PLAYERS TO SIMULTANEOUSLY PLAY MULTIPLE INDIVIDUAL GAMES OR GROUP GAMES ON A CENTRAL DISPLAY

PRIORITY CLAIM

This application is a non-provisional patent application of, claims priority to and the benefit of U.S. Provisional Patent Application Ser. No. 60/825,040, filed on Sep. 8, 2006, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming is becoming a more social and leisure activity. Individual players intending to gamble often stroll a casino floor with other people in small groups or as couples, for example, as a husband and wife. Generally, players (and their friends or spouses who may not want to gamble) prefer to maintain their social interactivity while on a casino floor. However, with casino floors becoming increasingly congested with gaming machines, tables, and record numbers of people gambling, keeping a social group intact is getting more difficult. For example, at peak times, a couple or a group of friends may wander a casino floor and search for two or more adjacent seats at a card table, at adjacent gaming machines, or at sports and horserace wagering areas. Consequently, sometimes patrons have to either separate, spend more time searching or waiting for desirable seating or leave to go to another casino to find a suitable playing area with the desired games.

Most gaming machines, card tables, and sports wagering floors are not conducive or accommodating to two or more people gaming, whether they are playing separate games or sharing decision making on a single game, and variations thereof, or sitting together and simultaneously socializing. Even if two or more adjacent seats are found at a card table or at gaming machines, they typically are not prone to be comfortable for long-term socializing, for instance, over the course of an evening or night. This is especially true for casino patrons who are less inclined to gamble and are there with friends or a spouse more for the social aspects and to participate in non-gaming activities (e.g., video and audio entertainment) or simply to watch others gamble. Many current gaming machines and casino floor layouts are poorly suited to address the increasing need to make gaming a more social activity.

Certain known gaming systems display an award on a single display device for multiple gaming machines. For example, known electronic horse racing game systems include individual terminals that enable players to wager on a horse race displayed on a large display device positioned in front of the individual terminals. Many casinos also have designated rooms with seating areas (sometimes called sports books) for a plurality of players. The rooms include large displays which display live sporting events and teller stations.

The casino enables the players to wager on various sporting events at the teller stations. In another example, progressive awards for multiple gaming machines are often displayed by a display device above the gaming machines where such awards can be won. Certain known gaming devices enable a player to play multiple games at the same time. For example, one very popular gaming machine enables a single player to play multiple poker games at the same time.

However, these known gaming machines and systems do not promote or foster socialization between players, or between players and non-players. Accordingly, there is a need for new gaming systems that provide an environment that facilitates social interactivity among patrons thereby enhancing the casino experience for gamers and non-gamers.

SUMMARY

One embodiment of the present disclosure provides a gaming system including a central controller, a central display which includes a plurality of display segments and at least one and preferably a plurality of player stations. The display segments are configured to each separately display one of a plurality of games, to co-act to display a plurality of games, or to co-act to display one game. Each player station is configured to enable a player to simultaneously play one or more of the games displayed by the display segments. The player stations are thus configured to enable a plurality of players to simultaneously play the same displayed games. The player stations specifically enable multiple players to participate in a same play of one of the games displayed by the central display or a display device and to enable multiple players to simultaneously play individual games displayed by the display segments. The games may be interactive games such as a draw poker game or may be non-interactive games such as a slot game. The games may be primary games or secondary games.

In one embodiment, the gaming system enables multiple players to simultaneously play a same game as a group. In one such embodiment, the group game is a primary game operable or initiated for a player when that player makes a wager, such that each player must make a wager to participate in a play of the group game. Upon an initial wager by one of the players for a play of the group game, the gaming system enables other players to join in or participate in the play of the group game. After the participation period ends, one or more of the display segments displays the play of the group game and the gaming system provides a same group outcome for the players who joined or participated in the play of the group game. While such primary group games operable upon wagers by the players are used herein to describe the various embodiments, it should be appreciated that one or more of the games provided by the systems and methods disclosed herein may be secondary games or other games which do not require wagers. It should also be appreciated that the gaming system enables the different players to wager different amounts on the same play of the game and pays or awards the participating players based on their respective different wagered amounts and the same group game outcome such as a same winning symbol combination.

In one embodiment, the gaming system enables each player to simultaneously wager on one or more games and then each of the games displayed on the display segments are played simultaneously. The gaming system includes a plurality of different games which are displayed by the display segments. It should be appreciated that the games may be different kinds of the same game, such as slots, or different types of games, such as slot and bingo. The gaming system includes a plurality of player stations which each include at least one input device. The gaming system provides at least one round of game play and preferably a plurality of sequentially provided rounds of play. For each round of game play, the gaming system enables a plurality of players to each wager on one, a plurality or each of the games during a first period of time or during a participation period. The gaming system indicates the participation period to the players, for example by a countdown of time. During this participation period, each of the players may wager on one, a plurality or all of the games displayed on the display segments of the central display. At the end of the participation period, the gaming system simultaneously generates and displays game outcomes for each game displayed on the display segments of the central display, regardless of whether one or more players are wagering on the games. For each participating player, the gaming system determines a game result to provide the player for each game the player participated in based on the game outcome of said game displayed by the display segment. This embodiment creates fast-paced gaming and generates excitement for the participating players. In various embodiments, the games do not need to be started at the same time, but can be started in groups or at staggered times. In other embodiments, each of the games begins play simultaneously but displays the game outcomes sequentially. Any suitable arrangement for providing the games may be implemented in accordance with the present disclosure.

In one embodiment, the gaming system includes a plurality of group games and one or more players may simultaneously participate in one or more of the plurality of group games. In one such embodiment, each of the group games is displayed by one display segment of the central display. The gaming system enables each of the multiple players to wager upon each of the displayed group games. In one such embodiment, for each of the displayed group games, upon an initial wager by one of the players for a play of that group game, the gaming system enables other players to join in or participate in that play of the group game. After the participation period ends, the display segments display the play of that group game and the gaming system provides a same group outcome for each of the players who joined or participated in the play of that group game.

In this embodiment, multiple players may wager on the same play of the same game at the same time and therefore each player who participates in a same play of the same game anticipates a same winning game outcome, creating an aura of camaraderie and a team experience. Additionally, even if a player is not participating in the same group game as a friend, the present disclosure enables players to view all of the game outcomes so they can view their friends' game results while at the same time viewing their own game results. Implementation of the present disclosure thus will tend to enhance the social aspects of gaming in a casino.

In one example embodiment, the gaming system includes five player stations or terminals and a central display having six display segments which each display a separate or individual group game. If four players are using four of the player stations at the same time, these players can play the same or different numbers of games. For example, the first player can play two games (displayed by two of the display segments), the second player can play all six games (displayed by six of the display segments), the third player can play five of the games (displayed by five of the display segments), and the fourth player can play three of the games (displayed by three of the display segments). These players are thus simultaneously participating in different group games. It should be appreciated that in certain embodiments, each of the display segments can be displaying game outcomes on that display segment on a regular basis whether or not the games on all of those display segments are being wagered on. In this example, if the second player leaves, all of the six display segments can continue to display game outcomes. Thus, it should be appreciated that the present disclosure contemplates the random generation of outcomes without wagers being played on one or more of the outcomes displayed by the display segments.

In certain embodiments, the gaming system autonomously determines game outcomes for each of the games. That is, the gaming system generates outcomes for the games without any player input. In such embodiments, if a game is a type of game that may be an interactive game, such as blackjack, the gaming system makes any required game decisions based on gaming rules. In certain embodiments, the decisions are based on optimal strategies. That is, the gaming system makes decisions for the players in a game that may be configured to require player input, thereby eliminating any determination of player control and eliminating any possible delays caused by the necessary player inputs or delays in such player inputs.

In other embodiments, as mentioned above, the gaming system includes at least one interactive group game that requires player input. The central controller and a plurality of player stations enable a plurality of players to play the interactive game as a group. The interactive group game, such as draw poker, requires player input, decision making or control to obtain a final game result or a game outcome.

In one embodiment, only one player controls an interactive group game. The central controller may determine which player controls the interactive group game in any suitable manner. For instance, in alternative embodiments, the central controller and the player stations: (a) enable the player with the highest overall wager for the interactive group game to control the interactive group game; (b) enable the players to vote to determine the player to control the interactive group game; (c) enable the player with a highest primary game score in a single round to control the interactive group bonus game; (d) enable the player with a highest primary game score in multiple rounds or during a certain time period to control the interactive group bonus game; (e) determine control of the interactive group game based on a characteristic derived from player tracking systems or cards, such as the highest ranked player; (f) enable the player who has played the longest to control the interactive group game; or (g) enable the player who wagered the most during a set period of time to control the interactive group game.

In other embodiments, the gaming system enables a plurality or all of the players participating in the interactive group game to control the game. The control may rotate among players in any suitable manner. In one embodiment, the change of control based on predetermined criteria. For example, if a player obtains a first designated game result they keep control of the group game. If the player obtains a second designated game result the play goes to a next person. The control rotates among the players in a predetermined order in one embodiment. In other embodiments, the order is random or otherwise suitably determined. For example, the player with the highest overall wager controls the game at the initiation of the game, and the gaming system enables the player located to the right of that player to subsequently control the game. The order of control of the game may be predetermined based on any suitable factor, such as by the order of the player stations. The order of control may also be randomly determined. For example, the central controller randomly determines a first player to control the interactive multi-player group game. Upon a mistake or a loss made by the first player, the central controller determines a second player to control the interactive multi-player group game. That is, the first player has control until the first player loses and then a second player controls the game. In another embodiment, the players are ranked according to wager amounts and the players control the game in order of their ranking. In one embodiment, the player who wagers the largest amount controls the game first. The player who wagers the second largest amount controls the game second. The order of player control may be determined in any suitable manner.

In other embodiments, the gaming system enables multiple players to play a same group game but can provide a plurality of the players different game outcomes. That is, the players participate in one game but either randomly receive different game outcomes or make one or more inputs which can cause different game outcomes. For example, three players play video blackjack on the central display. In one embodiment, the gaming system determines and displays a hand of cards for the dealer and determines and displays a single hand for each of the participating players. The gaming system enables each participating player to control their individual game. For example, the player may stay to accept the given cards or may hit to obtain another card. In one embodiment, each player is playing against the hand of the dealer. Each player makes a decision and receives an individual game outcome based on their final hand and the dealer's final hand. The game result (i.e., the amount of the win of zero or more) for each individual player is based on the game outcome and the player's individual wager on that play of the game. It should be appreciated that the gaming system may enable the players to obtain different outcomes from a same group game in any suitable manner.

In one embodiment, the gaming system enables multiple players to play a same group game but provides a plurality of the players different game results based on individual decisions that each player is enabled to make and on common or community possibilities. That is, the players participate in one game make an input which causes a different game result for their individual game. For example, three players play video poker on the central display. The dealer has the same initial hand for each of the players and the players have a community deal with community draws but individual holds. In one embodiment, the gaming system determines and displays a hand of cards for the dealer and determines and displays a hand for each of the participating players. In one embodiment, each of the hands is the same and each player makes an individual decision whether to hold or discard cards. If the player discards a card, in one embodiment, each player is dealt cards from the same deck. For example, player #1 discards 2 cards and is provided with a jack of hearts and a king of clubs. When player #2 discards one card, the gaming system provides player #2 with a jack of hearts. The same drawn cards are given to the players in the same order from a community draw. The gaming system then provides each of the players with their own game result based on the outcome and their wager amount. In another multi-player individual poker embodiment, each of the players receives a unique hand and is dealt different cards. For example, player #1 discards 2 cards and is provided with a jack of hearts and a king of clubs. When player #2 discards a card, the gaming system provides player #2 with a new card from the deck, such as a queen of hearts. That is, instead of each player having the same community draw, the players share one or more decks and are dealt cards accordingly as in a table game of poker. It should be appreciated that the gaming system may enable the players to obtain different outcomes from a same group game in any suitable manner.

It should be appreciated that these multi-player group games with different game outcomes may be displayed to the players in any suitable manner by the display segments. In one embodiment, each of the games is displayed on the central display simultaneously. In another embodiment, when a player makes a decision or upon an occurrence of a game event that game is displayed. For example, the game is a poker game with three players. In one embodiment, the dealer's hand is continually displayed on the central display. Each player separately and in turn makes a decision and is dealt cards. For example, the first player makes an input and the central display displays the first player's input and the result. After the first player finishes, the second player makes an input and the central display displays the second player's input and the result. In another embodiment, only winning game outcomes or all game outcomes are displayed on the central display and individual game results for each player are displayed to each player on that player's player station.

In other embodiments, the gaming system enables a plurality of the players to individually and simultaneously play a single game on one or more display segments of the central display. In one embodiment, the gaming system includes multiple player stations and enables at least one player to play at each player station. Upon player initiation of one of the player stations, the central display and the player station indicate to the player the associated display segment. The gaming system enables the player to play a game displayed on the associated display segment and provides the player an individual game outcome.

In other embodiments, the gaming system enables each of the players to select the game to play and to select the associated display segment for the play of the game. For example, for each player, the gaming system enables the player to individually place a wager at a player station for a play of a game. The central controller and the player station enable the player to make an input at the player station to select a game to play from a plurality of games. The central controller and the player station additionally enable the player to make an input at the player station to select an available display segment of the central display for a play of the selected game. The central display and the player station indicate to the player the selected display segment which displays the selected game. The gaming system enables the player to play the game and provides the player a game outcome.

In other embodiments, the gaming system enables the player to select the game to play and determines and associates a display segment with the selected game. For example, the gaming system enables the player to place a wager at the player station for a play of a game. The central controller and the player station enable the player to make an input at the player station to select a game to play from a plurality of games. In various embodiments, the display segments associated with a player or a player station are dependent on a factor such as: (a) a player's single wager; (b) a player's wager over a predetermined amount of time; (c) a player's game score; (d) a player's game scores over a predetermined amount of time; (e) a characteristic derived from a player tracking system, such as the highest ranked player; (f) length of game play; or (g) any other suitable factor or characteristic. In one embodiment, the central display and the player station associate a display segment with the game and the central display indicates to the player the associated display segment which displays the selected game. The gaming system may indicate to the player the associated display segment through any suitable method.

In another embodiment, each display segment is associated with a separate and independent game. In one embodiment, the central controller, the player station and the central display enable the player to select the game to play (from the plurality of possible games) by selecting the display segment. That is, by selecting a display segment, the player is selecting which of the games to play. In one such embodiment, an individual outcome is generated for each of the games that the player is individually playing.

In one embodiment, each display segment is associated with a separate and independent game and the gaming system provides the player with secondary awards or outcomes based on a game factor such as the number of total games played or the average number of display segments played at one time or the wagers made upon each game. That is, playing the games of the central display provides players an additional incentive or chance for a prize in addition to the outcome of the game. For example, for each game played on the central display, the player receives a single point, symbol or icon which is independent from the game's outcome. The gaming system or establishment has an award structure for the points or icons. For example, the player who collects the most "gaming wall points" in a day wins a prize or an award. In another example, once a player achieves a designated amount such as two hundred "gaming wall points" the player wins a prize or an award. The prize or award may be any suitable prize or award.

It should be appreciated that the points or the gaming wall points may be configured in any suitable manner. In one embodiment, a player receives one point per game played on the central display. In another embodiment, the player receives points based on the amount wagered by the player on the games of the central display. In another embodiment, the gaming system provides a player points based on a side wager or side bet made on games of the central display. In various embodiments, the player's points or icons accumulate from game to game and over a specified time period or continually.

In one embodiment, a player may only pick or select certain display segments, such as only the display segments in the first row. In one embodiment, the availability of the display segments is based on the player station. For example, a first player station is associated with a first group of display segments and a second player station is associated with a second group of display segments that may include one or more of same or different display segments as the first group of display segments. In another embodiment, the gaming system determines the game and the display segments for the player based on the amount wagered. It should be appreciated that the availability of the games and display segments provided to a player may be determined in any suitable manner.

In another embodiment, the gaming system enables a player to play a single game on multiple display segments. In one such embodiment, a plurality of the display segments display one or more elements of the game. The multi-display segment game may be triggered upon an occurrence of a suitable triggering event. For example, upon the occurrence of a triggering event, such as obtaining a bonus game in a primary game or by wagering a certain amount in the game, the gaming system associates a designated number, for example three display segments, with that player's game. In one embodiment, each of the display segments display a different element of a game. For example, for a three-reel slot game, the central controller causes the central display to display one reel on each of three display segments in a row.

In one embodiment, the gaming system enables a player to simultaneously play multiple individual games on multiple display segments. That is, the gaming system enables the player to wager on and play multiple individual games simultaneously. For example, the player may place a wager to play five of nine display segments. The central controller, central display and player station enable the player to play all of the games at the same time or substantially the same time and provide outcomes for the player for each of the games. In one embodiment, the gaming system enables the player to wager different wager amounts for the various games. In one embodiment, the gaming system enables the player to wager different amounts for different results of a same game, such as different amounts on different paylines in the same game. In one embodiment, the gaming system enables the player to wager different amounts for different games. In another embodiment, the player may only wager one amount for each of the games being played at the same time or selected for play at the same time. In one embodiment, the gaming system enables the player to wager a lower amount for multiple games than it would cost to play each of the games individually when the player wagers on multiple games. That is, the gaming system offers the player a discount for simultaneously wagering on multiple games. It should be appreciated that the gaming system may offer a player a discount on games for any suitable reason.

In another embodiment, the gaming system enables the player to play all of the display segments. In this embodiment, any suitable factor or element may enable the player to play all of the display segments, such as but not limited to: a wager amount, a triggering event, a player tracking characteristic, a point value, an award amount, an amount of time or any other suitable element.

In various embodiments, the gaming system includes or is associated with a seating area where a group of players can comfortably view the central display (including each of the individual display segments) and use player stations to wager on the games displayed by the display segments. This enables, for example, a group of friends to sit in one area over the course of several hours and engage in game play as individuals or as a group using the player stations. In other embodiments, one or more of the display segments can be controlled by the player stations. The player stations can be used to select the games to be displayed. The player stations can also be used to select non game functionality for one or more of the display segments. This arrangement also accommodates non-gaming players in the group who, in one embodiment, can use the player stations or similar control device to control audio and video entertainment, use concierge services, and to access the Internet through one more of the display segments. The number of these non-gaming display segments can be limited. Thus, in some embodiments, the present disclosure encourages the social aspects of gaming by allowing groups or couples including players and non-players to stay together while on the casino floor.

In one embodiment, the central display is a single display device. In another embodiment, each display segment of the central display includes an individual display device or an electronic gaming module. In one embodiment, a plurality of the display segments are arranged in rows and columns to form the central display. In one embodiment, the gaming system includes a plurality of central displays that may be located near the other central displays or apart from other central displays. The central displays may be connected or networked to provide gaming between the central displays. In one embodiment, each of the central displays operates independently from the other central displays. In other embodiments, the display segments are located in various locations or spread across a casino or a room. The display segments are preferably adjacent, but may alternatively be not adjacent.

The gaming system includes at least one player station. The player station may be any suitable apparatus and include any combination of components of a gaming device. In one embodiment, the player station is a player station having a suitable cabinet, display device, and input devices similar to a conventional gaming machine such as a convention video slot gaming machine. In another embodiment, a player station is in the form of a remote control or a portable unit. The remote player station may be a portable player station such as but not limited to a cellular phone, a personal digital assistant, and a wireless game player. In one embodiment, images rendered from 3-D gaming environments may be displayed on portable player stations. In one embodiment, a central controller has gaming logic for commanding the remote player station to render an image from a virtual camera in a 3-D gaming environment stored on the remote player station and to display the rendered image on a display located on the remote player station.

In one embodiment, the player station includes a user interface that enables a user to control one or more items displayed on the display segments of the central display. In one embodiment, one or more of the player stations can enable a player to select one or more aspects of the game of the central display. For example, a player station may include a touch screen display that has an arrangement or configuration similar to the display segments on the central display for the player to select games and to make game decisions wager on the players for that game. That is, in one embodiment, the player stations display a game selector or grid divided into segments that correspond to the games displayed on the central display. The player may simply touch the corresponding segment on the player station to select a game to play. In one embodiment, the grid is a default condition and the player may customize the display of the player station to display any suitable image. For example, the grid is displayed until the player selects one or more games to display on the display of the player station. Upon touching the games, the display of the player station enlarges the selected games. In one such embodiment, the player station controls the display of the central display. That is, when a player initiates a game on a player station, the player station initiates the game on the central display. In another such embodiment, the player station sends the information to a central controller which controls the display of the central display.

In one embodiment, the gaming network has a plurality of player stations with display devices and a network connecting the player stations to a gaming server computer or central controller. In one embodiment such network includes a plurality of sub-networks which control certain aspects of the gaming system. In one embodiment, the gaming system is server based and is operable to quickly change the games displayed on the central display.

It should be appreciated that the present disclosure provides a plurality of different games that players may each individually play at a same location. Gambling is a social activity where friends and spouses often like to sit near each other but frequently prefer playing different types of games and prefer playing individual games. The present disclosure enables multiple players to individually play different games at the same location and to view their friends and spouses game outcomes, creating a more interesting and exciting gaming experience.

Additional features and advantages are described herein, and will be apparent from, the following Detailed Description and the figures.

10A, 10C, 10G, 10H and 10I, illustrating the betting display of one embodiment of the present disclosure.

FIGS. 11A, 11B, 11C, 11D and 11E are perspective views of one embodiment of the disclosed gaming system that includes a plurality of player stations at a table and a central display, wherein the gaming system enables players to select one or more games, select a wager denomination for the games and to place a wager on the games and to play the games when an assigned game number is played on the central display.

Figure 12A:
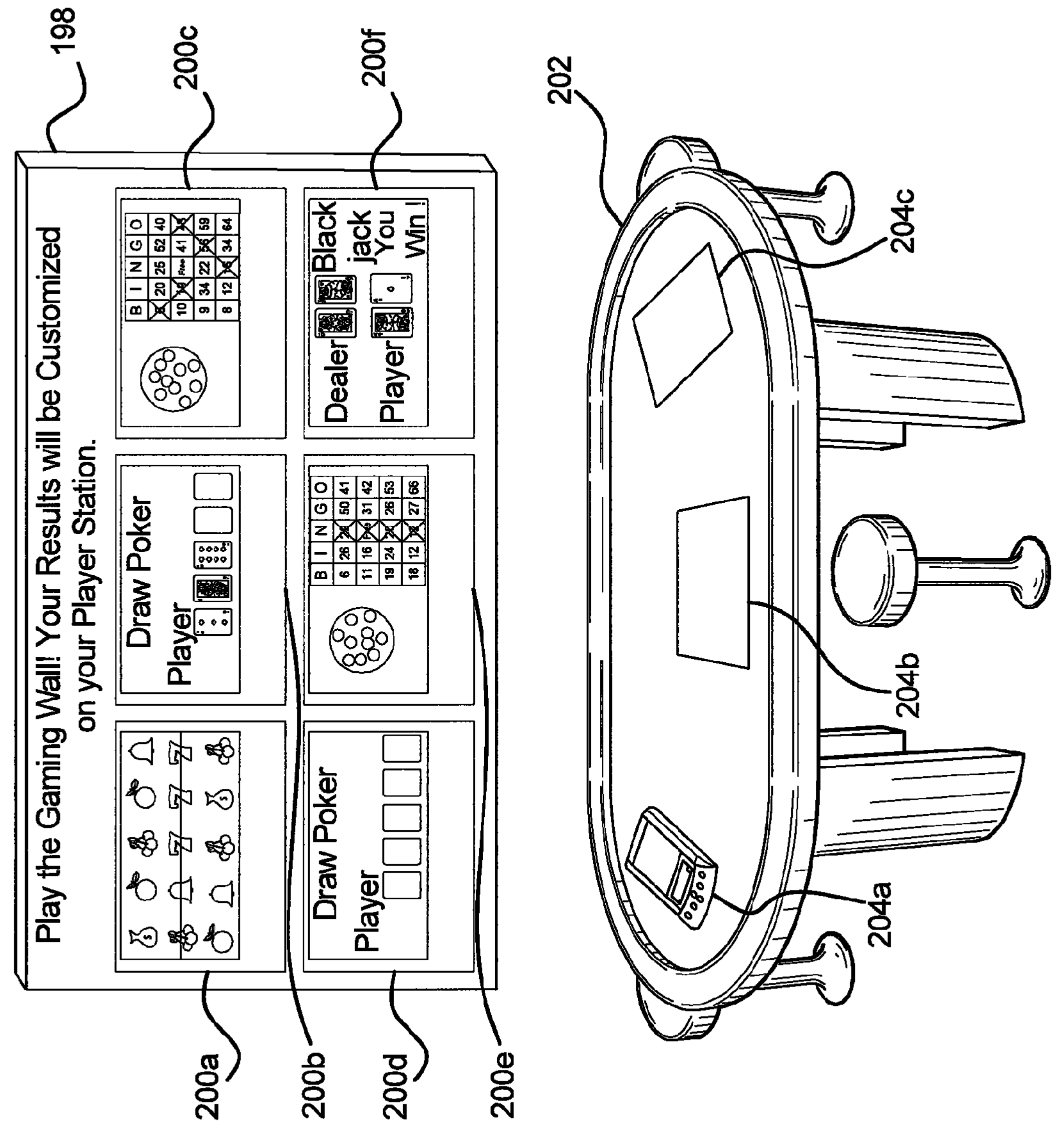
Figure 12B:
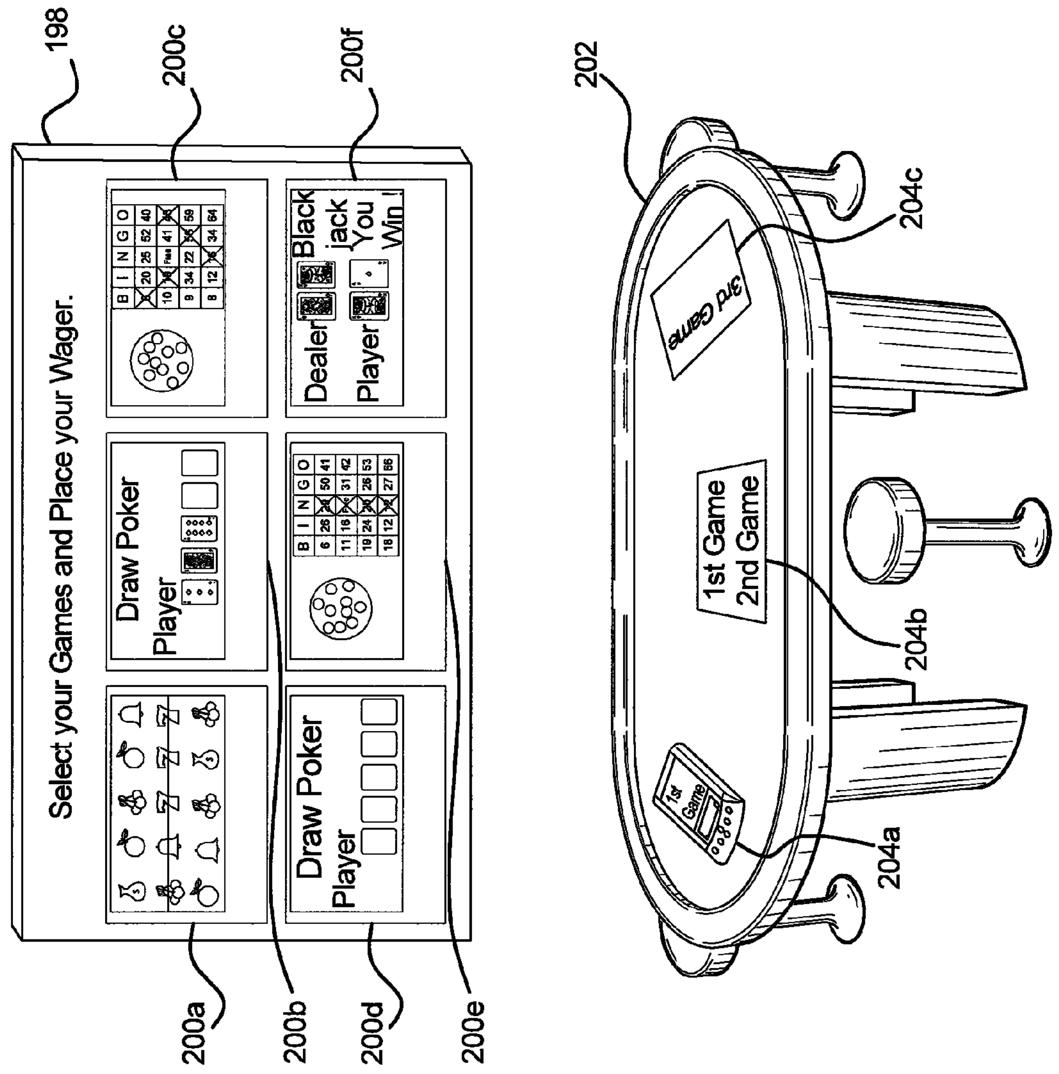
Figure 12C:
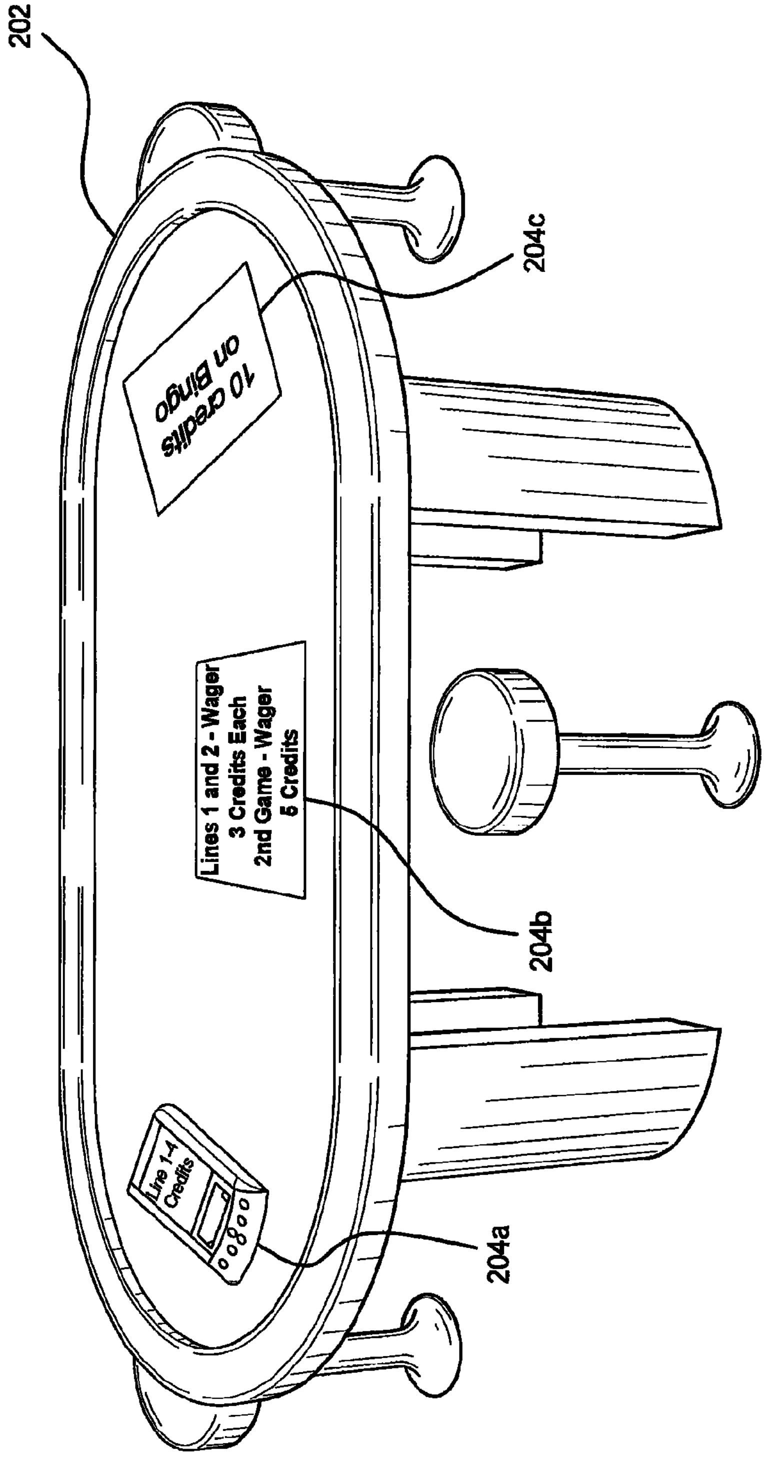
Figure 12D:
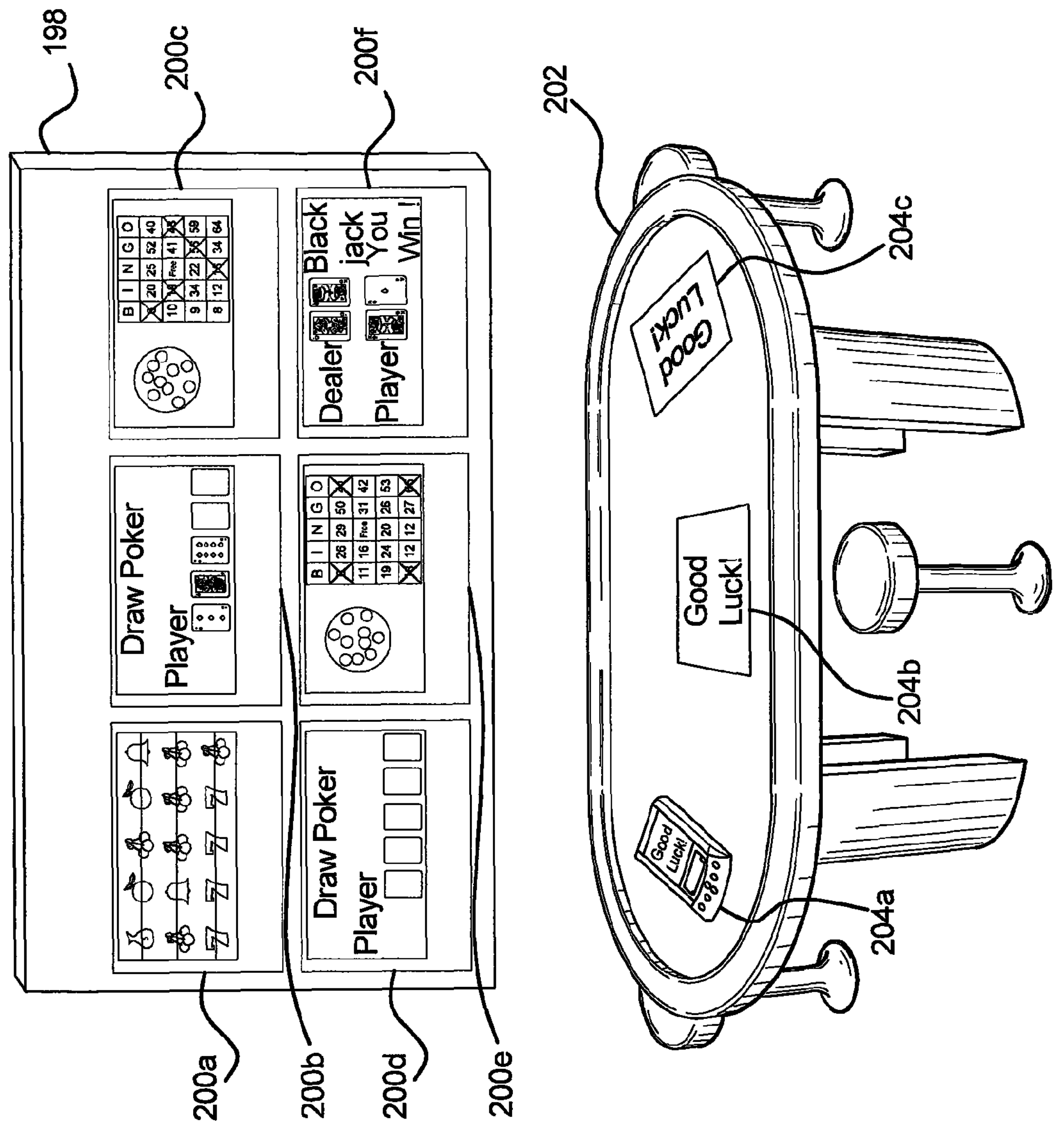

FIGS. 12A, 12B, and 12D are perspective views of one embodiment which includes a central display and a table including a plurality of different types of player stations wherein the outcomes displayed to the players on the player stations are customizable.

Figure 12E:
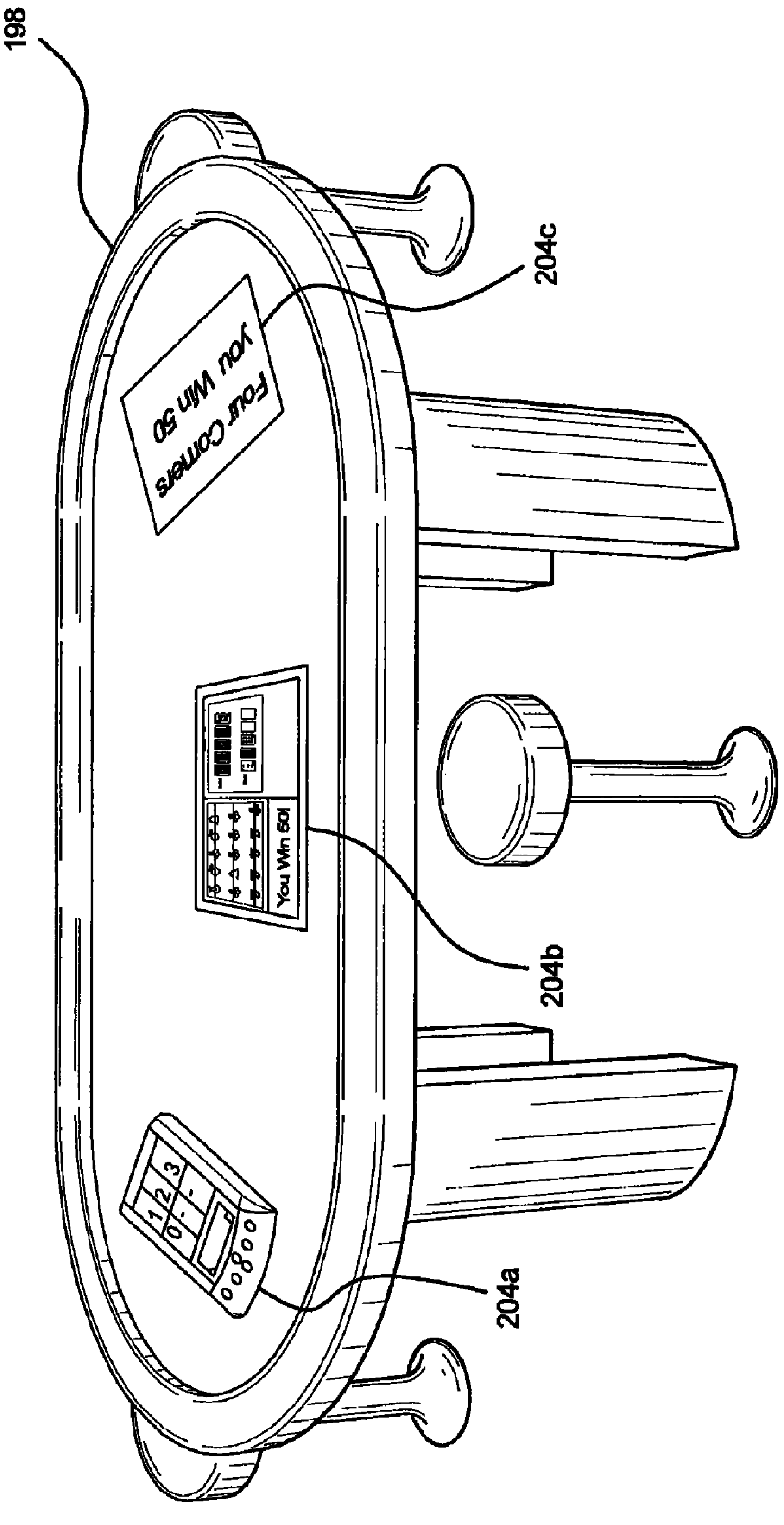

FIGS. 12C and 12E are enlarged perspective views of the player stations of FIGS. 12A, 12B, and 12D of one embodiment of the present disclosure.

FIGS. 13A, 13B, 13C, 13D and 13E are perspective views of one embodiment which includes a central display that includes a plurality of video display segments and a plurality of mechanical display segments.

FIGS. 14A, 14B, 14D and 14E are perspective views of one embodiment of the disclosed gaming system that includes a plurality of player stations at a table and a central display, wherein the gaming system enables players to participate in the displayed games for a participation period and after a participation period ends, the gaming system simultaneously generates and displays a game outcome for each of the displayed games and displays individual player results at the player stations.

Figure 14A:
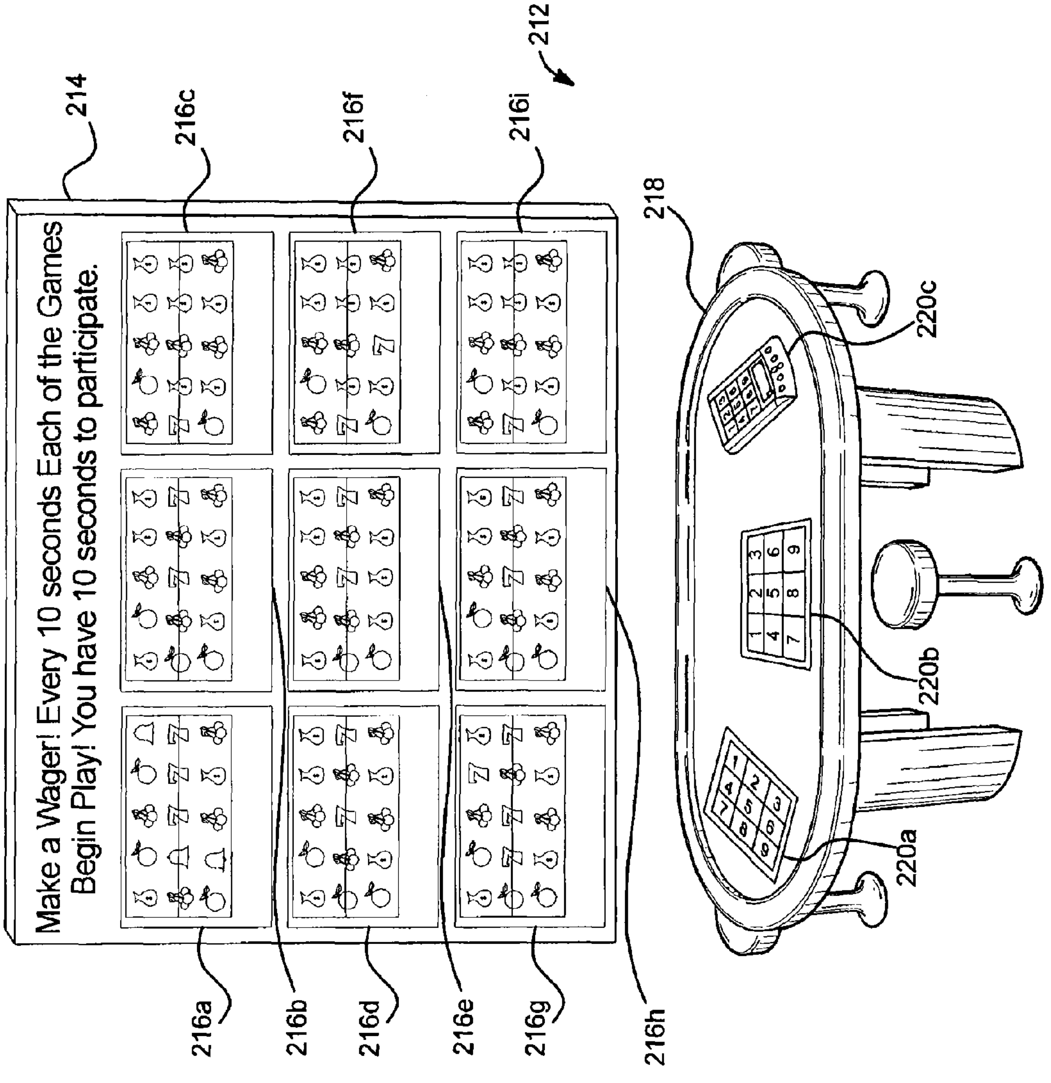
Figure 14B:
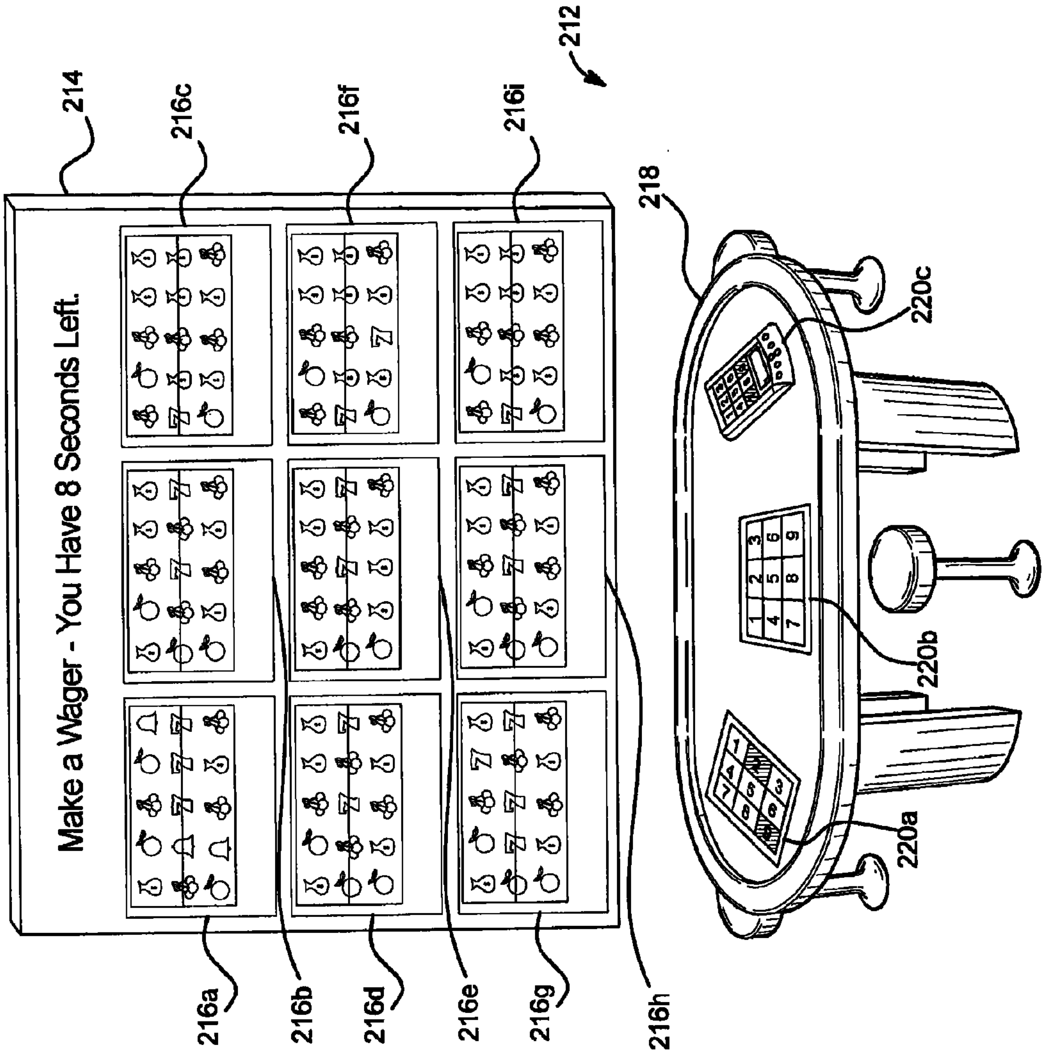
Figure 14C:
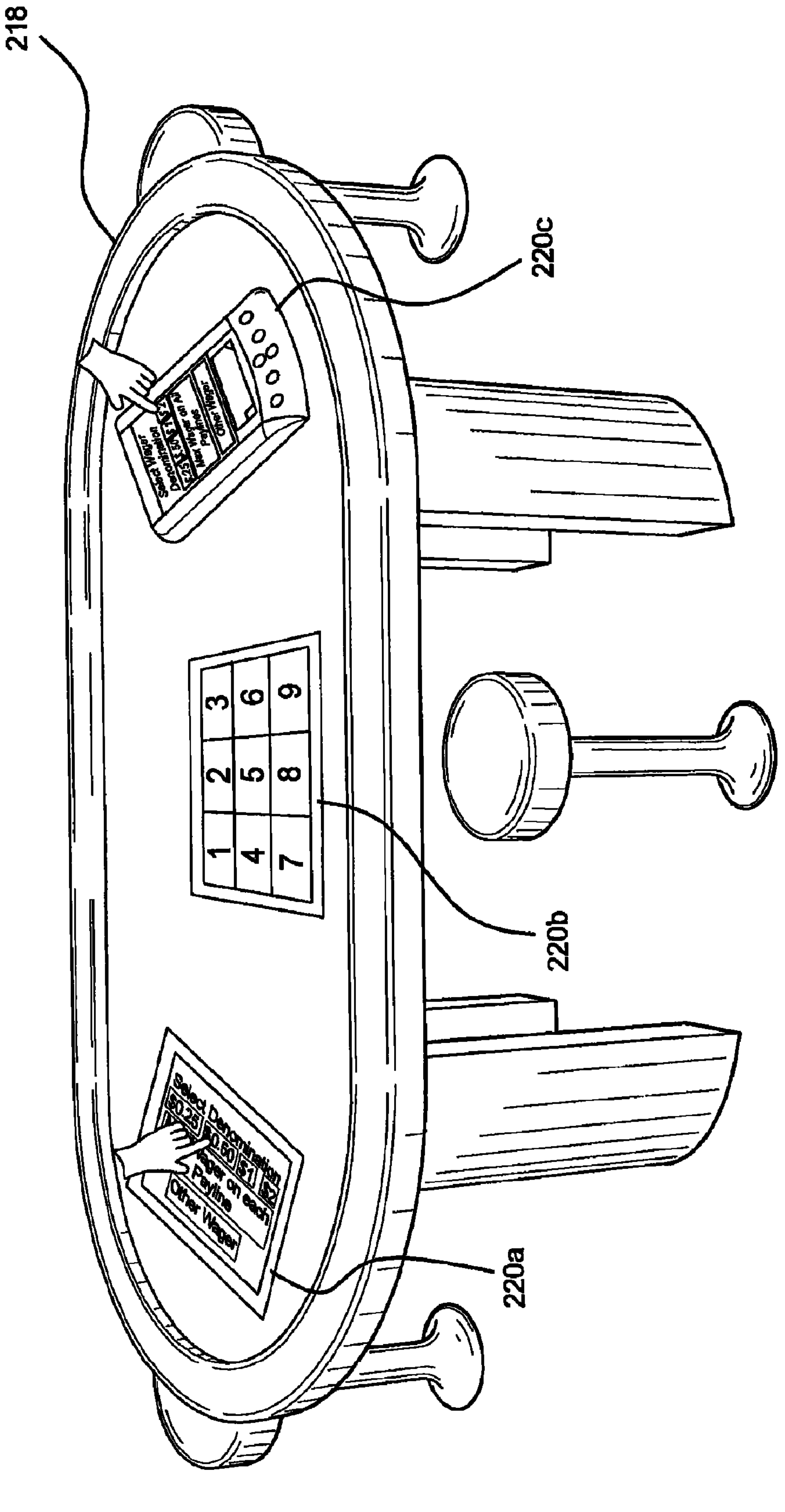
Figure 14D:
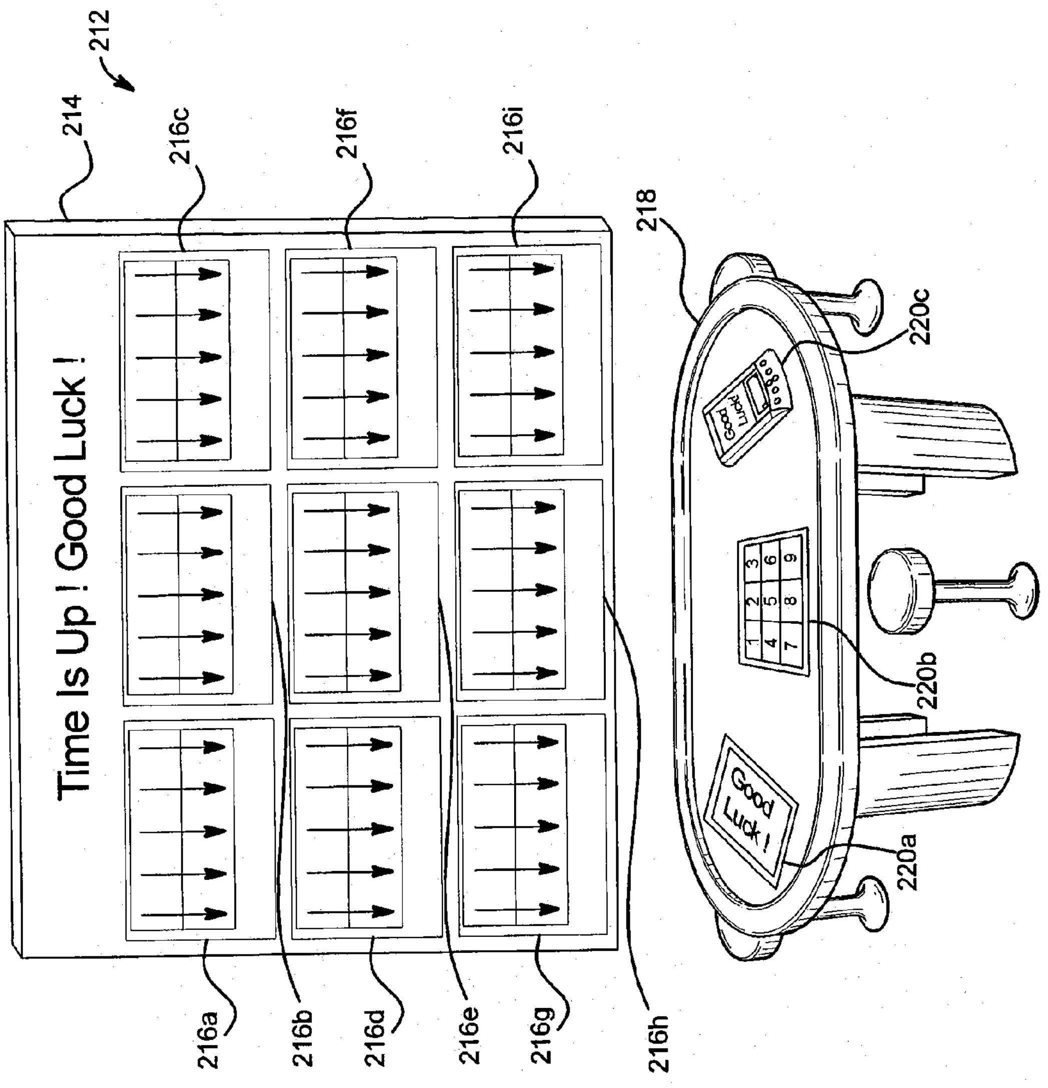
Figure 14E:
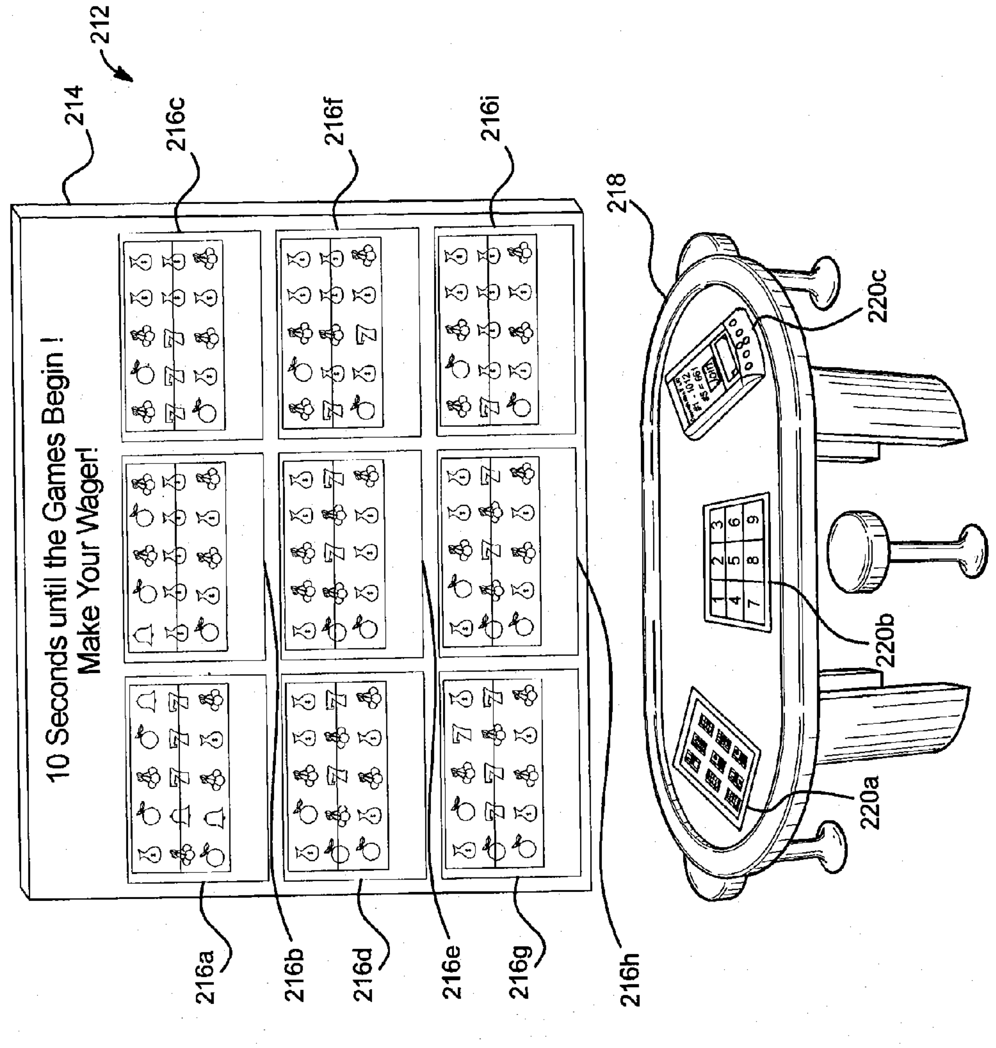
Figure 14F:
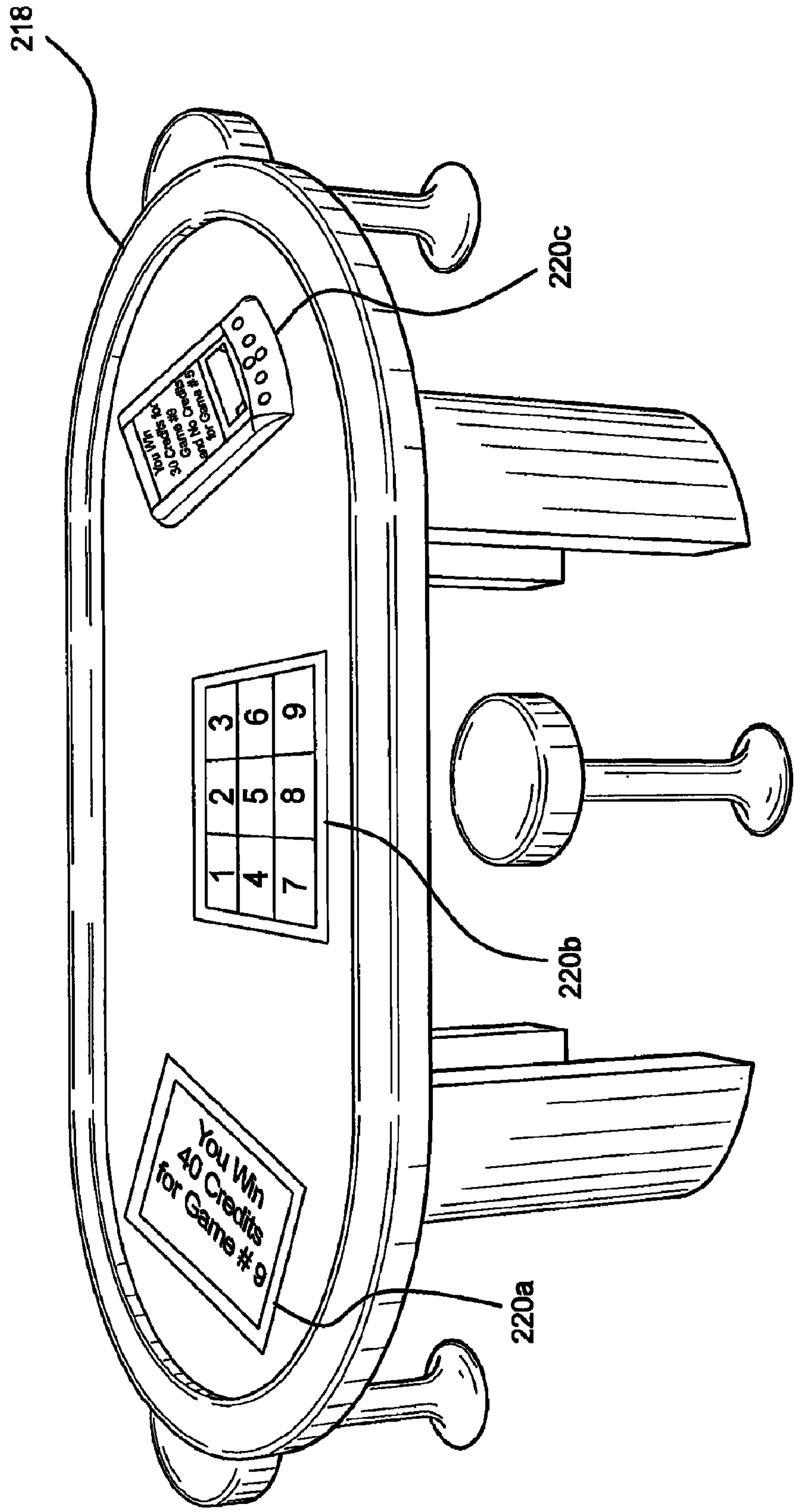

FIGS. 14C and 14F are enlarged perspective views of the table and the player stations of FIGS. 14A, 14B, 14D and 14E illustrating the player station displays of one embodiment of the present disclosure.

DETAILED DESCRIPTION

Figure 1A:
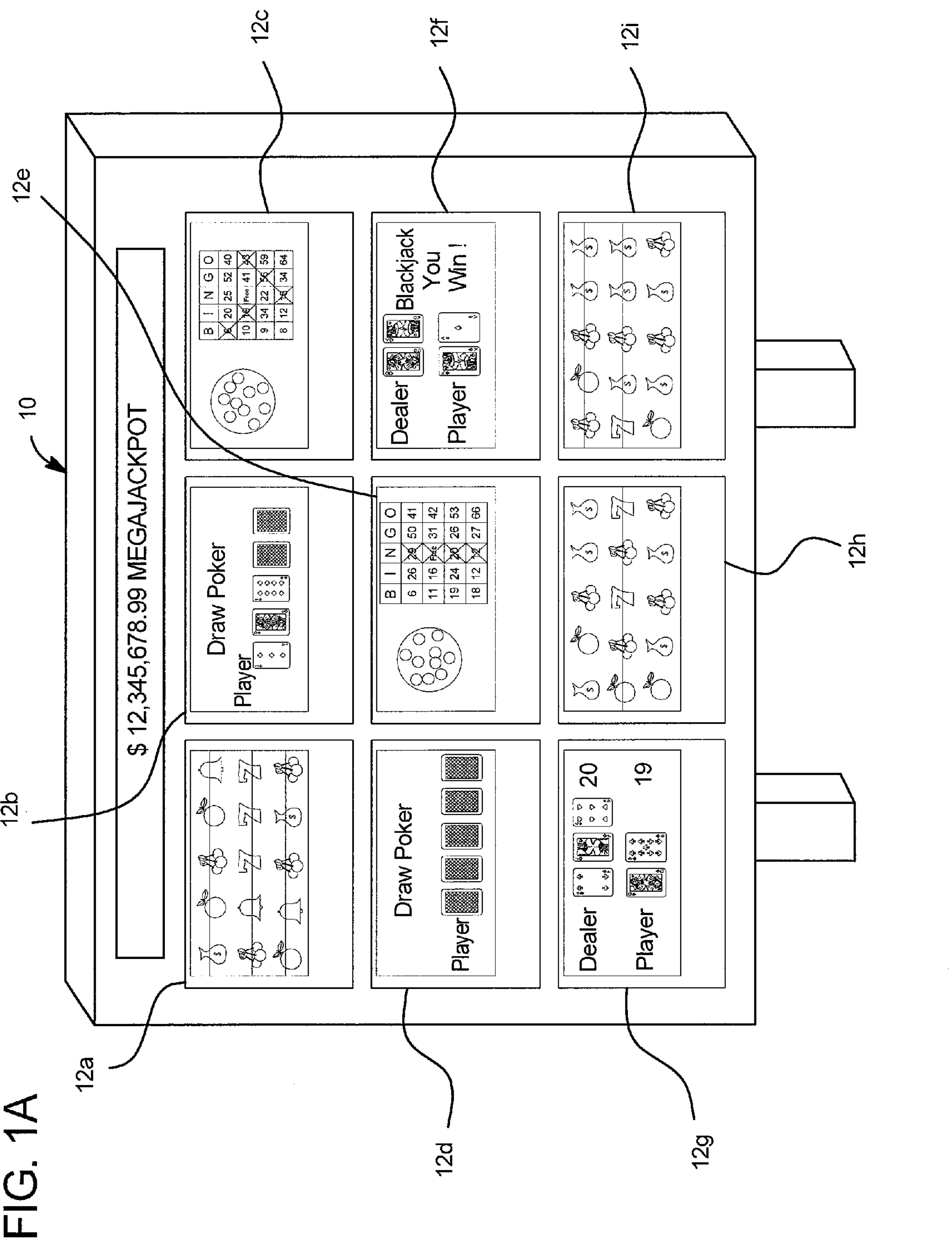
FIG. 1A, is a perspective view of one embodiment of the central display of the disclosed gaming system.
Figure 1B:
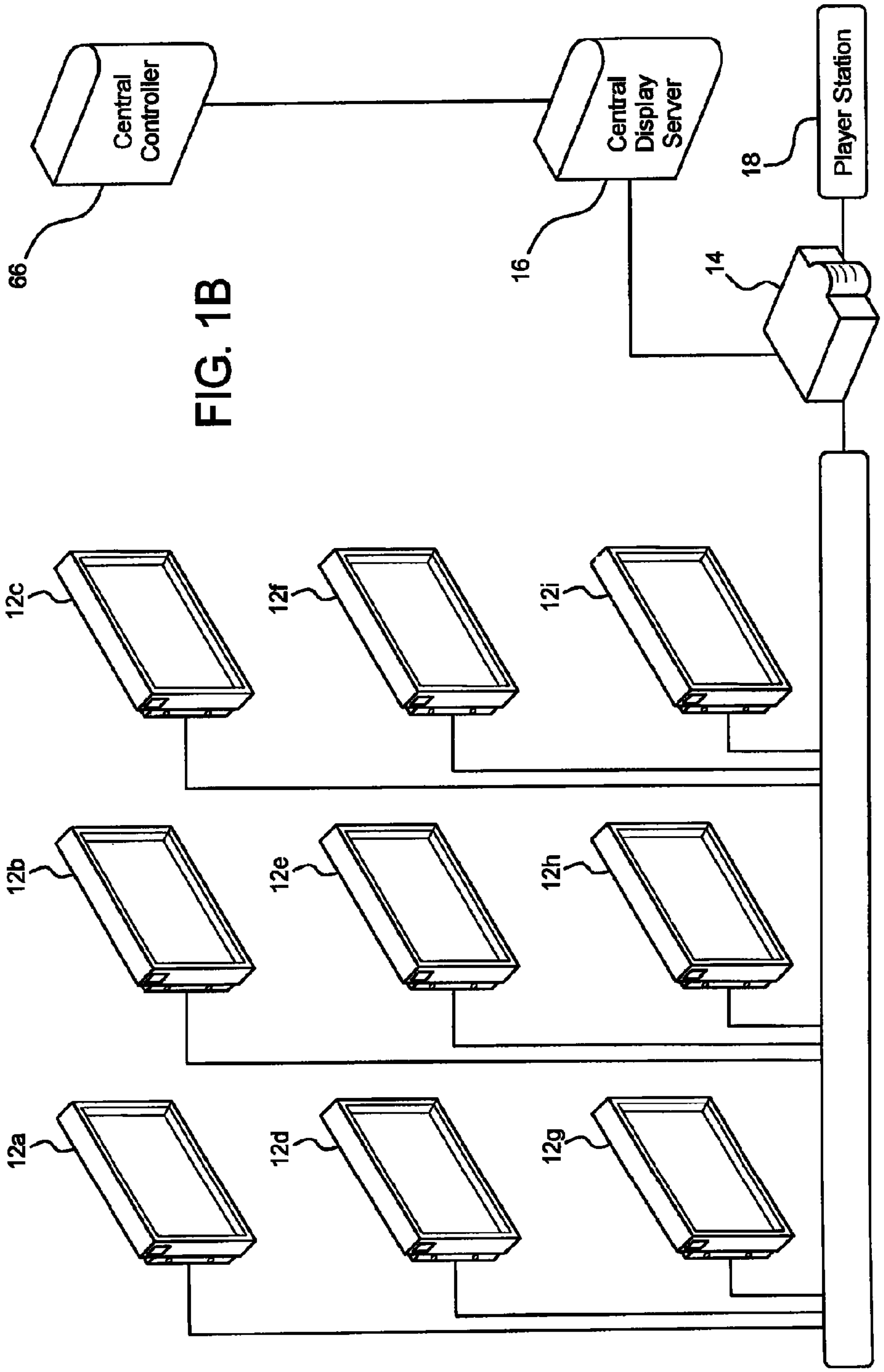
FIG. 1B is a network diagram showing network connections among monitors, and hardware components of a central display of one embodiment of the disclosed gaming system.

The gaming system of the present disclosure includes a central controller, at least one player station and a central display. As illustrated in FIGS. 1A, 1B and 1C, 1D and 1E the central display 10 includes a plurality of display segments 12*a*, 12*b*, 12*c*, 12*d*, 12*e*, 12*f*, 12*g*, 12*h*, and 12*i*. In one embodiment, each of the display segments includes an individual display device or an electronic gaming module. In one embodiment, the central display is composed of these individual display devices arranged in rows and columns, creating a matrix of display segments as illustrated in FIGS. 1A and 1B. The display segments are each operable to display a primary game and/or any secondary game as well as information relating to the primary or secondary game. The display segments may include the same type of display device or different types of display devices.

The central display 10 and the display segments 12*a*, 12*b*, 12*c*, 12*d*, 12*e*, 12*f*, 12*g*, 12*h*, and 12*i* may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle, a circle or an elongated rectangle. The display segments may be visually distinguishable by a border, such as an LED border, which enables players to focus more easily on a particular monitor.

The display segments 12*a*, 12*b*, 12*c*, 12*d*, 12*e*, 12*f*, 12*g*, 12*h*, and 12*i* of the central display 10 of the gaming system of the present disclosure are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. As illustrated in FIG. 1A, in one embodiment, each of the display segments display a game. The upper-right display segment 12*a* displays a slot game. The top-middle display segment 12*b* displays a poker game, etc. In one embodiment, the central display displays a single game on more than one display segment. In another embodiment, the central display displays a single game on all of the display segments.

In one embodiment, the symbols, images and indicia displayed on one or more of the display segments may be in mechanical form. That is, the central display and one or more of the display segments may include any electromechanical device, such as one or more mechanical objects, such as one or more rotatable wheels, reels or dice, configured to display at least one and preferably a plurality of game or other suitable images, symbols or indicia. In one alternative embodiment, the symbols, images and indicia displayed on or of the display device may be in mechanical form. That is, the display segments may include any electromechanical device, such as one or more mechanical objects, such as one or more rotatable wheels, reels or dice, configured to display at least one or a plurality of game or other suitable images, symbols or indicia.

It should be appreciated that the central display may be used in any suitable manner. The present disclosure includes various embodiments and configurations of how the display segments are operated.

Figure 1C:
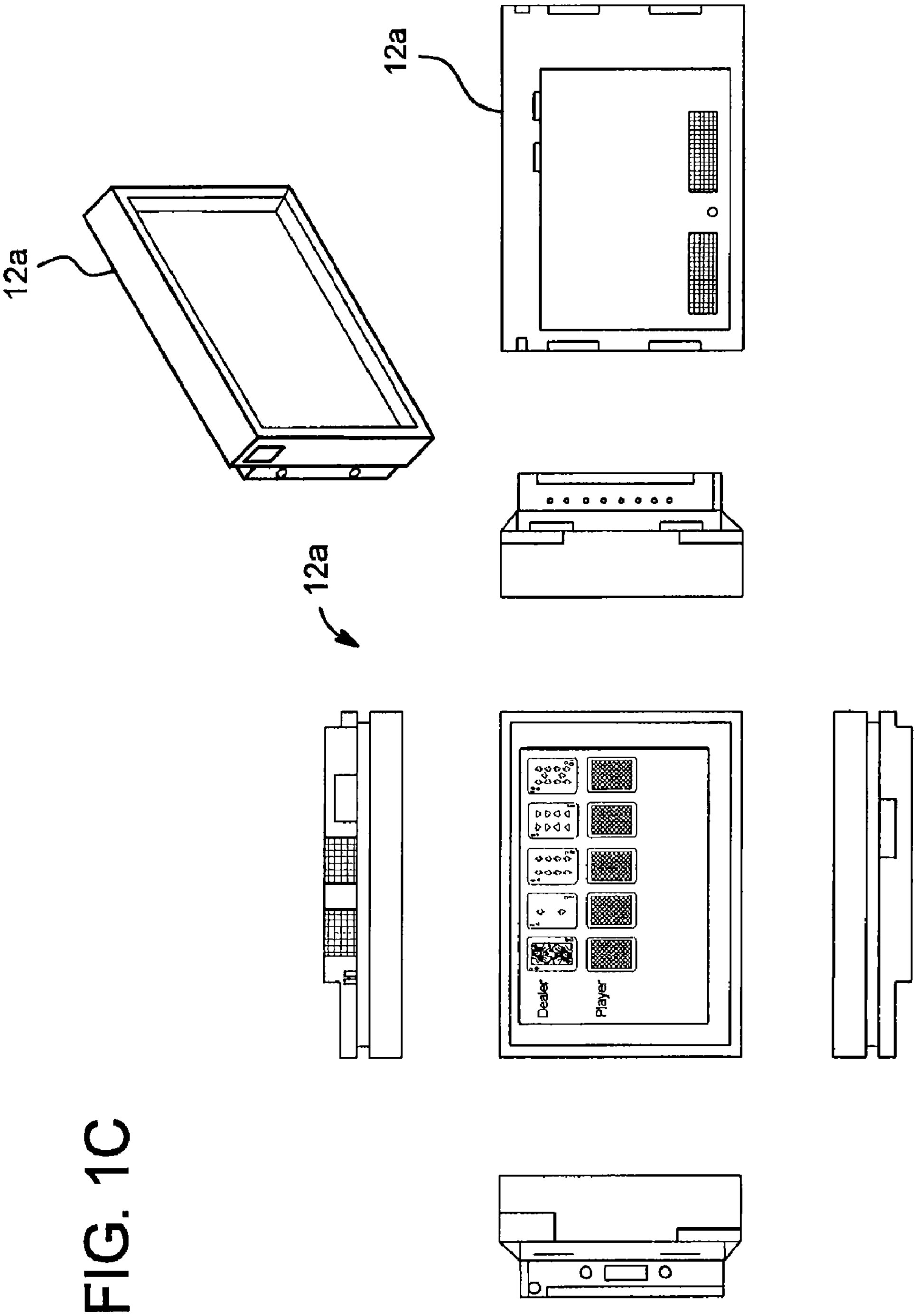
FIG. 1C is a front, side, perspective and back view of one embodiment of one of the display segments of the central display of the disclosed gaming system.

In one embodiment, as illustrated in FIGS. 1B and 1C, each of the display segments is a separate display device which is connected to the gaming system. It should be appreciated that the display segments may be any suitable type of display device and include or be connected to any other suitable components. It should be appreciated that the display segments may be one or more different sizes and may be one or more different types of display devices. The design or the configuration of the central display is not limited to a matrix but may be any other suitable shape or arrangement of display segments. The display segments are operable to display any suitable type of content including advertisements, live video feeds from seating areas, television, satellite and cable programs, sporting events, news programs, promotional videos, concierge services, games, and Internet content. The display segments are operable to execute a single task or execute a task in tandem with other display segments to perform a single task. For example, all the display segments of an entire central display may function simultaneously to provide a large-scale display of a single game. The central controller or one more of the player stations may cause the display segments to simultaneously function to provide a large-scale display of a single game or event.

FIG. 1B illustrates one embodiment of the gaming system of the present disclosure showing network connections among display segments 12*a*, 12*b*, 12*c*, 12*d*, 12*e*, 12*f*, 12*g*, 12*h*, and 12*i*, peripherals, and hardware components. In FIG. 1B, each of the display segments 12*a*, 12*b*, 12*c*, 12*d*, 12*e*, 12*f*,

12*g*, 12*h*, and 12*i* are separate display devices. As illustrated in FIG. 1C, the display segment 12*a* includes any number of peripherals. In one embodiment, each of the display segments includes a central processing unit, a power supply, a power mains connector and an Ethernet connector. The player stations and the display segments may be networked in any suitable manner, for example by an Ethernet or RS232. In one embodiment, the display segments 12*a*, 12*b*, 12*c*, 12*d*, 12*e*, 12*f*, 12*g*, 12*h*, and 12*i* are operably connected to a player station control panel 18 and to a gaming wall server 16 which is connected to the player station control panel 18 via a router 14. It should be appreciated that the display segments may include various interfaces for power supply and input and output of data including power mains connector, serial and parallel ports, Ethernet connectors, USB ports, and connections for telephone systems such as POTS (plain old telephone service) or high-speed, digital communications lines. Other appropriate ports can be utilized depending on the type of network protocol being used and on the type of hardware components. In one embodiment, one of the display segments is directly connected to and controlled by another one of the display segments. A display segment can also be controlled directly by a player station or any other suitable controller. Appropriate connectors and interfaces for these specific implementations can be included in the rear panel of the display segments as illustrated in FIG. 1C.

In one embodiment, a subnet connects the display segments and other hardware components to a gaming wall server 16. In one embodiment, the display segments are controlled by the gaming wall server 16. Although it should be appreciated that the central controller 66 may function as the gaming wall server or may include a gaming wall server. In one embodiment, the player stations and peripherals are connected to a bus. The gaming system may have one or more player stations. A player station can be wired to a bus or have a wireless connection using an appropriate protocol including a 802.11x, a Bluetooth, or near-field magnetic conduction. If there is more than one player station, there can be a combination of wired and wireless connections to the subnet.

Figure 1D:
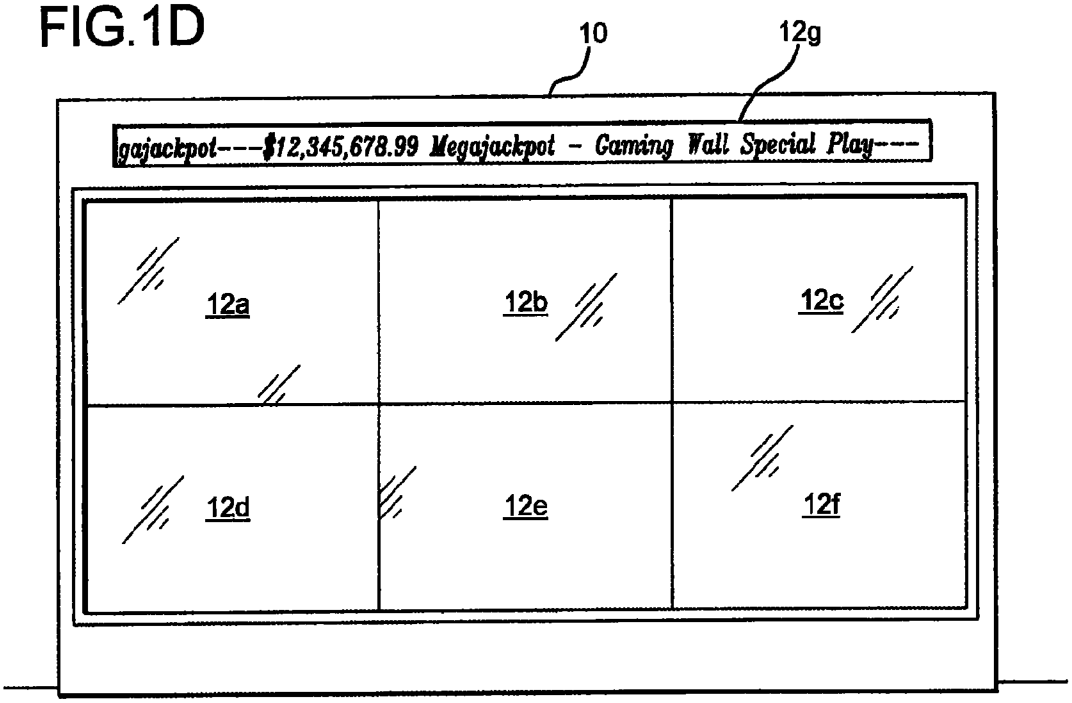
FIGS. 1D and 1E are two front views of a central display of different embodiments of the disclosed gaming system.
Figure 1E:
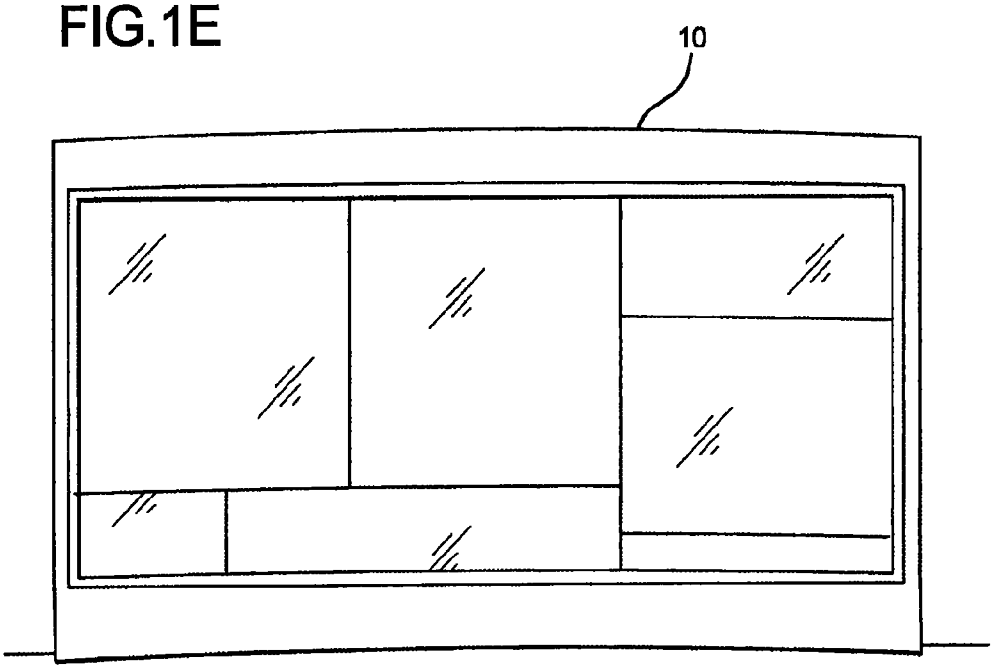

FIG. 1D is a frontal view of a central display 10 of the gaming system in accordance with one embodiment of the present disclosure with a plurality of same-sized rectangular display segments 12*a*, 12*b*, 12*c*, 12*d*, 12*e* and 12*f* and a long rectangular display segment 12*g* at the top of the central display 10. FIG. 1E is a frontal view of another configuration of the central display or gaming wall 10 of the present disclosure. As illustrated in FIG. 1E, a central display 10 includes a plurality of display segments of different sizes and shapes. It should be appreciated that the display segments may be any suitable size and shape and may change sizes and shapes based on game play. For example, if players are only playing 3 of the 6 display segments, the central display 10 may only display the 3 display segments being played and enlarge the 3 display segments. However, when a player wants to play another game not currently being displayed by the 3 display segments, the central server may change the configuration of the central display 10 to display 4 display segments. It should be appreciated that the gaming system is operable to resize the display segments, reshape the display segments, add display segments or remove display segments for any suitable reason.

The gaming system of the present disclosure includes at least one player station and preferably a plurality of player stations. The player stations may include any suitable device including but not limited to a gaming device having a cabinet, display device, and input device, a remote control device or portable unit. The player station of the present disclosure may include any suitable combination of the below listed elements in combination with any other suitable elements which enables a player to play the games of the present disclosure.

The present disclosure may be implemented in various player station configurations, including but not limited to: (1) a player station providing some computerized instructions for controlling one or more aspects of the games prior to delivery to a gaming establishment; or (2) a changeable player station, where some computerized instructions for controlling one or more aspects of the games or the player station are downloadable to the player stations through a data network when the gaming player station is in a gaming establishment. In one embodiment, the computerized instructions for controlling any games are executed by a central server, central controller or remote host. In such a "thin client" embodiment, the central server remotely controls any games or other suitable interfaces and the player station is utilized to display such games (or suitable interfaces) and receive one or more inputs or commands from a player. In another embodiment, the computerized instructions for controlling one or more aspect of the games, such as an award determination, are communicated from the central server, central controller or remote host to a player station's local processor and memory devices. In such a "thick client" embodiment, the player station's local processor executes the communicated computerized instructions to control one or more aspect of the game or other suitable interfaces provided to a player.

In one embodiment, one or more player stations in a gaming system may be thin client player stations and one or more player stations in the gaming system may be thick client player stations. In another embodiment, certain functions of the player stations are implemented in a thin client environment and certain other functions of the player stations are implemented in a thick client environment. In one such embodiment, computerized instructions for controlling any primary games are executed by a central server in a thin client configuration and computerized instructions for controlling any secondary games or bonus functions are communicated from the central server to the player station in a thick client configuration. In another such embodiment, computerized instructions for controlling any secondary games or bonus functions are executed by a central server in a thin client configuration and computerized instructions for controlling any primary games are communicated from the central server to the player station in a thick client configuration.

Figure 2A:
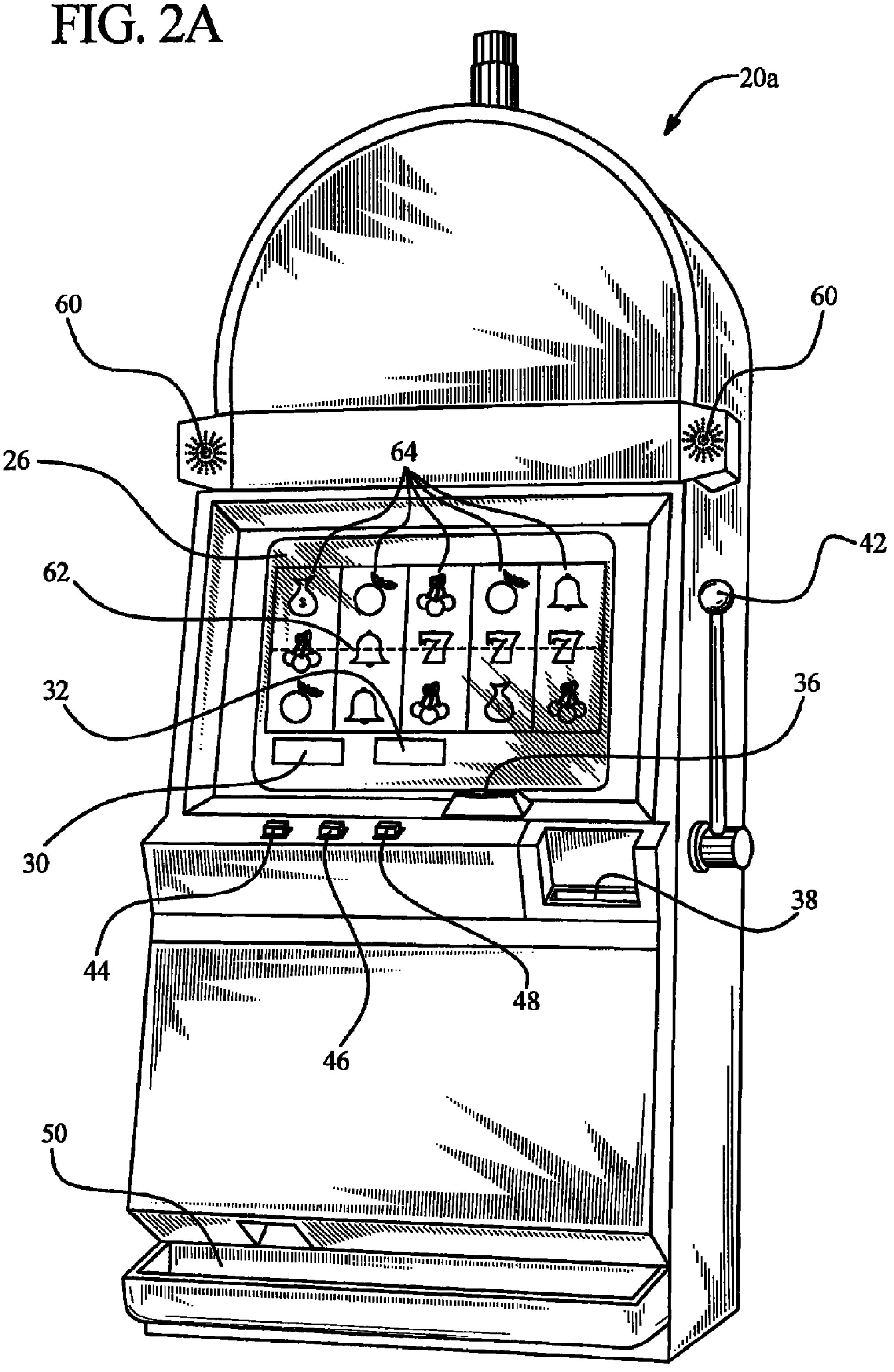
FIGS. 2A and 2B are perspective views of alternative embodiments of the player stations of the disclosed gaming system.
Figure 2B:
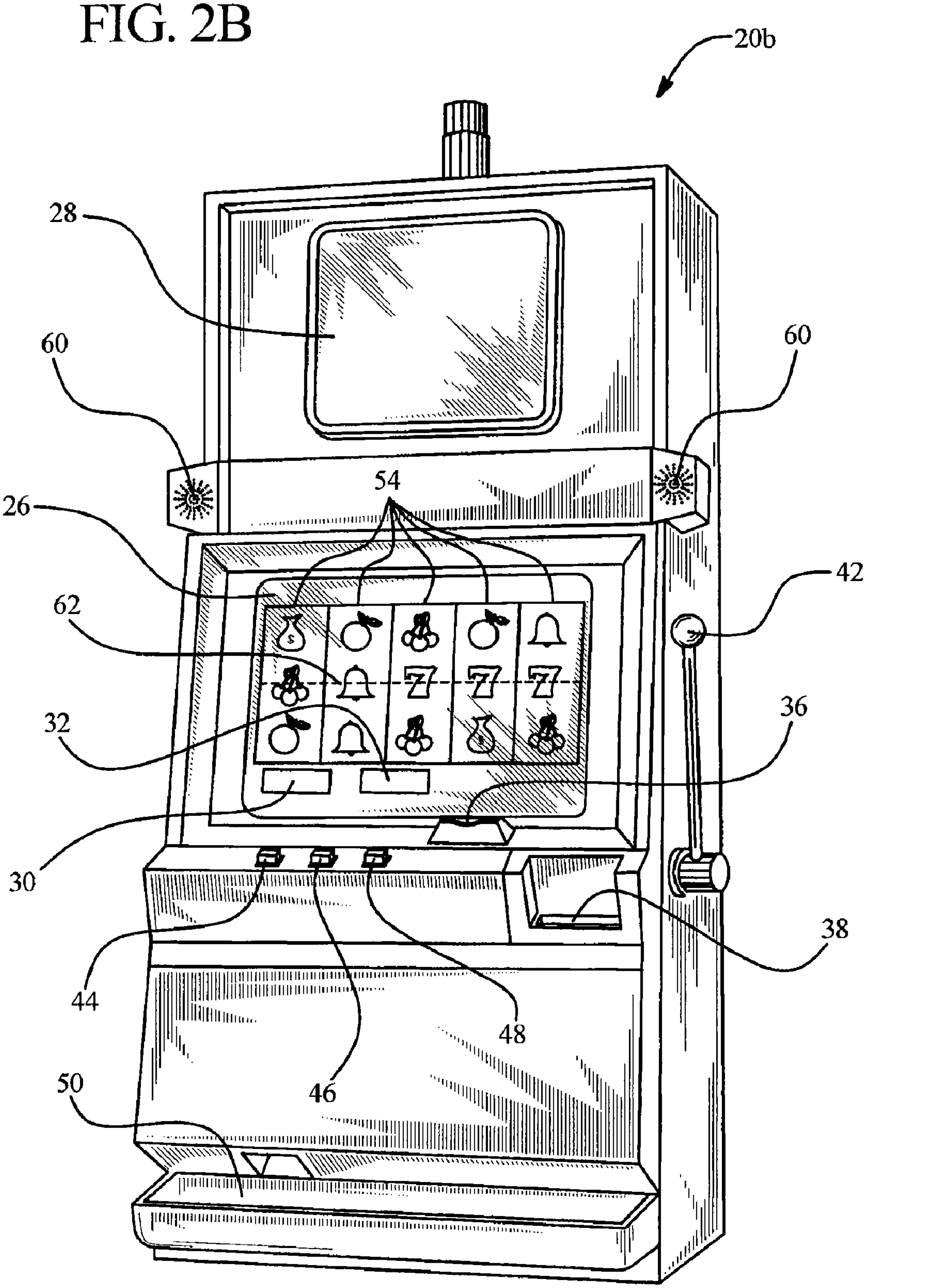
Figure 2C:
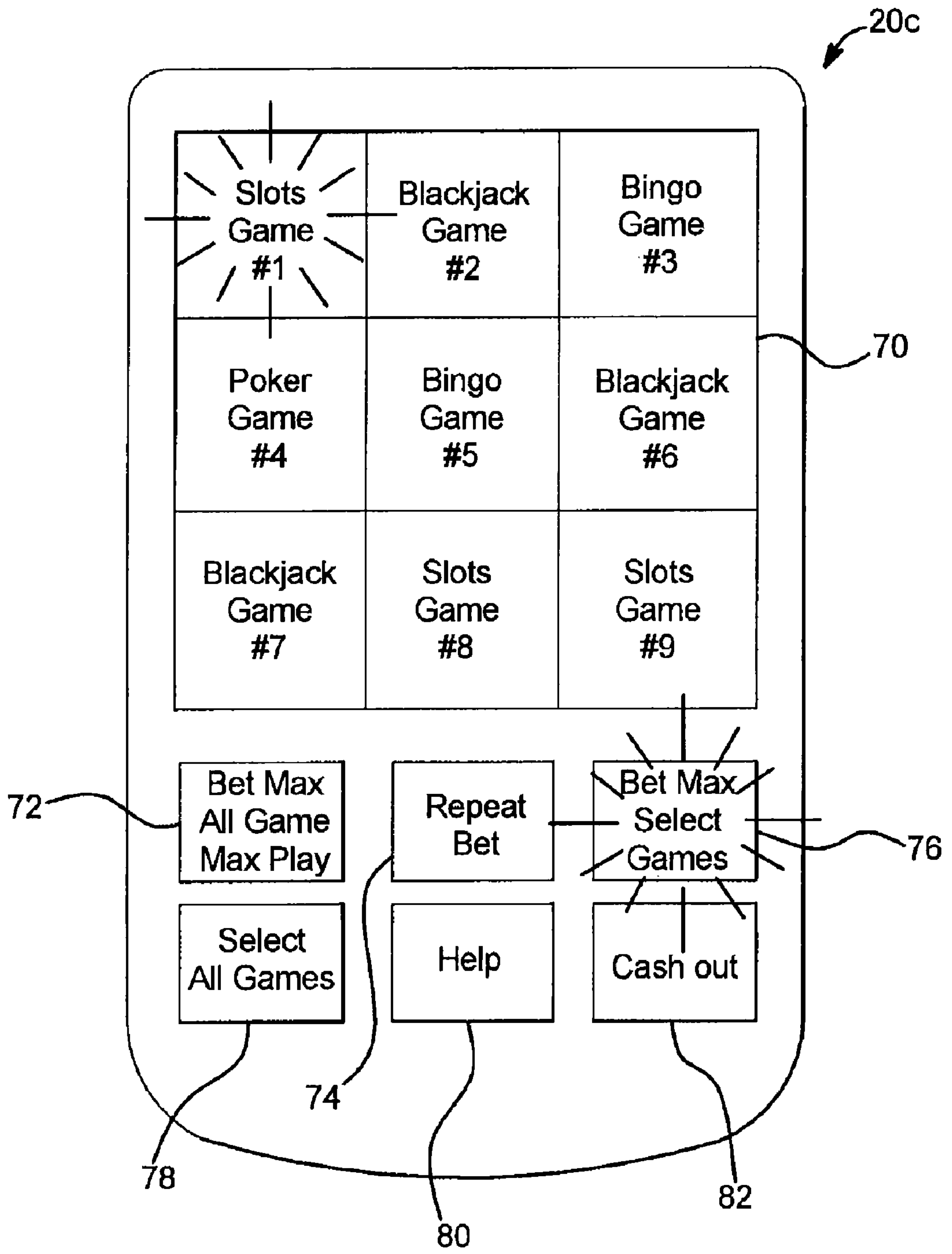
FIG. 2C is a front view of an alternative embodiment of the player station of the disclosed gaming system.

FIGS. 2A, 2B and 2C illustrate three alternative embodiments of the player station as player station 20*a*, player station 20*b* and player station 20*c*, respectively.

In one embodiment, as illustrated in FIGS. 2A and 2B, player station 20 has a support structure, housing or cabinet which provides support for a plurality of displays, inputs, controls and other features of a conventional player station. It is configured so that a player can operate it while standing or sitting. In one embodiment, the player station includes extra controls so that multiple players may operate the player station at the same time. The player station may be positioned on a base or stand or can be configured as a pub-style table-top game (not shown) which a player can operate preferably while sitting. As illustrated by the different configurations shown in FIGS. 2A and 2B, the player station may have varying cabinet and display configurations.

Figure 3A:
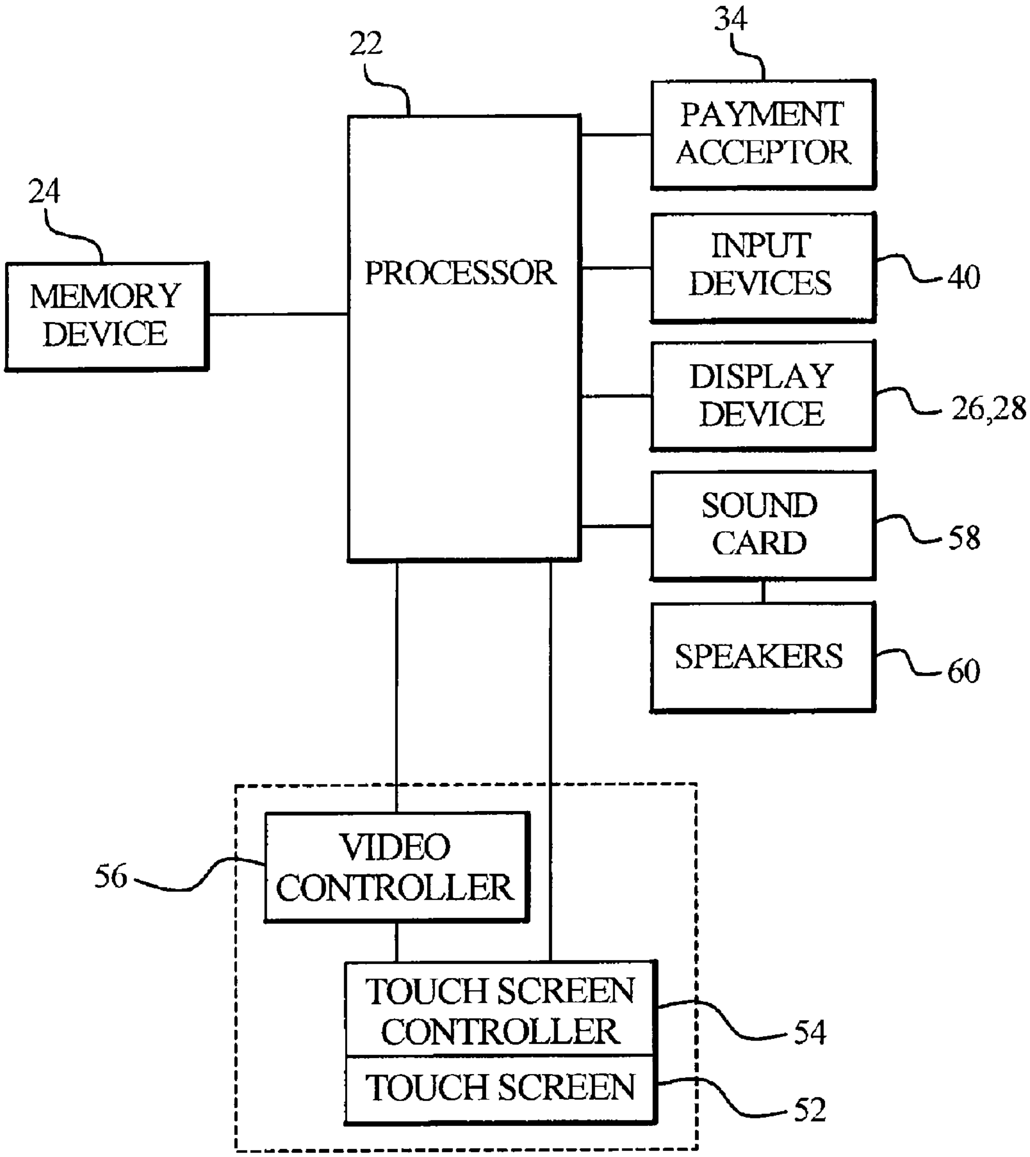
FIG. 3A is a schematic block diagram of an electronic configuration of one embodiment of the disclosed gaming system.

In one embodiment, as illustrated in FIG. 3A, the player station may include at least one processor 22, such as a microprocessor, a microcontroller-based platform, a suitable integrated circuit or one or more application-specific integrated circuits (ASIC's). The processor is in communication with or operable to access or to exchange signals with at least one data storage or memory device 24. In one embodiment, the processor and the memory device reside within the cabinet of the player station. The memory device stores program code and instructions, executable by the processor, to control the player station. The memory device also stores other data such as image data, event data, player input data, random or pseudo-random number generators, pay-table data or information and applicable game rules that relate to the play of the player station. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the player station and gaming system disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming system is operable over a wireless network, such as part of a wireless gaming system. In this embodiment, the player station may be a hand held device, a mobile device or any other suitable wireless device that enables a player to play any suitable game at a variety of different locations. It should be appreciated that a player station as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the player station generates the award or other game outcome to be provided to the player based on the associated probabilities. In this embodiment, since the player station generates outcomes randomly or based upon one or more probability calculations, there is no certainty that the player station will ever provide the player with any specific award or other game outcome. In another embodiment, each award or other game outcome is associated with a probability and the central controller or server generates the award or other game outcome to be provided to the player based on the associated probabilities. In one embodiment, each of the player stations includes an RNG and the central server controls the display of the central display. It should be appreciated there may be one or more RNG's per: (a) display segment; (b) central display; (c) player station; (d) number of games; (e) the number of potential games; or (f) any combination of the above. It should also be appreciated that one or more processors may work together and communicate to accomplish any suitable function of the gaming system.

In another embodiment, as discussed in more detail below, the gaming system employs a predetermined or finite set or pool of awards or other game outcomes. In this embodiment, as each award or other game outcome is provided to the player, the central controller flags or removes the provided award or other game outcome from the predetermined set or pool. Once flagged or removed from the set or pool, the specific provided award or other game outcome from that specific pool cannot be provided to the player again. This type of gaming system provides players with all of the available awards or other game outcomes over the course of the play cycle and guarantees the amount of actual wins and losses.

In another embodiment, as discussed below, upon a player initiating game play at the player station, the player station, enrolls in a bingo game. In this embodiment, a bingo server calls the bingo balls that result in a specific bingo game outcome. The resultant game outcome is communicated to the individual player station, to be provided to a player. In one embodiment, this bingo outcome is displayed to the player as a bingo game and/or in any form in accordance with the present disclosure.

In one embodiment, as illustrated in FIG. 2A, the player station includes one or more display devices controlled by the processor. The display devices are preferably connected to or mounted to the cabinet of the player station. The embodiment shown in FIG. 2A includes a central display device 26 which displays a primary game. This display device may also display any secondary game associated with the primary game as well as information relating to the primary or secondary game. The alternative embodiment shown in FIG. 2B includes a lower display device 26 and an upper display device 28. The upper display device may display a primary game, any suitable secondary game associated with the primary game and/or information relating to the primary or secondary game. As seen in FIGS. 2A and 2B, in one embodiment, the player station includes a credit display 30 which displays a player's current number of credits, cash, account balance or the equivalent. In one embodiment, player station includes a bet display 32 which displays a player's amount wagered.

In another embodiment, at least one display device may be a mobile display device, such as a PDA or tablet PC, that enables play of at least a portion of the primary or secondary game at a location remote from the player station.

The display segments may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display segments may be of any suitable configuration, such as a square, a rectangle or an elongated rectangle. It should also be appreciated that the actual central display may be any suitable shape such as flat or have a curvature.

The display devices of the player station are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the player station includes at least one payment acceptor 34 in communication with the processor. As seen in FIGS. 2A and 2B, the payment acceptor may include a coin slot 36 and a payment, note or bill acceptor 38, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the player station. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the player station. In one embodiment, money may be transferred to a player station through electronic funds transfer. When a player funds the player station, the processor determines the amount of funds entered and displays the corresponding amount on the credit or other suitable display as described above.

It should be appreciated that the accounting for gaming system may be accomplished in a plurality of different ways. In one embodiment, each player station tracks the funds of that player station. In another embodiment, the central controller tracks the funds of each of the player stations. In one embodiment, both the player stations and the central controller tracks the funds of that player station. In one such embodiment, the funds tracked by the player stations and the central controller are redundant and are reconciled. In one embodiment, certain player stations, such as gaming machines, track their own funds and the central controller tracks the funds of certain player stations, such as hand-held devices.

As seen in FIGS. 2A, and 2B, in one embodiment the player station includes at least one and preferably a plurality of input devices 40 in communication with the processor. The input devices can include any suitable device which enables the player to produce an input signal which is received by the processor. In one embodiment, after appropriate funding of the player station, the input device is a game activation device, such as a pull arm 42 or a play button 44 which is used by the player to start any primary game or sequence of events in the player station. The play button can be any suitable play activator such as a bet one button, a max bet button or a repeat the bet button. In one embodiment, upon appropriate funding, the player station begins the game play automatically. In another embodiment, upon the player engaging one of the play buttons, the player station automatically activates game play.

In one embodiment, as shown in FIGS. 2A and 2B, one input device is a bet one button 46. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the player station.

In one embodiment, one input device is a cash out button 48. The player may push the cash out button and cash out to receive a cash payment or other suitable form of payment corresponding to the number of remaining credits. In one embodiment, when the player cashes out, the player receives the coins or tokens in a coin payout tray 50. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 3A, one input device is a touch-screen 52 coupled with a touch-screen controller 54, or some other touch-sensitive display overlay to allow for player interaction with the images on the display. The touch-screen and the touch-screen controller are connected to a video controller 56. A player can make decisions and input signals into the player station by touching the touch-screen at the appropriate places. One such input device is a conventional touch-screen button panel.

In another embodiment, one, a plurality or each of the display segments is a touch-screen coupled with a touch-screen controller or some other touch-sensitive display overlay to allow for player interaction with the images on the display segments. The touch-screens and the touch-screen controllers are connected to a video controller.

The player station may further include a plurality of communication ports for enabling communication of the processor with external peripherals, such as external video sources, expansion buses, game or other displays, an SCSI port or a key pad.

In one embodiment, a watchdog timer is used in the player stations or the central controller to provide a software failure detection mechanism. In one embodiment, in a normal operating system, the operating software periodically accesses control registers in the watchdog timer subsystem to "re-trigger" the watchdog. Should the operating software fail to access the control registers within a preset timeframe, the watchdog timer will timeout and generate a system reset. Certain watchdog timer circuits contain a loadable timeout counter register to allow the operating software to set the timeout interval within a certain range of time. A differentiating feature of some circuits is that the operating software cannot completely disable the function of the watchdog timer. In other words, the watchdog timer functions from the time power is applied to the board.

The player stations and the central controller may use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Player stations, the central display and the central controller may have power supplies with tighter voltage margins than that required by the operating circuitry. In addition, the voltage monitoring circuitry implemented in player stations may have two thresholds of control. The first threshold generates a software event that can be detected by the operating software and an error condition is generated. This threshold is triggered when a power supply voltage falls out of the tolerance range of the power supply, but is still within the operating range of the circuitry. The second threshold is set when a power supply voltage falls out of the operating tolerance of the circuitry. In this case, in one embodiment the circuitry generates a reset, halting operation of the computer.

In one embodiment, the software uses a state machine. Different functions of one or more of the games (bet, play, result, points in the graphical presentation, etc.) may be defined as a state. In one embodiment, when a game moves from one state to another, critical data regarding the game software is stored in a custom non-volatile memory subsystem. This ensures the player's wager and credits are preserved and to minimize potential disputes in the event of a malfunction on the player station.

The player stations, the central controller and the display segments may include serial interfaces to connect to specific subsystems or subnets internal and external to the player stations, central controller and the display segments. The serial devices may have electrical interface requirements that differ from the "standard" EIA serial interfaces provided by general-purpose computers. These interfaces may include EIA, EIA, Fiber Optic Serial, optically coupled serial interfaces, current loop style serial interfaces, etc. In addition, to conserve serial interfaces internally in the player station, serial devices may be connected in a shared, daisy-chain fashion where multiple peripheral devices are connected to a single serial channel.

The serial interfaces may be used to transmit information using communication protocols that are unique to the gaming industry. For example, SAS is a communication protocol used to transmit information, such as metering information, from a player station to a remote device. Often SAS is used in conjunction with a player tracking system.

Player stations may be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses.

In one embodiment, security monitoring circuits detect intrusion into a player station or gaming station by monitoring security switches attached to access doors in a designated area, such as a player station cabinet. In one embodiment, access violations result in suspension of game play and can trigger additional security operations to preserve the current state of game play. These circuits also function when power is off by use of a battery backup. In power-off operation, these circuits continue to monitor the access doors of the player station. When power is restored, the player station can determine whether any security violations occurred while power was off, e.g., via software for reading status registers. This can trigger event log entries and further data authentication operations by the player station software.

Trusted memory devices may be included in player stations, the central controller or display segments to ensure the authenticity of the software that may be stored on less secure memory subsystems, such as mass storage devices. Trusted memory devices and controlling circuitry are typically designed to not allow modification of the code and data stored in the memory device while the memory device is installed in the player station. The code and data stored in these devices may include authentication algorithms, random number generators, authentication keys, and operating system kernels. The purpose of these trusted memory devices is to provide gaming regulatory authorities a root trusted authority within the computing environment that can be tracked and verified as original. This may be accomplished via removal of the trusted memory device from the player station, central controller or display segment and verification of the secure memory device contents is a separate third party verification device. Once the trusted memory device is verified as authentic, and based on the approval of the verification algorithms contained in the trusted device, the player station, central controller or display segment is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming environment, modification of the gaming code stored on a mass storage device is strictly controlled and would only be allowed under specific maintenance type events with electronic and physical enablers required. Though this level of security could be provided by software, player stations, central controllers or display segments that include mass storage devices may include hardware level mass storage data protection circuitry that operates at the circuit level to monitor attempts to modify data on the mass storage device and will generate both software and hardware error triggers should a data modification be attempted without the proper electronic and physical enablers being present.

Figure 2D:
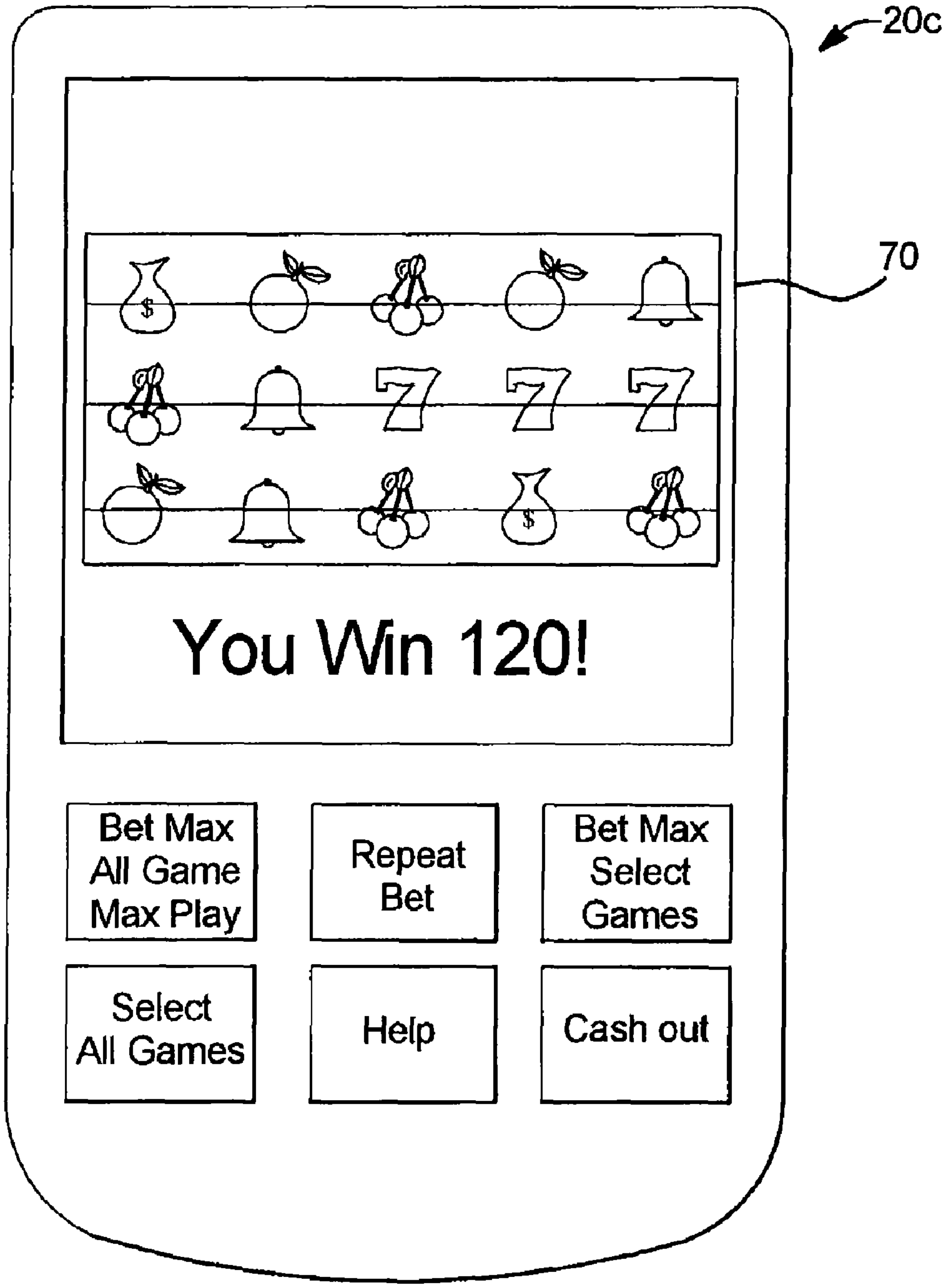
FIGS. 2D and 2E illustrate possible player inputs and screen shots of one embodiment of the player station of the disclosed gaming system.
Figure 2E:
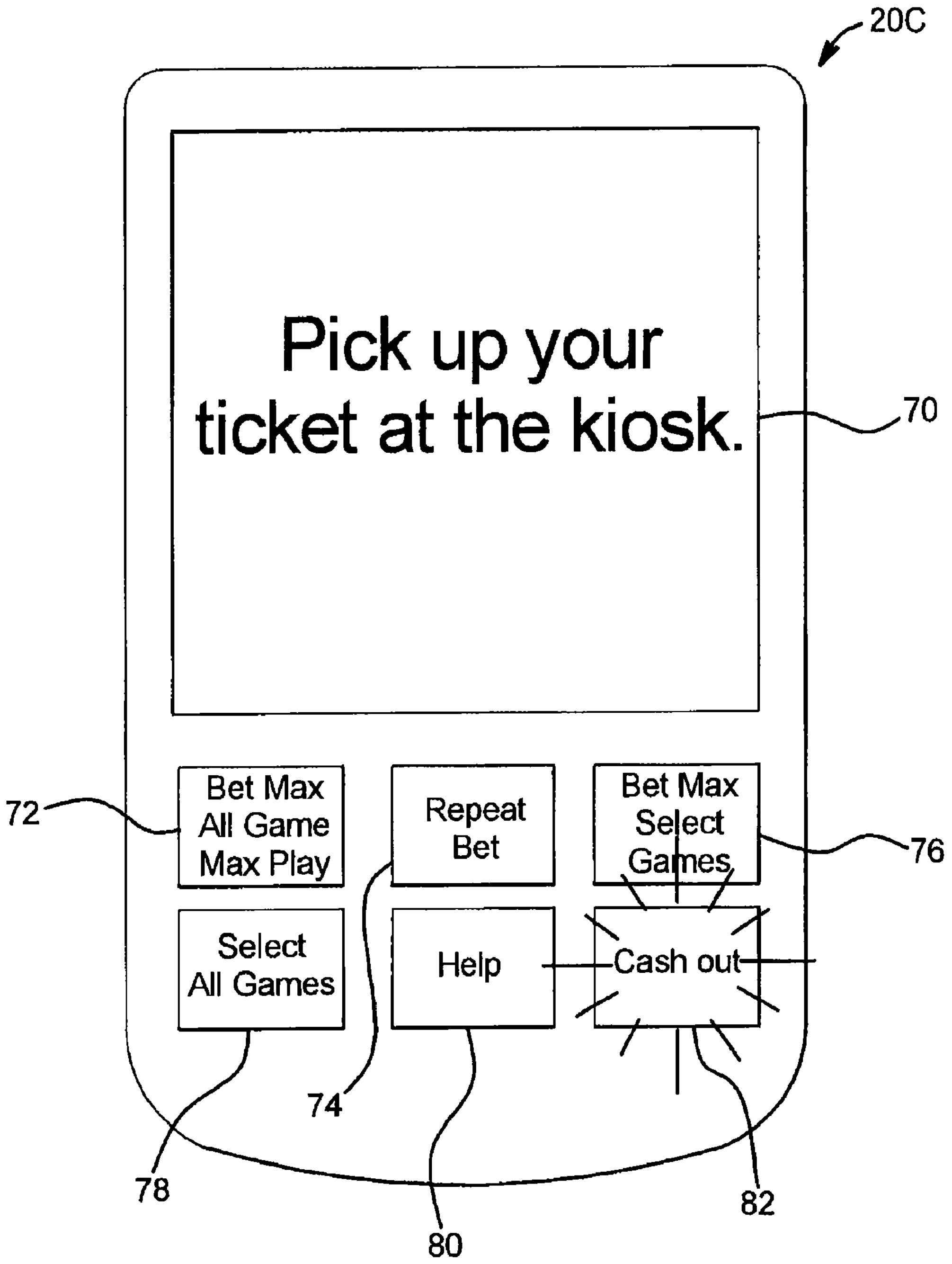

In one embodiment, a player need not be present at the central display to play. In one example of this embodiment, the player can use a handheld device (or other communication apparatus) to participate in the gaming experience, as illustrated in FIGS. 2C, 2D and 2E. In one embodiment, as illustrated in FIGS. 2C, 2D, and 2E, player station 20*c* is a handheld, wireless device. The wireless device may include any suitable combination of displays, inputs, controls and other features of a conventional player station. In the illustrated embodiment, the player station includes a single display 70 and a plurality of player inputs such as buttons 72, 74, 76, 78, 80 and 82. In the illustrated embodiment, the player stations includes a touch screen coupled with a touch-screen controller, or some other touch-sensitive display overlay to allow for player interaction with the images on the display 70. A player can make decisions and input signals into the player station by touching the touch-screen at the appropriate places. One such input device is a touch-screen button panel. In the illustrated embodiment, the display device 70 displays a grid where each box square of the grid of the player station correlates to one of the games of the central display. For example, the upper left box of the display that states "Slot Game #1" correlates to the first slot game 12*a* of the central display of FIG. 1A. It should be appreciated that the touch screen may have an arrangement or configuration similar to the display segments of the central display or enable the player to select the games in any suitable manner.

As illustrated in FIG. 2C, in one embodiment, the player station includes a plurality of input buttons in addition to the touch screen. The player station 20*c* includes a bet max, all game max play button 72 which enables the player with one touch of a button to wager the maximum on every game of the central display. The player station includes a repeat bet button 74 that enables the player to repeat the previous selections made. The player station includes a bet max on selected games button 76 which enables the player to individually select games and then press one button to wager the maximum on each selected game. The player station includes a select all games button 78 which enables the player to select all of the games at once. The player station additionally includes a help button 80 and a cash out button 82. It should be appreciated that the player station may include any suitable inputs.

FIG. 2D illustrates an example of what the display device 70 of the player station may display while a game is playing. As illustrated in FIG. 2C, a player selected slots game #1 and the bet max on selected games button 76. The display displays the game outcome for the entire game and the player's individual game result. The player won an award of 120 credits. It should be appreciated that the display device may communicate the game outcome, game results and award to the player in any suitable manner.

As illustrated in FIG. 2E, the player selects the cash out button 82 and the player station informs the player to go to the kiosk to pick up the player's ticket. In the illustrated embodiment, certain player stations may not print award tickets and the player may have to go to a kiosk to receive their award ticket.

In one embodiment, the handheld device has a display device that allows the player to customize the betting experience. The player is able to input betting parameters and choose which games they wish to participate in. For example, a player may choose to wager $5 per line on 5 paylines out of 9 paylines at a player station. This information is sent to the central controller and the player is registered as a participant in the game.

In one embodiment, before the game is ready to begin, the player may receive a countdown or other indication on their handheld device to let them know the game is about to take place. Other pertinent information, such as paytable and bet confirmation, may also be displayed at this time. Once the game is ready to take place and a game outcome has been determined, in one embodiment, the display of the handheld device is capable of replicating the actual game outcome. That is, the display of the handheld device will replicate a portion or all of the game outcome for the entire game, such as simulated reels spinning and an indication of the outcome that mirrors the outcome shown on the central display. This simulated display enables the player to experience the game by replicating some or all of the same visuals shown at the central display. However, it also grants a player the freedom to move about the casino, still feel involved in the game, and not be tied to a certain area to play.

After the game outcomes are displayed or indicated on the handheld device, the handheld device may be programmed to display the different paylines to the player. In one embodiment, the handheld device shows the player game results that the player wagered on in addition to the game outcome. For example, the handheld device may scroll through paylines 1-5 (the paylines bet on by the player) and show the player what they have won and what awards are associated with those wins. Alternatively, the handheld device may also scroll through lines 6-9 (the paylines not wagered on by the player) and indicate wins or game outcomes on those paylines. This illustrates what other players participating in the gaming event have won and also indicates to the player what they could have won if they wagered in a different manner. In one embodiment, the non-wagered on game outcomes or wins may be illustrated in distinctive graphics or may be highlighted to indicate to the player that though the particular outcome is associated with the game the player participated in, they will not be credited with a win because they did not make the required bet. For example, when the handheld device scrolls through these paylines, it may be done in a shaded (grayscale) or darkened manner.

In one embodiment, the player may be able to play more than one game on the handheld device. For example, a player may choose to wager on both a slot game and a poker game. In one embodiment, this information is sent to the central control and the player is registered to play both of the games. In one embodiment, the player's handheld device is a replicating display of the central display. That is, even though the player is playing multiple games they are able to experience both games on their handheld devices through a replication of the game outcomes generated and displayed on the central display. In this embodiment, the player can experience multiple games without having to be proximate to the central display. In the embodiment where the player is simultaneously participating in one or more games, the player may control the display by scrolling through their games splitting the screen between the games, having the games display sequentially, or any other desirable display criteria. In another embodiment, the handheld device only displays the game results for that player. That is, instead of showing the result of every game outcome (e.g., every payline of the game), the handheld device only displays the game results that pertain to the player's particular wager (e.g., the paylines that player wagered on).

It should be appreciated that the players may submit wagers on the handheld device or fund a handheld device in any suitable manner. In one embodiment, the gaming system enables a player to enter funds at a kiosk or a gaming station or device. In one embodiment, the gaming system has an identifier, such as an identification number, for the handheld device. In one embodiment, the player enters the identification number and enters funds at the kiosk. These funds are associated with that handheld device and the player remains anonymous. In another such embodiment, the handheld devices include an identifier such as a barcode and the player scans the barcode at the kiosk and inserts funds. In another embodiment, a gaming establishment employee assists players in funding the handheld device. In another embodiment, the gaming system is linked to player accounts. When a player begins play on the handheld device, the player identifies his or her account and funds wagers from that account. Wagers and wins are then subtracted and added to the account. In some embodiments, players may choose how to fund the handheld device.

Additionally, players may receive their winnings from a handheld device in any suitable manner. In one embodiment, the gaming system has an identifier, such as an identification number, for the handheld device. In one embodiment, upon the termination of game play, the player enters the identification number at the kiosk to receive an award ticket. In another such embodiment, the handheld devices include an identifier such as a barcode, upon termination of play, the player scans the barcode at the kiosk to receive an award ticket. In another embodiment, a gaming establishment employee assists players in returning the handheld device and obtaining any awards. In another embodiment, the gaming system is linked to player accounts. Wins are then added to the account. It should be appreciated that any suitable identifiers and methods may be used to fund the handheld devices and to redeem winnings.

In one embodiment, the player station includes extra controls so that multiple players may operate the player station at the same time.

In one embodiment, as seen in FIG. 3A, the player station includes a sound generating device controlled by one or more sounds cards 58 which function in conjunction with the processor. In one embodiment, the sound generating device includes at least one and preferably a plurality of speakers 60 or other sound generating hardware and/or software for generating sounds, such as playing music for the primary and/or secondary game or for other modes of the player station, such as an attract mode. In one embodiment, the player station provides dynamic sounds coupled with attractive multimedia images displayed on one or more of the display devices to provide an audio-visual representation or to otherwise display full-motion video with sound to attract players to the player station. During idle periods, the player station may display a sequence of audio and/or visual attraction messages to attract potential players to the player station. The videos may also be customized for or to provide any appropriate information.

In one embodiment, the gaming system may include a sensor, such as a camera in communication with the processor (and possibly controlled by the processor) that is selectively positioned to acquire an image of a player actively using the player station and/or the surrounding area of the player station. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia. In another embodiment, the gaming system includes a wireless transceiver or a camcorder and the display segments are components of or are connected to televisions, satellites, DVD players, digital video recorders and Internet-enabled devices. In one embodiment, the game may be displayed on the central display and replicated on one or more the player stations. In another embodiment, the game is only displayed on the central display and the player station is only used to input decisions or commands in the game. In another embodiment, a primary or base game is displayed on the player station and/or the central display and one or more bonus games are displayed on the central display only. In one embodiment, the player stations provide other information to a player, such as the win/loss history of that certain games or the win/loss history of that player. It should be appreciated that the central display and the player stations may work together with a central controller or a plurality of servers to provide the games to the player in any suitable manner.

Figure 3B:
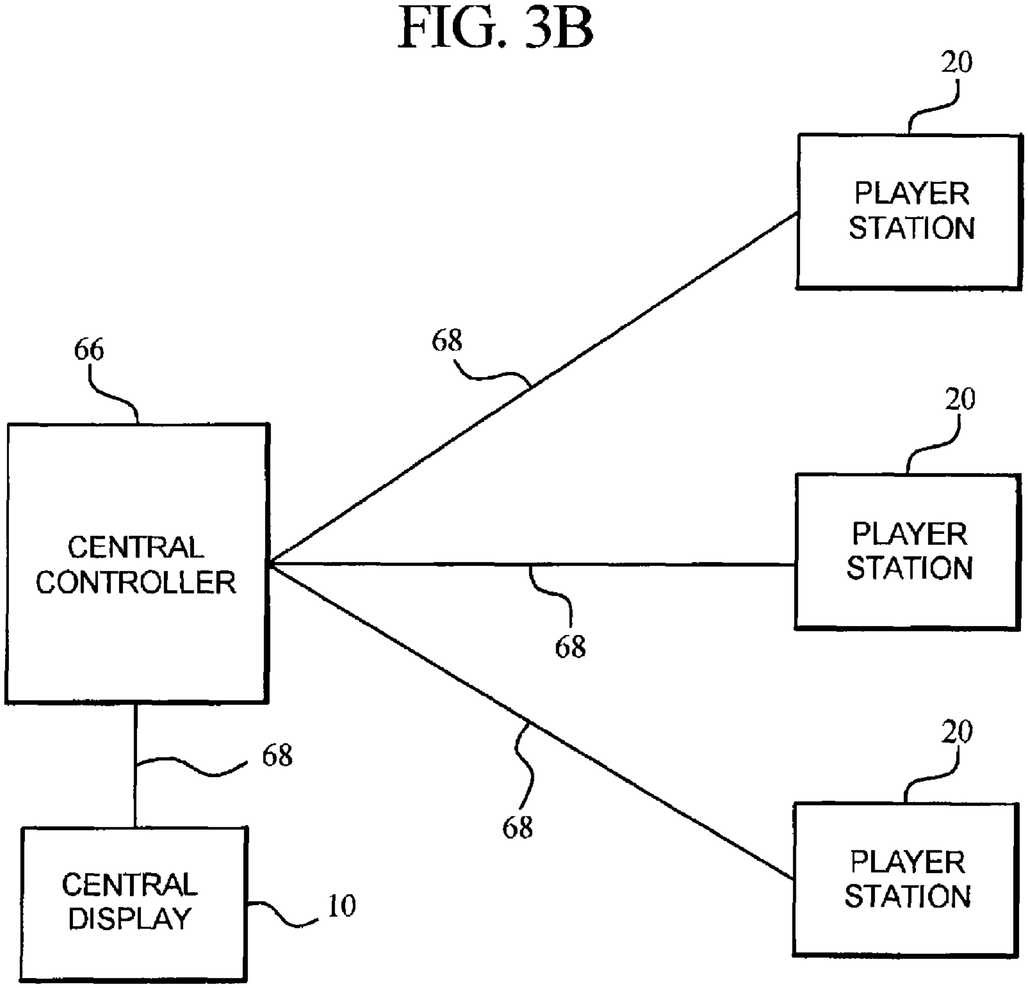
FIG. 3B is a schematic block diagram illustrating a plurality of player stations in communication with a central controller and a central display in communication with the central controller.

In one embodiment, as illustrated in FIG. 3B, one or more of the player stations 20 are in communication with each other and/or at least one central server, central controller or remote host 66 through a data network or remote communication link 68. In this embodiment, the central server, central controller or remote host is any suitable server or computing device which includes at least one processor and at least one memory or storage device. In different such embodiments, the central server is a progressive controller or a processor of one of the player stations in the gaming system. In these embodiments, the processor of each player station is configured to transmit and receive events, messages, commands or any other suitable data or signal between the individual player station and the central server. The player station processor is operable to execute such communicated events, messages or commands in conjunction with the operation of the player station. Moreover, the processor of the central server is configured to transmit and receive events, messages, commands or any other suitable data or signal between the central server and each of the individual player stations. The central server processor is operable to execute such communicated events, messages or commands in conjunction with the operation of the central server. It should be appreciated that one, more or each of the functions of the central controller as disclosed herein may be performed by one or more player station processors. It should be further appreciated that one, more or each of the functions of one or more player station processors as disclosed herein may be performed by the central controller. In one embodiment, the central controller has an uninterruptible power supply ("UPS"). In one embodiment, the UPS is a rack mounted UPS module.

In one embodiment, the game outcome provided to the player is determined by a central server or controller and provided to the player at the player station. In this embodiment, each of a plurality of such player stations is in communication with the central server or controller. Upon a player initiating game play at one of the player stations, the initiated player station communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the player station.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes.

The central server or controller communicates the generated or selected game outcome to the initiated player station. The player station receives the generated or selected game outcome and provides the game outcome to the player. In an alternative embodiment, how the generated or selected game outcome is to be presented or displayed to the player, such as a reel symbol combination of a player station or a hand of cards dealt in a card game, is also determined by the central server or controller and communicated to the initiated player station to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked player stations based on the results of a bingo or keno game. In this embodiment, each individual player station utilizes one or more bingo or keno games to determine the predetermined game outcome value provided to the player for the interactive game played at that player station. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each player station is enrolled in the bingo game, such as upon an appropriate wager or engaging an input device, the enrolled player station is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled player stations, the same element may be present on all four of the bingo cards while another element may solely be present on one of the bingo cards.

In operation of these embodiments, upon providing or associating a different bingo card to each of a plurality of enrolled player stations, the central controller randomly selects or draws, one at a time, a plurality of the elements. As each element is selected, a determination is made for each player station as to whether the selected element is present on the bingo card provided to that enrolled player station. This determination can be made by the central controller, the player station, a combination of the two, or in any other suitable manner. If the selected element is present on the bingo card provided to that enrolled player station, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the player station requires the player to engage a "daub" button (not shown) to initiate the process of the player station marking or flagging any selected elements.

After one or more predetermined patterns are marked on one or more of the provided bingo cards, a game outcome is determined for each of the enrolled player stations based, at least in part, on the selected elements on the provided bingo cards. As described above, the game outcome determined for each player station enrolled in the bingo game is utilized by that player station to determine the predetermined game outcome provided to the player. For example, a first player station to have selected elements marked in a predetermined pattern is provided a first outcome of win $10 which will be provided to a first player regardless of how the first player plays in a first game and a second player station to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled player station will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a player station may be provided a supplemental or intermittent award regardless of if the enrolled player station's provided bingo card wins or does not win the bingo game as described above.

In another embodiment, one or more of the player stations are in communication with a central server or controller for monitoring purposes only. That is, each individual player station randomly generates the game outcomes to be provided to the player and the central server or controller monitors the activities and events occurring on the plurality of player stations. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the player stations disclosed herein are associated with or otherwise integrated with one or more player tracking systems. In this embodiment, the player station and/or player tracking system tracks players gaming activity at the player station. In one such embodiment, the player station and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the player station utilizes one or more portable devices carried by a player, such as a cell phone, a radio frequency identification tag or any other suitable wireless device to track when a player begins and ends a gaming session. In another embodiment, the player station utilizes any suitable biometric technology or ticket technology to track when a player begins and ends a gaming session.

During one or more gaming sessions, the player station and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

A plurality of the player stations are capable of being connected together through a data network. In one embodiment, the data network is a local area network (LAN), in which one or more of the player stations are substantially proximate to each other and an on-site central server or controller as in, for example, a gaming establishment or a portion of a gaming establishment. In another embodiment, the data network is a wide area network (WAN) in which one or more of the player stations are in communication with at least one off-site central server or controller. In this embodiment, the plurality of player stations may be located in a different part of the gaming establishment or within a different gaming establishment than the off-site central server or controller. Thus, the WAN may include an off-site central server or controller and an off-site player station located within gaming establishments in the same geographic area, such as a city or state. The WAN gaming system may be substantially identical to the LAN gaming system described above, although the number of player stations in each system may vary relative to each other.

In another embodiment, the data network is an internet or intranet. In this embodiment, the operation of the player station can be viewed at the player station with at least one internet browser. In this embodiment, operation of the player station and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, the gaming system is in communication with a central server or controller. The central server or controller may be any suitable server or computing device which includes at least one processor and a memory or storage device. In alternative embodiments, the central server is a progressive controller or another player station in the gaming system. In one embodiment, the memory device stores different game programs and instructions, executable by a player station processor, to control the player station. Each executable game program represents a different game or type of game which may be played on one or more of the player stations in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the player station) or vice versa.

In this embodiment, one, all or a plurality of the player stations at least includes one or more display devices and/or one or more input devices for interaction with a player. A local processor, such as the above-described player station processor or a processor of a local server, is operable with the display device(s) and/or the input device(s) of one or more of the player stations.

In operation, the central controller is operable to communicate one or more of the stored game programs to at least one local processor. In different embodiments, the stored game programs are communicated or delivered by embedding the communicated game program in a device or a component (e.g., a “chip” to be inserted in a player station), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the player station. That is, when a game program is communicated to a local processor, the local processor changes the game or type of game played at the player station or displayed on the display segment.

Though the illustrated embodiments are described with the central controller determining a game result for the player and communicating that result to the central display and one or more player stations, any other suitable game determining method may be employed in any embodiment of the present disclosure. In one embodiment, the central display is associated with a central display server. This central display server determines the game outcome for the games played on each of the display segments. The central display server communicates the game outcome to the central controller which communicates the game outcome to one or more of the player stations. In one embodiment, the central controller determines the award to provide to the player a based on the game outcome. In another embodiment, the player stations determine the award to provide to the players based on the game outcomes.

In another embodiment, the central controller determines the game outcome displayed on the central display and the player station determines any award to provide to the player based on the game outcome.

In another embodiment, the player station determines both the game outcome and any award to provide to the player based on the game out come. In another embodiment, the central controller determines part of the outcome and the player station determines part of the outcome. That is, both the central controller and the player station determine part of a player’s outcome and/or award.

Figure 3C:
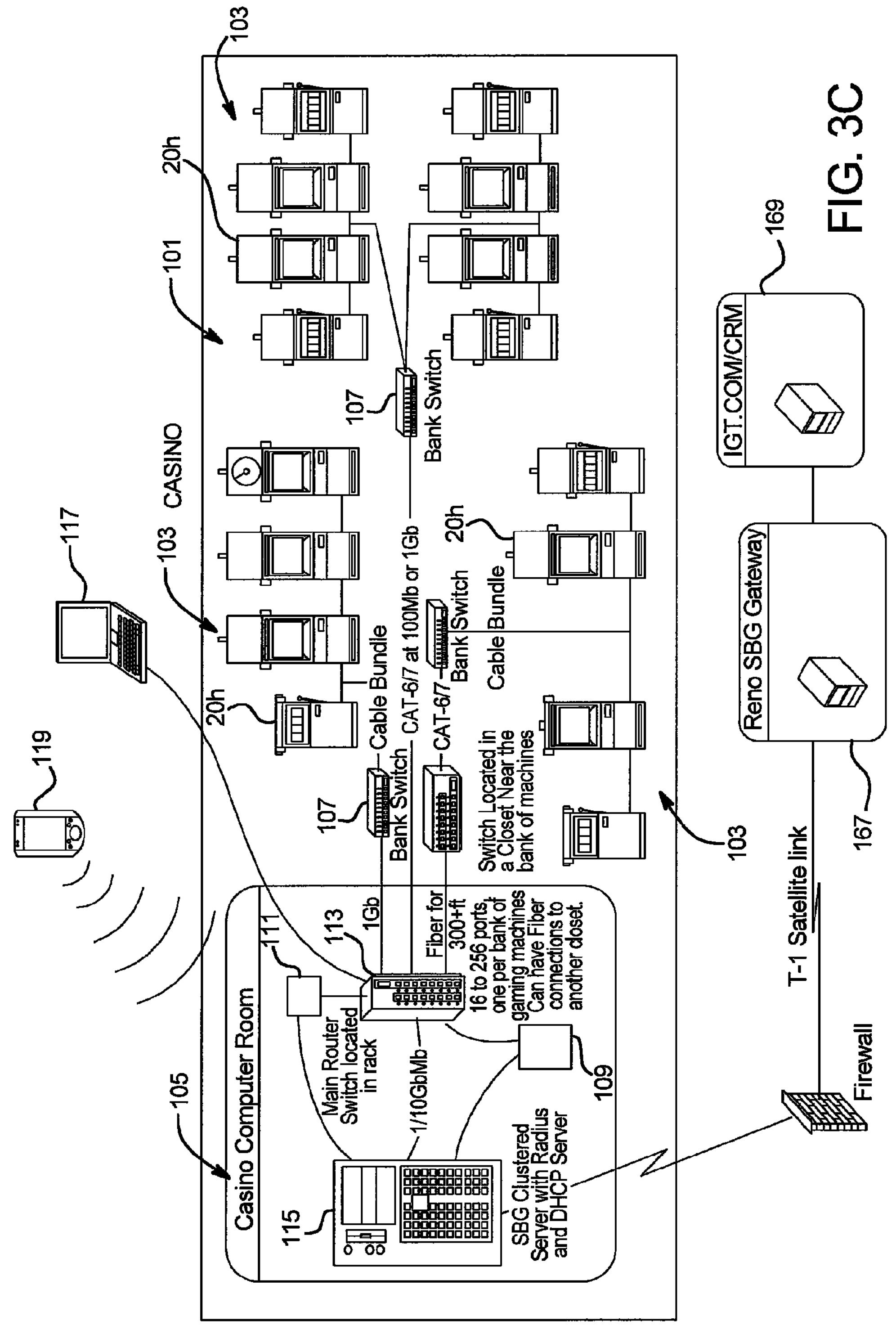
FIG. 3C is a diagram that illustrates one embodiment of a network topology of the disclosed gaming system.

FIG. 3C illustrates one alternative embodiment of a network topology. In one embodiment, the gaming establishment or casino includes a plurality electronic gaming modules or player stations 20*h* which in the illustrated embodiment are gaming machines, each of which is part of a bank 103 of a plurality of player stations 20*h* or part of a gaming system including a central display as shown in FIGS. 1A, 1D, 1E and 4A, 4B and 4C. It should be appreciated that many gaming establishments include hundreds or even thousands of player stations 20*h* not all of which are included in a bank 103 or are affiliated with the central display 10. However, the present disclosure may be implemented in gaming establishments having any number of gaming machines or player stations.

Various alternative network topologies can be used to implement different aspects of the disclosure and/or to accommodate varying numbers of networked devices. For example, gaming establishments with very large numbers of player stations may require multiple instances of some network devices (e.g., of main network device 113, which combines switching and routing functionality in this example) and/or the inclusion of other network devices not shown in FIG. 3C. For example, certain implementations of the present disclosure include one or more middleware servers disposed between player stations 20*h* and server-based gaming (“SBG”) server 115. Such middleware servers can provide various useful functions, including but not limited to the filtering and/or aggregation of data received from bank switches, from individual gaming machines and from other player terminals or stations. Some embodiments of the present disclosure include load balancing methods and devices for managing network traffic.

In one embodiment, each bank 103 has a corresponding bank switch 107, which may be a conventional bank switch. In one embodiment, each bank switch and gaming wall server 16 is connected to a SBG server 115 via a main network device or central controller 113, which combines switching and routing functionality in this example. Although various floor communication protocols may be used, some embodiments use an open, Ethernet-based protocol. However, other protocols such as Best of Breed ("BOB") may be used to implement various aspects of SBG. In one embodiment, a gaming-industry-specific transport layer called CASH executes on top of TCP/IP and offers additional functionality and security.

In one embodiment, the SBG server 115, a license manager (not illustrated), an arbiter 109 and a main network device 113 are disposed within a computer room 105 of a gaming establishment. The central display server 16 may also be included in the computer room. The license manager may be implemented, at least in part, via a server or a similar device.

For example, the central controller 66 may include the plurality of different servers and routers to control one or more functions of the central display or player stations. The central controller 66 can be configured to implement or perform the functions of the other servers, such as the SBG server 115 and the central display server 16. In one embodiment, the SBG server 115 can be configured to implement, at least in part, various aspects of the present disclosure. For example, the SBG server 115 can be configured to perform some or all of the functions of the central display server 16. Certain embodiments of the SBG server 115 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some embodiments of the disclosure provide one or more of these servers in the form of blade servers.

In some embodiments of the gaming system, many of these devices (including but not limited to the license manager, the main network device 113, and the central display server 16) are mounted in a single rack with the SBG server 115. Accordingly, many or all of such devices are sometimes herein referenced in the aggregate as an SBG server or the central controller. However, in alternative implementations, one or more of these devices is in communication with SBG server 115 but located elsewhere such as at a central display or a seating area. For example, some of the devices could be mounted in separate racks within a computer room or located elsewhere on the network. For example, it can be advantageous to store large volumes of data elsewhere via a storage area network ("SAN").

In certain embodiments, these components are of the central controller or the SBG server preferably has an uninterruptible power supply ("UPS"). The UPS may be, for example, a rack-mounted UPS module.

The computer room 105 may include one or more operator consoles or other host devices that are configured for communication with the SBG server 115. Such host devices may be provided with software, hardware and/or firmware for implementing various aspects of the disclosure; many of these aspects involve controlling the SBG server 115. However, such host devices need not be located within computer room 105. The wired host device 117 (which is a laptop computer in this example) and wireless host device 119 (which is a PDA in this example) may be located elsewhere in the gaming establishment or at a remote location.

In one embodiment, the arbiter 109 is implemented via software that is running on a server or another networked device. In one embodiment, the arbiter 109 serves as an intermediary between different devices on the network. In some embodiments, the arbiter 109 is a repository for the configuration information required for communication between devices on the gaming network 101 and, in some embodiments, devices outside the gaming network.

Figure 3D:
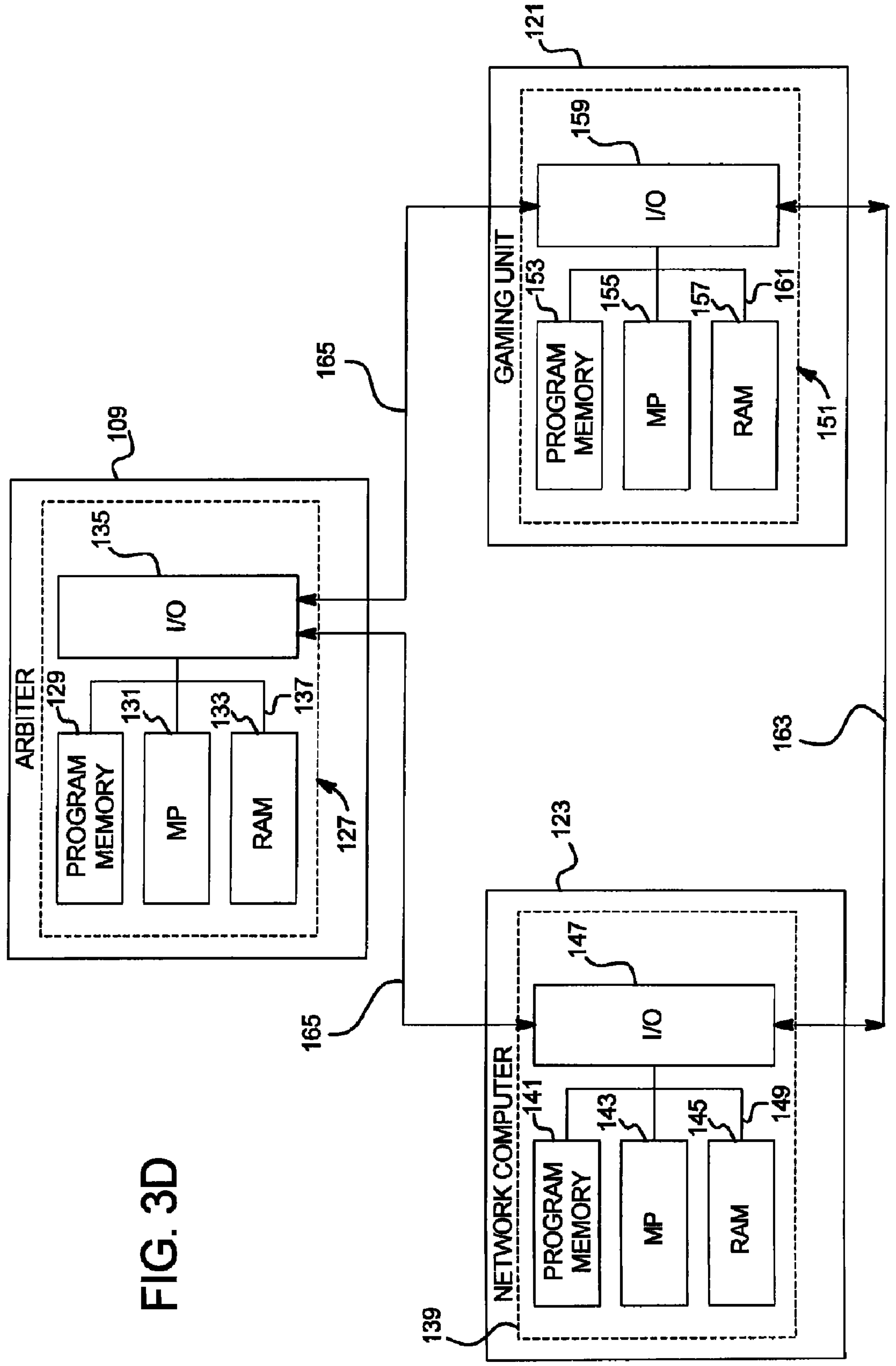
FIG. 3D is a block diagram that illustrates a simplified network topology including some implementations of an arbiter.

FIG. 3D is a block diagram of one embodiment of a simplified communication topology between a gaming unit, player station 121, such as a gaming device, a network computer 123 and an arbiter 109. Although only one gaming unit 121, one network computer 123 and one arbiter 109 are shown in FIG. 3D, it should be appreciated that the following examples or embodiments may be applicable to different types of devices within the gaming network 101 beyond the gaming unit 121 and the network computer 123 and may include different quantities of network computers, gaming security arbiters and gaming units including electronic gaming machines in a gaming wall. For example, a single arbiter 109 may be used for secure communications among a plurality of network computers 123 and tens, hundreds or thousands of gaming units 121. Likewise, multiple gaming security arbiters may be utilized for improved performance and other scalability factors.

Referring to FIG. 3D, in one embodiment, the arbiter 109 includes an arbiter controller 127 that may comprise a program memory 129, a microcontroller or microprocessor (MP) 131, a random-access memory (RAM) 133 and an input/output (I/O) circuit 135, all of which may be interconnected via an address/data bus 137. The network computer 123 may also include a controller 139 that may comprise a program memory 141, a microcontroller or microprocessor (MP) 143, a random-access memory (RAM) 145 and an input/output (I/O) circuit 147, all of which may be interconnected via an address/data bus 149. The gaming unit 121 may include a controller 151, a program memory 153, a microcontroller or microprocessor (MP) 155, a random-access memory (RAM) 157 and an input/output (I/O) circuit 159, all of which may be interconnected via an address/data bus 161.

It should be appreciated that although the arbiter 109, the gaming unit 121 and the network computer 123 are each shown with only one microprocessor, in different embodiments, the controllers may each include multiple microprocessors. Similarly, the memory of the controllers may include multiple RAMs and multiple program memories. Although the I/O circuits are each shown as a single block, it should be appreciated that the I/O circuits may include a number of different types of I/O circuits. The RAMs and program memories may be implemented as semiconductor memories, magnetically readable memories, and/or optically readable memories, for example.

Although the program memories are shown in FIG. 3D as read-only memories (ROM) the program memories of the controllers are illustrated in FIG. 3D may be a read/write or alterable memory, such as a hard disk. In the event a hard disk is used as a program memory, the address/data buses shown schematically may each comprise multiple address/data buses, which may be of different types, and there may be an I/O circuit disposed between the address/data buses.

As shown in FIG. 3D, in one embodiment, the gaming unit 121 is operatively coupled to the network computer 123 via the data link 163. The gaming unit 121 may also be operatively coupled to the arbiter 109 via the data link 165, and the network computer 123 may likewise be operatively coupled to the arbiter 109 via the data link 165. It should be appreciated that communications between the gaming unit 121 and the network computer 123 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings), game download information (e.g., game software and game licensing information) and personal information (e.g., social security number, personal preferences) may be encrypted with stronger encryption techniques such as DES or 3DES to provide increased security.

In one embodiment, the arbiter verifies the authenticity of each network player station. The arbiter may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The arbiter may provide encryption keys (session keys) for the communication session to the client via the secure communication channel. Either the host and/or the session key may be provided in response to the request, or may have been previously provided. The client may contact the host to initiate the communication session. The host may then contact the arbiter to determine the authenticity of the client. The arbiter may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the arbiter may contact the host regarding the request and provide corresponding session keys to both the client and the host. The arbiter may then initiate either the client or the host to begin their communication session. In turn, the client and host may begin the communication session directly with each other using the session keys to encrypt and decrypt messages.

In one embodiment, one or a plurality of wireless device manage a gaming network. Such wireless devices, may include, but are not limited to, laptops, PDAs or even cellular telephones. Referring to FIG. 3C, one or more network devices in a gaming establishment can be configured as wireless access points. For example, a casino manager may use a wireless handheld device to revise and/or schedule gaming machine configurations while roaming the casino floor. Similarly, a representative of a regulatory body could use a PDA to for any suitable purpose including but not limited to verify gaming machine configurations, generate reports, and view activity logs, while on the casino floor.

If a host device is located in a remote location, in one embodiment, security methods and devices (such as firewalls, authentication and/or encryption) are deployed in order to prevent the unauthorized access of the gaming network. Similarly, any other connection between gaming network and the outside world should only be made with trusted devices via a secure link, e.g., via a virtual private network ("VPN") tunnel. For example, as illustrated in FIG. 3C, the illustrated connection between the SBG sever 115, a gateway 167 and central system 169 (in one embodiment illustrated here, IGT.com) that may be used for game downloads, etc., is advantageously made via a VPN tunnel.

In one embodiment, an Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc.

For security purposes, any information transmitted to or from a gaming establishment over a public network may be encrypted. In one embodiment, the information may be symmetrically encrypted using a symmetric encryption key, where the symmetric encryption key is asymmetrically encrypted using a private key. The public key may be obtained from a remote public key server. In one embodiment, the encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

In one embodiment, providing a secure connection between the local devices of the SBG system and a central system facilitates the deployment of many features. For example, a customer (e.g., an employee of a gaming establishment) can log onto an account of central system (in this illustrated embodiment, IGT.com) to obtain the account information such as the customer's current and prior account status.

In one embodiment, such a secure connection may be used by the central system to collect information regarding a customer's system. Such information includes, but is not limited to, error logs for use in diagnostics and troubleshooting. Some embodiments of the disclosure enable a central system to collect other types of information, e.g., information about the usage of certain types of gaming software, revenue information regarding certain types of games and/or gaming machines for example. In different embodiments, such information includes, but is not limited to, information regarding the revenue attributable to particular games at specific times of day, days of the week. Such information may be obtained, at least in part, by reference to an accounting system of the gaming network(s).

In one embodiment, automatic updates of a customer's SBG server is be enabled. For example, the central system notifies a local SBG server regarding new products and/or product updates. For example, the central system notifies a local SBG server regarding updates of new gaming software, gaming software updates, peripheral updates, the status of current gaming software licenses, etc. In some embodiments, the central system notifies a local SBG server (or another device associated with a gaming establishment) that an additional theme-specific data set and/or updates for a previously-downloaded global payout set are available. Alternatively, such updates may be automatically provided to the local SBG server and downloaded to networked gaming machines or player stations.

In one embodiment, after the local SBG server receives this information, it is operable to identify relevant products of interest. For example, the local SBG server identifies gaming software that is currently in use (or at least licensed) by the relevant gaming entity and send a notification to one or more host devices, e.g., via email. In one embodiment, if an update or a new software product is desired, it can be downloaded from the central system.

In one embodiment, secure communication links enable notifications to be sent securely from a local SBG server to host devices outside of a gaming establishment. For example, a local SBG server is configured to transmit automatically generated email reports, and text messages, based on predetermined events that will sometimes be referred to herein as "triggers." Such triggers can include, but are not limited to, the condition of a gaming machine door being open, cash box full, the player station not responding, or verification failure.

In addition, in different embodiments, providing secure connections between different gaming establishments enables other implementations of gaming systems at lower costs. For example, a number of gaming establishments, each with a relatively small number of gaming machines, may be owned and/or controlled by the same entity. In such situations, having secure communications between gaming establishments makes it possible for a gaming entity to use a single SBG server as an interface between central system and the gaming establishments.

Figure 3E:
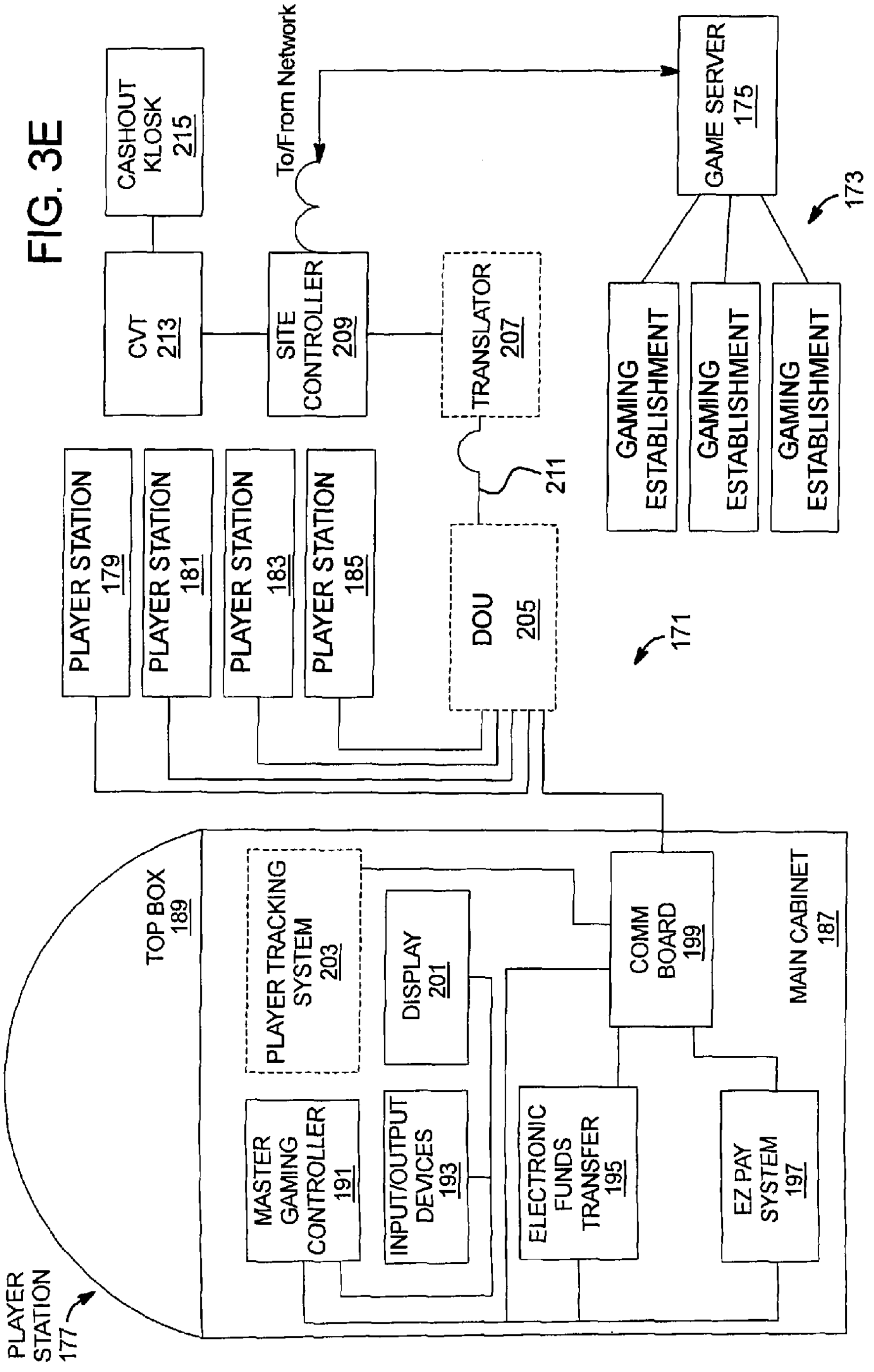
FIG. 3E is a diagram that illustrates one embodiment of a network of the disclosed gaming system.

An alternative embodiment of a gaming network configuration that may be used to implement additional methods performed in accordance with the disclosure is illustrated in FIG. 3E. Gaming establishment 171 may be any type of gaming establishment, such as a casino, a card room, an airport, or a store. In this example, gaming network 173 includes more than one gaming establishment, all of which are networked to a game server or central controller 175.

In the illustrated embodiment, the player station 177, and the other player stations 179, 181, 183 and 185 include a main cabinet 187 and a top box 189. In one embodiment, the main cabinet 187 houses the main gaming elements and can also house peripheral systems, such as those that utilize dedicated gaming networks. The top box may also be used to house these peripheral systems.

In one embodiment, the player station 177 includes a master gaming controller 191 which controls the game play on the player station 171 according to instructions and/or game data from game server 175 or stored within player station 177 and receives or sends data to various input/output devices 193 on the player station 177. In one embodiment, master gaming controller 191 includes processor(s) and other apparatus of the player station systems. In one embodiment, the master gaming controller 191 communicates with a display device 201.

In one embodiment, a particular gaming entity may desire to provide network gaming services that provide some operational advantage. Thus, dedicated networks or subnets may connect player stations to host servers that track the performance of player stations under the control of the entity, such as for accounting management, electronic fund transfers (EFTs), cashless ticketing, such as EZPay™, marketing management, and data tracking, such as player tracking. Therefore, master gaming controller 191 may also communicate with EFT system 195, EZPay™ system 197, a proprietary cashless ticketing system, and player tracking system 203. In one embodiment, the systems of the player station 177 communicate the data onto the network 173 via a communication board 199.

It will be appreciated that embodiments of the present disclosure may be implemented on a network with more or fewer elements than are depicted in FIG. 3E. For example, a player tracking system is not a necessary feature of some implementations of the present disclosure. However, player tracking programs may help to sustain a game player's interest in additional game play during a visit to a gaming establishment and may entice a player to visit a gaming establishment to partake in various gaming activities.

In one embodiment, the gaming system includes a DCU 205 and translator 207. The DCU and the translator are not required for all gaming establishments 171. However, due to the sensitive nature of much of the information on a gaming network (e.g., electronic fund transfers and player tracking data) the manufacturer of a host system may employ a particular networking language having proprietary protocols. For example, 10-20 different companies produce player tracking host systems where each host system may use different protocols. These proprietary protocols are usually considered highly confidential and not released publicly.

Further, in the gaming industry, gaming machines and player stations are made by many different manufacturers. The communication protocols on the player station may be hard-wired into the player station and each player station/gaming machine manufacturer may utilize a different proprietary communication protocol. A player station manufacturer may also produce host systems, in which case their player stations are compatible with their own host systems. However, in a heterogeneous gaming environment, player stations from different manufacturers, each with its own communication protocol, may be connected to host systems from other manufacturers, each with another communication protocol. Therefore, communication compatibility issues regarding the protocols used by the player stations in the system and protocols used by the host systems must be considered.

A network device that links a gaming establishment with another gaming establishment and/or a central system will sometimes be referred to herein as a "site controller." In the illustrated embodiment, site controller 209 provides this function for gaming establishment 171. Site controller 209 is connected to a central system and/or other gaming establishments via one or more networks, which may be public or private networks. Among other things, site controller 209 communicates with game server 175 to obtain game data, such as ball drop data, bingo card data, etc.

In the present illustration, player stations 177, 179, 181, 183, and 185 are connected to a dedicated gaming network 173. In one embodiment, the DCU 205 functions as an intermediary between the different player stations on the network 173 and the site controller 209. In one embodiment, the DCU 205 receives data transmitted from the player stations and sends the data to the site controller 209 over a transmission path 211. In some embodiments, when the hardware interface used by the player station is not compatible with site controller 209, a translator 207 may be used to convert serial data from the DCU 205 to a format accepted by site controller 209. The translator may provide this conversion service to a plurality of DCUs.

Further, in some embodiments, the DCU 205 can receive data transmitted from site controller 209 for communication to the player stations on the gaming network. The received data may be, for example, communicated synchronously to the player stations on the gaming network.

In one embodiment, as illustrated in FIG. 3E, CVT 213 provides cashless and cashout gaming services to the player stations in gaming establishment 171. In one embodiment, the CVT 213 authorizes and validates cashless player station instruments (also referred to herein as "tickets" or "vouchers"), including but not limited to tickets for causing a player station to display a game result and cash-out tickets. In one embodiment, the CVT 213 authorizes the exchange of a cash-out ticket for cash. In one example, when a player attempts to redeem a cash-out ticket for cash at cashout kiosk 215, cash out kiosk 215 reads validation data from the cashout ticket and transmits the validation data to CVT 213 for validation. The tickets may be printed by player stations, by cashout kiosk 215, by a stand-alone printer, by CVT 213, or by any other suitable device. In some embodiments, a cashout ticket is redeemed for cash by a cashier (e.g., of a convenience store), by a player station or by a specially configured CVT.

Figure 3F:
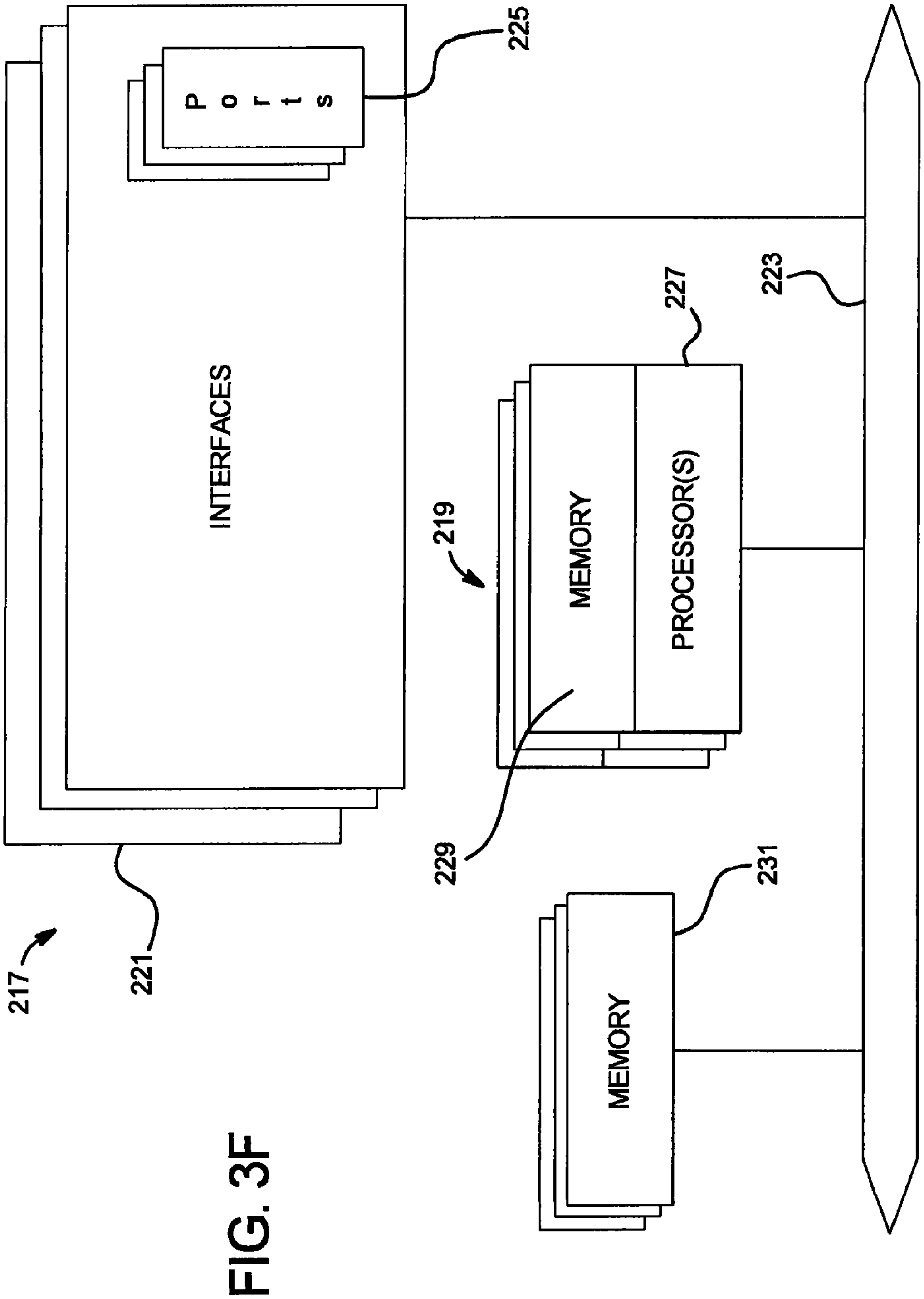
FIG. 3F illustrates one embodiment of a network device.

FIG. 3F illustrates one embodiment of a network device 217 that includes a master central processing unit (CPU) 219, a plurality of interfaces 221, and a bus 223 (e.g., a PCI bus). Generally, the interfaces 221 include ports 225 appropriate for communication with the appropriate media. In some embodiments, one or more of interfaces 221 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 221 control such communications-intensive tasks as encryption, decryption, compression, decompression, packetization, media control and management. By providing separate processors for the communications-intensive tasks, interfaces 221 allow the master central processing unit 219 efficiently to perform other functions such as routing computations, and network diagnostics, security functions.

In some embodiments, the interfaces 221 are provided as interface cards (sometimes referred to as "linecards"). In some embodiments, the interfaces 221 control the sending and receiving of data packets over the network and sometimes support other peripherals used with the network device 221. In various embodiments, the interfaces that may be provided include FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the disclosure, the CPU 219 may be responsible for implementing specific functions associated with the functions of a desired network device. According to some embodiments, CPU 219 accomplishes all these functions under the control of software including an operating system and any appropriate applications software.

In one embodiment, the CPU 219 includes one or more processors 227. In an alternative embodiment, the processor 227 is specially designed hardware for controlling the operations of network device 217. In one embodiment, a memory 229 (such as non-volatile RAM and/or ROM) also forms part of CPU 219. However, there are many different ways in which memory could be coupled to the system. In one embodiment, memory block 229 is used for a variety of purposes such as, for example, caching and/or storing data, programming instructions, etc.

Regardless of the network device's configuration, in various embodiments, the network device may employ one or more memories or memory modules (such as, for example, memory block 231) configured to store data, program instructions for the general-purpose network operations and/or other information relating to the functionality of the techniques described herein. The program instructions may control the operation of an operating system and/or one or more applications, for example.

Information and program instructions may be employed to implement the systems/methods described herein. In various embodiments, the present disclosure relates to machine-readable media that include program instructions, state information, etc. for performing various operations described herein. The machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The gaming system programs may embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although many of the components and processes are described above in the singular for convenience, it should be appreciated that multiple components and may be repeated. Although the system shown in FIG. 3F, illustrates one specific network device of the present disclosure, it is by no means the only network device architecture on which the various embodiments of the present disclosure can be implemented. For example, in one embodiment, an architecture having a single processor handles communications as well as routing computations. Further, other types of interfaces and media could also be used with the network device. The communication path between interfaces may be bus based or switch fabric based (such as a cross-bar) processes can also be used to practice the techniques of the present disclosure.

In another embodiment, a plurality of player stations at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve player stations distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the player station hardware and software and the host site computer. In one embodiment, an individual player station may trigger a progressive win, for example through a game play event such as a symbol-driven trigger in the multi-component game. In one embodiment, the central server or other central controller determines when a progressive win is triggered. In one embodiment, a central controller and an individual player station work in conjunction with each other to determine when a progressive win is triggered, for example through an individual player station meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a player station is randomly or apparently randomly selected to provide a player of that player station one or more progressive awards. In one such embodiment, the player station does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the players' wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a player station to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked player stations in a gaming system participate in a group gaming environment. In one embodiment, a plurality of players at a plurality of linked player stations work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked player stations compete against one another for one or more awards. In one such embodiment, a plurality of players at a plurality of linked player stations participate in a gaming tournament for one or more awards. In another embodiment, a plurality of players at a plurality of linked player stations play for one or more awards wherein an outcome generated by one player station affects the outcomes generated by one or more linked player stations.

Figure 4A:
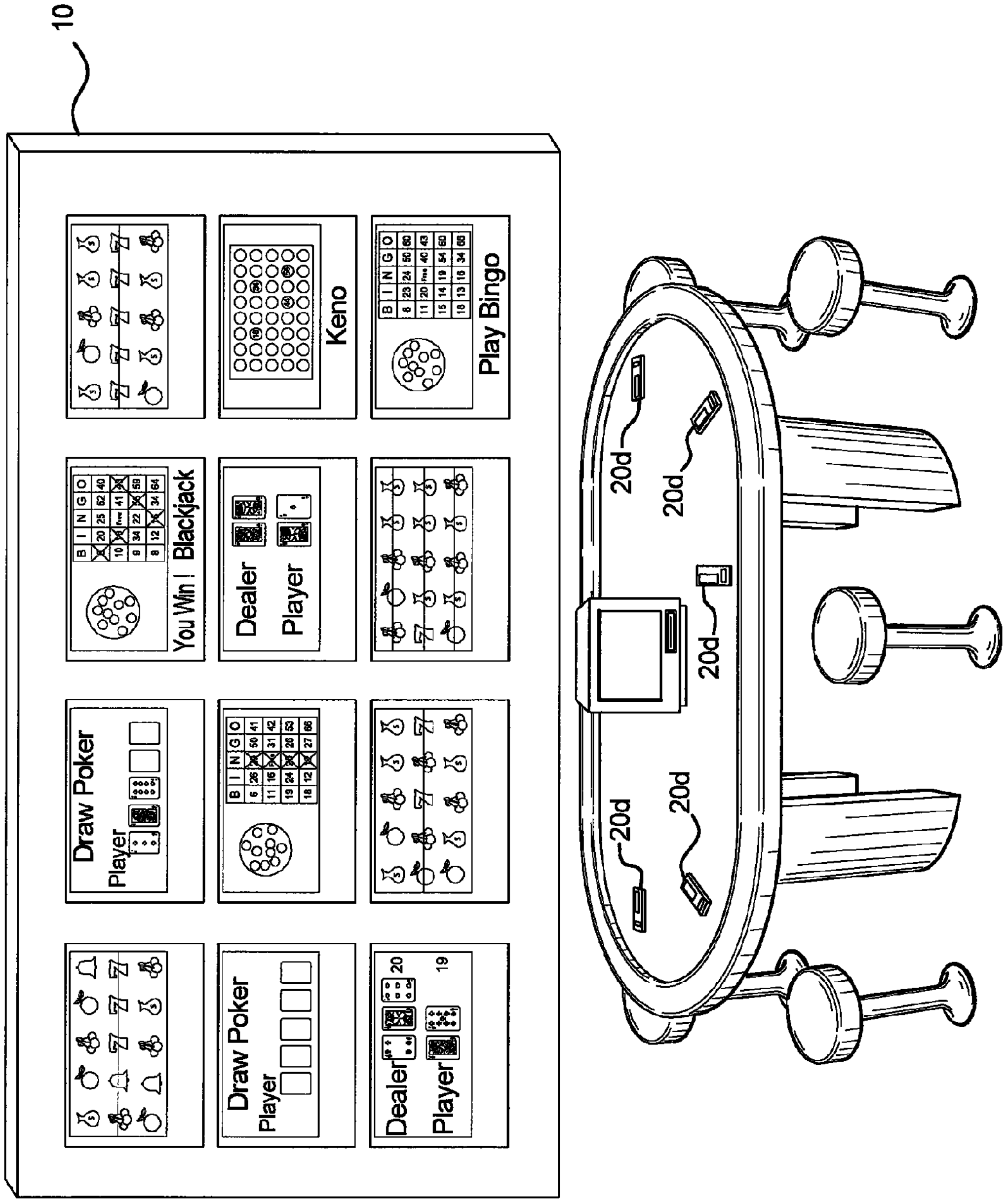
FIGS. 4A, 4B, and 4C are perspective views of different embodiments of the player stations and seating areas of the disclosed gaming system that include a central display and a multiple player stations.

As illustrated in FIG. 4A, the gaming system of the present disclosure may be implemented in any suitable manner. In FIG. 4A, the central display 10 includes a plurality of display segments. The display segments may display games or any suitable advertisement or attract sequence. As illustrated in this embodiment, a plurality of player stations 20*d* may be associated with seats or locations around a table. In one embodiment, the player station includes a remote control or a remote device or wireless device.

It should be appreciated that any player station may include any of the elements of any input device. In one embodiment, the player stations are associated with a payment acceptor or an account which keeps a balance or a number of credits maintained for the players. In this illustrated embodiment, each of the players shares the same payment acceptor. It should be appreciated that while only one table is displayed in FIG. 4A, the present disclose may include multiple smaller tables such as those found in lounges. The present disclosure enables players to play the gaming system in a more relaxed atmosphere. In one embodiment, the present disclosure is implemented through a plurality of connected hand-held player stations or connected hand held player stations at a plurality of different locations.

Figure 4B:
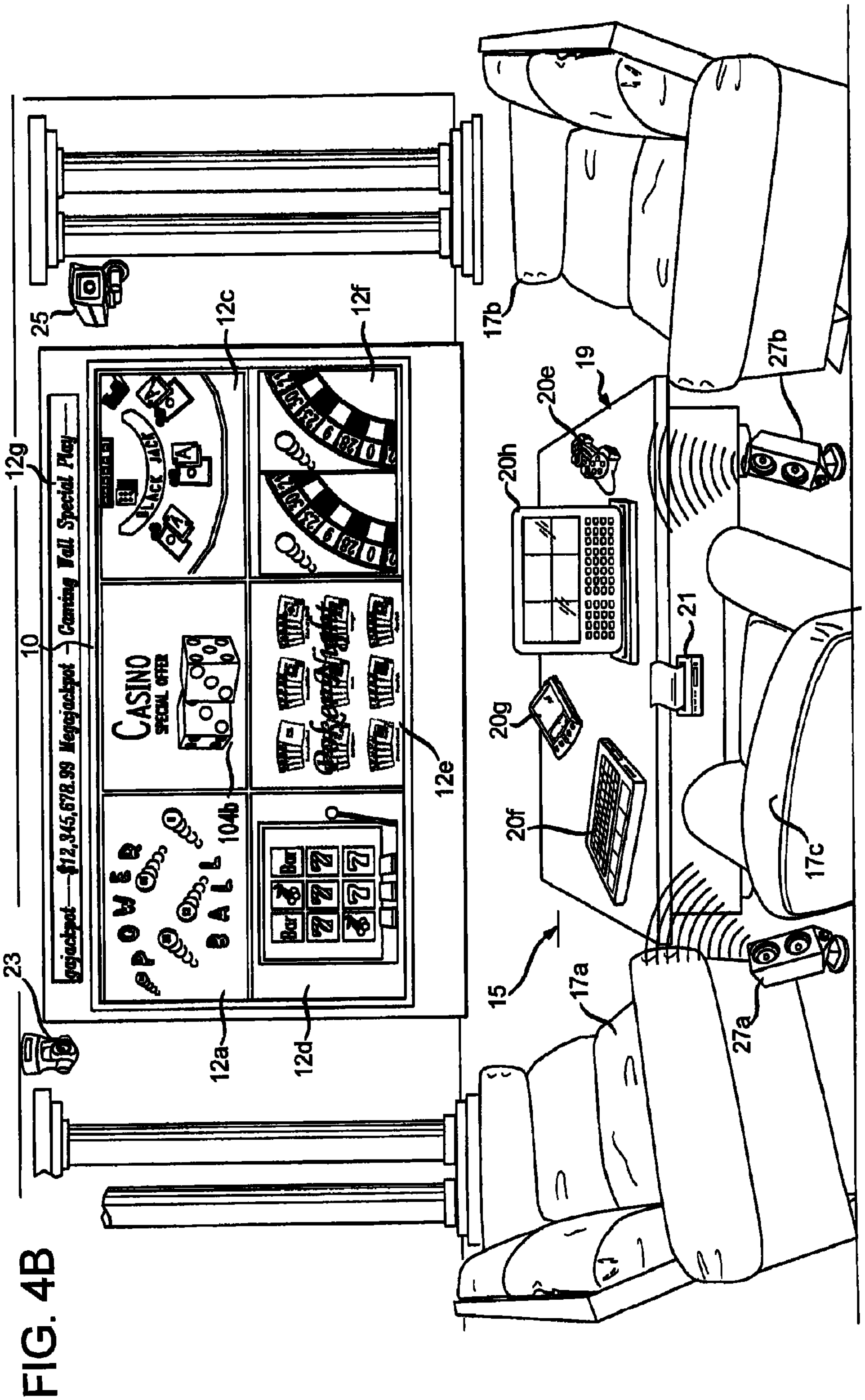

FIG. 4B, illustrates another configuration of the central display 10 which includes a plurality of display segments 12*a*, 12*b*, 12*c*, 12*d*, 12*e*, 12*f*, and 12*g*. The display segments may include any suitable type of display device including but not limited to a television display, a plasma display, an LCD display, a display based on LED, a display based on organic LEDs (OLEDs), a display based on polymer LEDs, a display including a projected or reflected image or any other type of monitor utilizing any suitable and feasible technology, and combinations thereof. For example, display segment 12*a* can include an LCD screen and display segment 12*d* can include a plasma screen. In another embodiment, each of the display segments may include a touch-screen with an associated touch-screen controller. In the illustrated embodiment, the central display 10 is physically embedded or encased in a structural wall. In another embodiment, central display 10 is a standalone structure not supported by a structural wall. In another embodiment, the central display 10 is suspended from the ceiling.

In the illustrated embodiment of FIG. 4B, a seating area 15 includes various types of seating: a plurality of sofas 17*a* and 17*b* and a recliner-type chair 17*c*. The seating area includes a table 19. A plurality of different player stations 20*e*, 20*f*, 20*g*, and 20*h* are located on the table. The player stations include a larger tablet touch screen control 20*e*, a hand-held video game style control 20*f*, a keypad 20*g* and a touch-screen PDA style control 20*h*. The seating area 15 may include any suitable gaming system elements such as a bill acceptor and card reader. These components can also be on or encased in table 19 such as ticket printer 21. Other peripherals such as video camera 23 and digital camcorder 25 can also be connected to the central display 10. In one embodiment, the seating area 15 includes speakers 27*a* and 27*b* for audio output. It should be appreciated that the seating area 15 may include any suitable number of tables, number of and type of seats and any suitable number of and type of player stations.

Figure 4C:
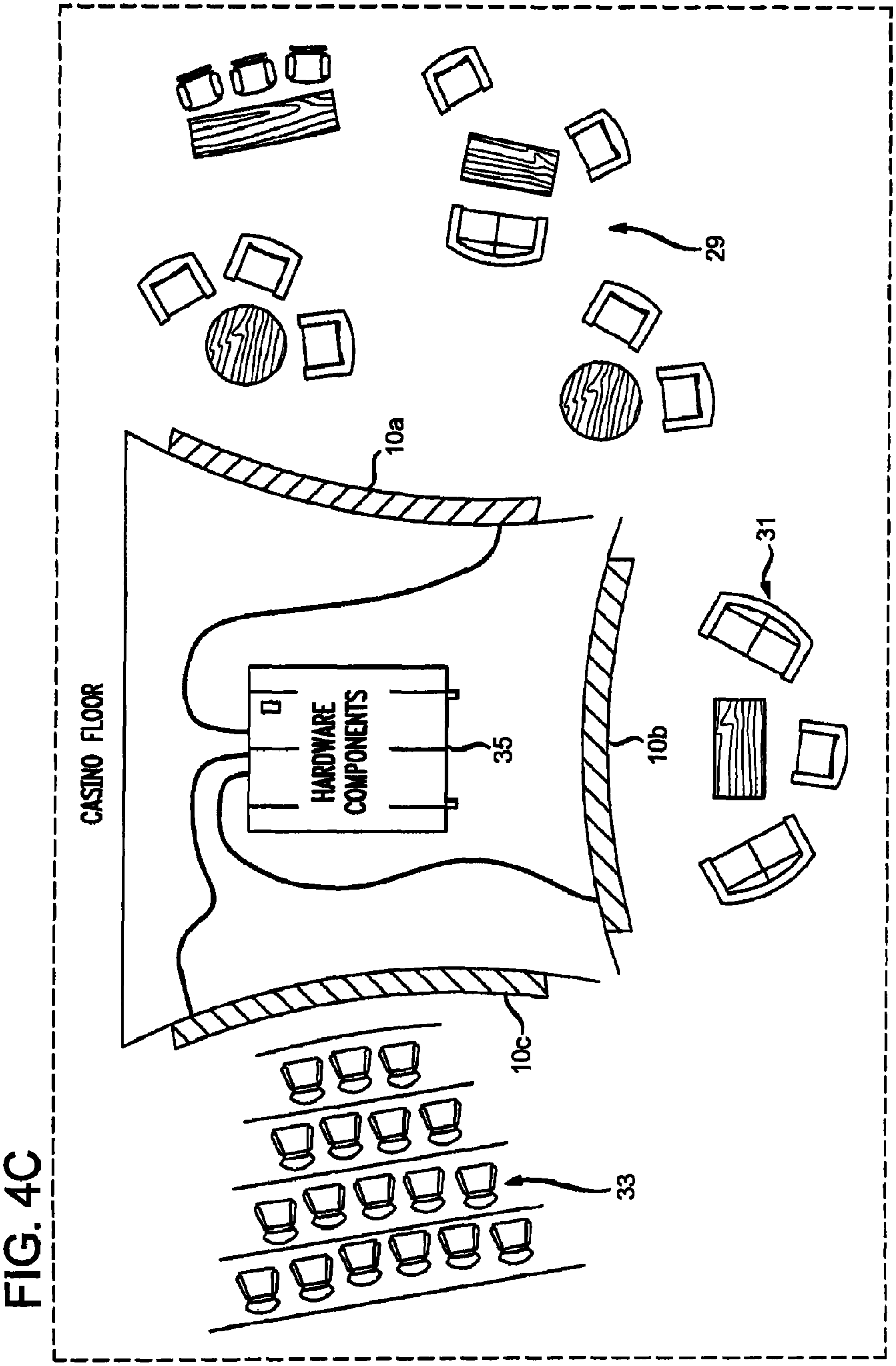

FIG. 4C illustrates another embodiment of the gaming system which includes a plurality of central displays 10_a_, 10_b_ and 10_c_. There are a plurality of seating variations of the configuration shown in FIG. 4B. As illustrated in FIG. 4C each seating area 29, 31 and 33 is associated with a different one of the central displays 10_a_, 10_b_ and 10_c_, respectively. It should be appreciated that the seating areas may be configured in any suitable manner. It should also be appreciated that the gaming system may include any suitable of central displays displayed in any suitable layout.

It should be appreciated that the player stations may be configured in any suitable format. In one embodiment, the central display is on a certain level and one or more rows of chairs are on more than one level. For example, the gaming system includes a central display including a plurality of display segments and a player station to insert a wager, select a chair and for any other suitable usage. The gaming system includes a plurality of rows of stadium style chairs. That is, the rows of chairs are on different levels such that every player may view the central display. The chairs may include one or more input devices or each chair may be a player station including one or more input devices, a display device and any other suitable apparatus. In another embodiment, the gaming system includes a plurality of different types of seating that are awarded to players based on predetermined criteria. In one such embodiment, the gaming system includes one or more designated seats or player stations such as recliners. The gaming system enables the players to sit in the designated seats based on criteria, such as who has played the longest. In one embodiment, the players move player stations or designated seats based on one or more designated criteria. For example, the gaming system enables the player with the highest player ranking to sit in a special reclining chair. In one such embodiment, the player is also enabled to control a group interactive game. It should be appreciated that the gaming system may enable any player to sit at any designated seat for any suitable reason or according to any suitable criterion.

It should be appreciated that any combination of the elements of this application may be included in any embodiment of the present disclosure.

Figure 5A:
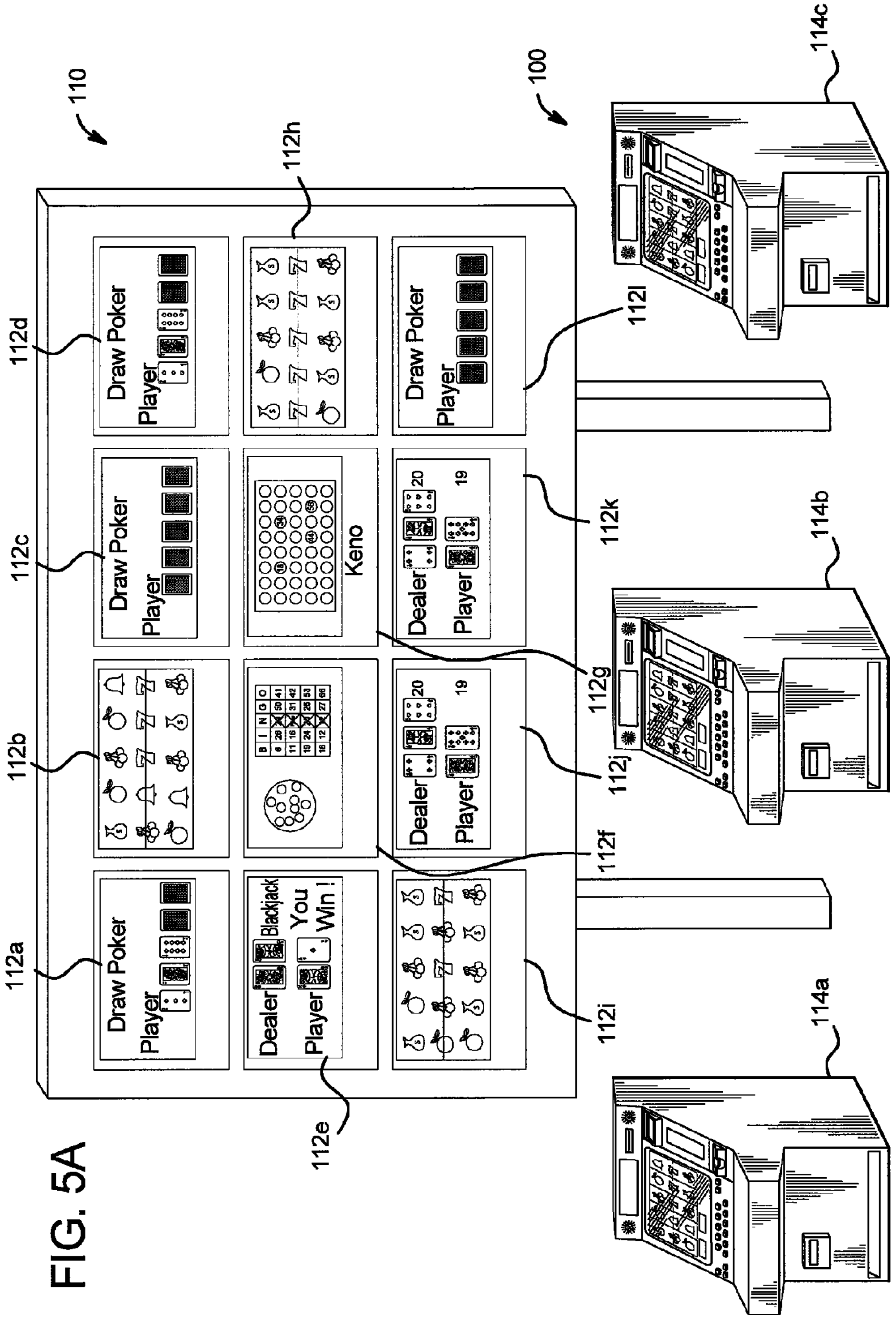
FIGS. 5A, 5B, 5C, and 5D are perspective views of one multi-player individual game play embodiment of the disclosed gaming system that includes a plurality of player stations and a central display.

In one embodiment, the gaming system enables a plurality of players to individually play one or more games on one or more of the display segments of the central display. As illustrated in FIG. 5A, the gaming system 100 includes a central display 110 which includes a plurality of display segments 112_a_, 112_b_, 112_c_, 112_d_, 112_e_, 112_f_, 112_g_, 112_h_, 112_i_, 112_j_, 112_k_ and 112l. The gaming system includes a plurality of player stations 114_a_, 114_b_, and 114_c_ and a central controller. In this illustrated embodiment, the player stations are a plurality of stand alone player stations. However, it should be appreciated the gaming system may include any suitable type of player station and any suitable number of playing stations. In one embodiment, if there are more players than player stations, multiple players may use the same player station.

In the illustrated embodiment, each of the display segments 112_a_, 112_b_, 112_c_, 112_d_, 112_e_, 112_f_, 112_g_, 112_h_, 112_i_, 112_j_, 112_k_ and 112l displays a single game. For example the upper-left display segment 112_a_ displays a draw poker game and the lower-left display segment 112_i_ displays a slot game.

The gaming system of the present disclosure can incorporate any suitable wagering base or primary game and/or bonus or secondary game that may be displayed on the central display and/or on one or more player station. The primary or base game may comprise any suitable reel-type game, card game, cascading or falling symbol game, number game or other game of chance susceptible to representation in an electronic or electromechanical form which produces a random outcome based on probability data at the time or after placement of a wager. That is, different primary wagering games, such as video poker games, video blackjack games, video keno, video bingo or any other suitable primary or base game may be implemented. The primary game may be any suitable interactive game as well, such as video blackjack, video poker (including any of the numerous poker games), video roulette, video baccarat, video craps, alternatives thereof or any other suitable video table game.

In one embodiment, a base or primary game is a slot game with one or more paylines as displayed on upper-left display segment 112_a_. The paylines may be horizontal, vertical, circular, diagonal, angled or any combination thereof. In this embodiment, the display segment includes at least one and preferably a plurality of reels, such as three to five reels in either electromechanical form with mechanical rotating reels or video form with simulated reels and movement thereof. in one embodiment, an electromechanical display segment includes a plurality of adjacent, rotatable reels which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images which preferably correspond to a theme associated with the display segment. In another embodiment, one or more of the reels are independent reels or unisymbol reels. In this embodiment, each independent or unisymbol reel generates and displays one symbol to the player. In one embodiment, the player station awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the player station or the central controller determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the player station provides the player one award for that occurrence of the generated winning symbol combination. For example, if one winning symbol combination is generated on the reels, the player station will provide a single award to the player for that winning symbol combination (i.e., not based on the number of paylines that would have passed through that winning symbol combination). It should be appreciated that because a player station with wagering on ways to win provides the player one award for a single occurrence of a winning symbol combination and a player station with paylines may provide the player more than one award for the same occurrence of a single winning symbol combination (i.e., if a plurality of paylines each pass through the same winning symbol combination), it is possible to provide a player at a ways to win player station with more ways to win for an equivalent bet or wager on a traditional slot player station with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the player station with at least one symbol generated in an active symbol position. For example, a three reel player station with three symbols generated in active symbol positions on each reel includes 27 ways to win (i.e., 3 symbols on the first reel×3 symbols on the second reel×3 symbols on the third reel). A four reel player station with three symbols generated in active symbol positions on each reel includes 81 ways to win (i.e., 3 symbols on the first reel×3 symbols on the second reel×3 symbols on the third reel×3 symbols on the fourth reel). A five reel game with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the player station enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the player station uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the player station provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the player station provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the player station individually determines if a symbol generated in an active symbol position on a first reel forms part of a winning symbol combination with or is otherwise suitably related to a symbol generated in an active symbol position on a second reel. In this embodiment, the player station classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the player station classifies the two cherry symbols as a string of related symbols because the two cherry symbols form part of a winning symbol combination.

After determining if any strings of related symbols are formed between the symbols on the first reel and the symbols on the second reel, the player station determines if any of the symbols from the next adjacent reel should be added to any of the formed strings of related symbols. In this embodiment, for a first of the classified strings of related symbols, the player station determines if any of the symbols generated by the next adjacent reel form part of a winning symbol combination or are otherwise related to the symbols of the first string of related symbols. If the player station determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the player station adds the related cherry symbol generated on the third reel to the previously classified string of cherry symbols.

On the other hand, if the player station determines that no symbols generated on the next adjacent reel are related to the symbols of the first string of related symbols, the player station marks or flags such string of related symbols as complete. For example, if the first string of related symbols is the string of related cherry symbols and none of the symbols of the third reel are related to the cherry symbols of the previously classified string of cherry symbols, the player station marks or flags the string of cherry symbols as complete.

After either adding a related symbol to the first string of related symbols or marking the first string of related symbols as complete, the player station proceeds as described above for each of the remaining classified strings of related symbols which were previously classified or formed from related symbols on the first and second reels.

After analyzing each of the remaining strings of related symbols, the player station determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the player station marks each of the remaining pending strings of related symbols as complete.

When each of the strings of related symbols is marked complete, the player station compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a game is a poker game as displayed on the middle-left display segment **112*e*** wherein the gaming system enables the player to play a conventional game of video poker and initially deals five cards all face up from a virtual deck of fifty-two card deck. Cards may be dealt as in a traditional game of cards or in the case of the display segment, may also include that the cards are randomly selected from a predetermined number of cards. If the player wishes to draw, the player selects the cards to hold via one or more input device, such as pressing related hold buttons of the player station or via the touch screen of a player station. The player then presses the deal button and the unwanted or discarded cards are removed from the display and the player station deals the replacement cards from the remaining cards in the deck. This results in a final five-card hand. The gaming system compares the final five-card hand to a payout table which utilizes conventional poker hand rankings to determine the winning hands. The gaming system provides the player with an award based on a winning hand and the credits the player wagered.

In another embodiment, the base or primary game is a multi-hand version of video draw poker. In this embodiment, the player station deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a game is a keno game wherein the player station displays a plurality of selectable indicia or numbers on at least one of the display devices. In this embodiment, the player selects at least one or a plurality of the selectable indicia or numbers via an input device such as the touch screen of the player station. The gaming system then displays a series of drawn numbers to determine an amount of matches, if any, between the player's selected numbers and the player station's drawn numbers. The player is provided an award based on the amount of matches, if any, based on the amount of determined matches and the number of numbers drawn.

In another embodiment, the base or primary game is any suitable version of Twenty-One (Blackjack) where a player tries to achieve a hand with a point total 21 or total closer to 21 than the dealer's hand but without exceeding 21. In one embodiment, a player plays at least one hand against at least one hand of a dealer, using at least one conventional deck of 52 playing cards having established numerical values for each playing card pursuant to the applicable rules. In one embodiment, the blackjack game includes dealing two cards to each of the player's hands and two cards to the dealer's hand. In one embodiment, both of the cards are dealt face up and the according to game rules, the player determines whether to "double down," "split pairs," "take insurance" or "surrender." The player is provided an award or outcome based on the dealt hands.

In one embodiment, in addition to winning credits in a base or primary game, the gaming system also gives players the opportunity to win credits or other awards in a bonus or secondary game or bonus or secondary round. The bonus or secondary game enables the player to obtain an award, prize or payout in addition to the award, prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In another embodiment, the player station processor 22 or central server 66 randomly provides the player one or more plays of one or more secondary games. In one such embodiment, the player station does not provide any apparent reasons to the player for qualifying to play a secondary or bonus game. In this embodiment, qualifying for a bonus game is not triggered by an event in or based specifically on any of the plays of any primary game. That is, the player station may simply qualify a player to play a secondary game without any explanation or alternatively with simple explanations. In another embodiment, the player station (or central server) qualifies a player for a secondary game at least partially based on a game triggered or symbol triggered event, such as at least partially based on the play of a primary game.

In one embodiment, the player station includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game; rather they must win or earn entry through play of the primary game thus, encouraging play of the primary game. In another embodiment, qualification of the bonus or secondary game is accomplished through a simple "buy in" by the player for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 5B:
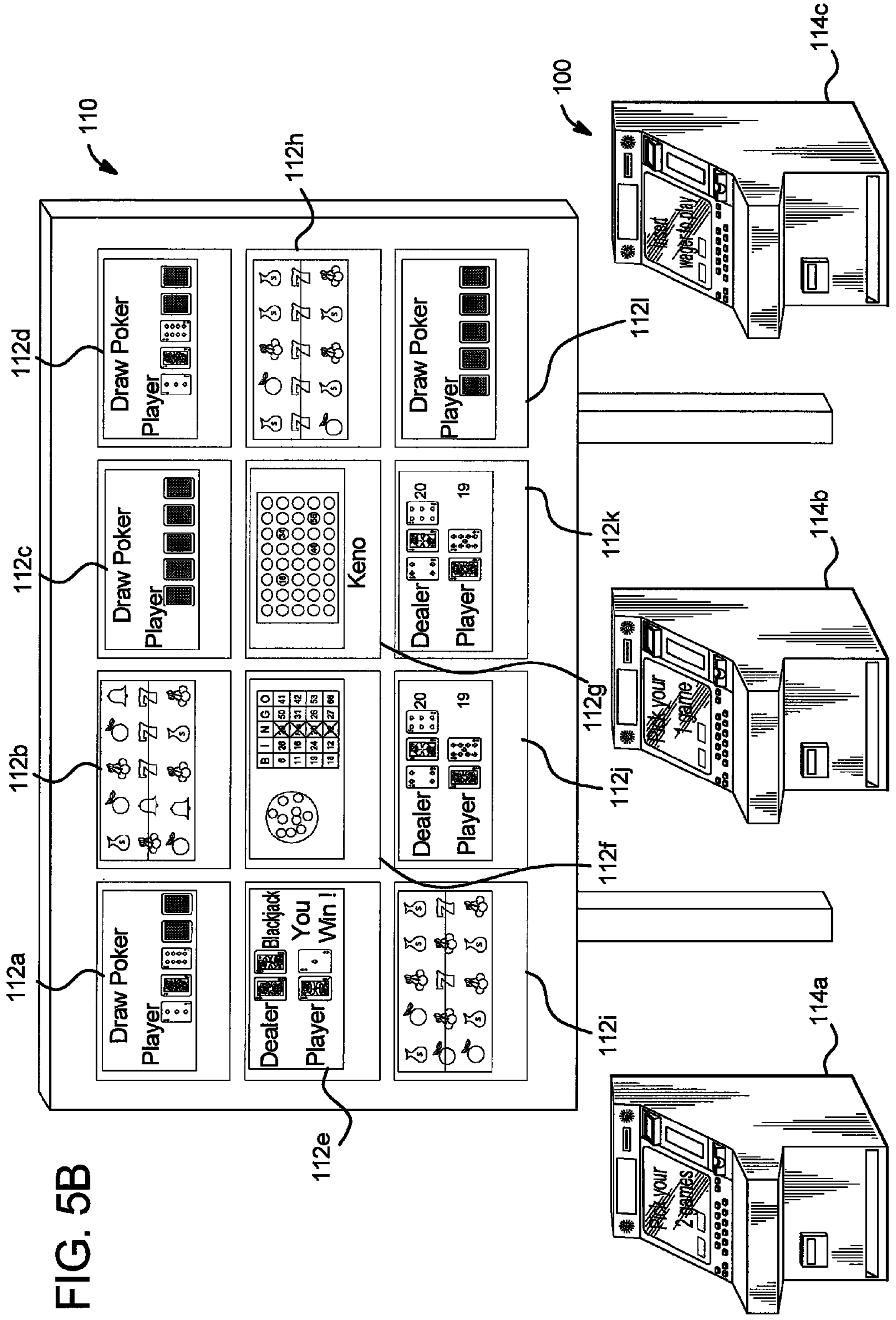

As illustrated in FIG. 5B, in one embodiment the gaming system 100 enables the players to play one or more games by making a wager at one of the player stations. In one embodiment, each of the display segments 112*a*, 112*b*, 112*c*, 112*d*, 112*e*, 112*f*, 112*g*, 112*h*, 112*i*, 112*j*, 112*k* and 112l displays a separate or independent game. Players at the first and second player stations 114*a* and 114*b* insert wagers to initiate game play. As illustrated on a display device of the first player station 114*a*, the first player places a wager to play two games. As illustrated on a display device of the second player station 114*b*, the second player places a wager to play one game. In the illustrated embodiment, a wager is not made at the third player station 114*c*.

In this embodiment, each of the display segments is associated with a single game at a time. The gaming system enables the player to pick one display segment per game, thereby picking the game to play.

Figure 5C:
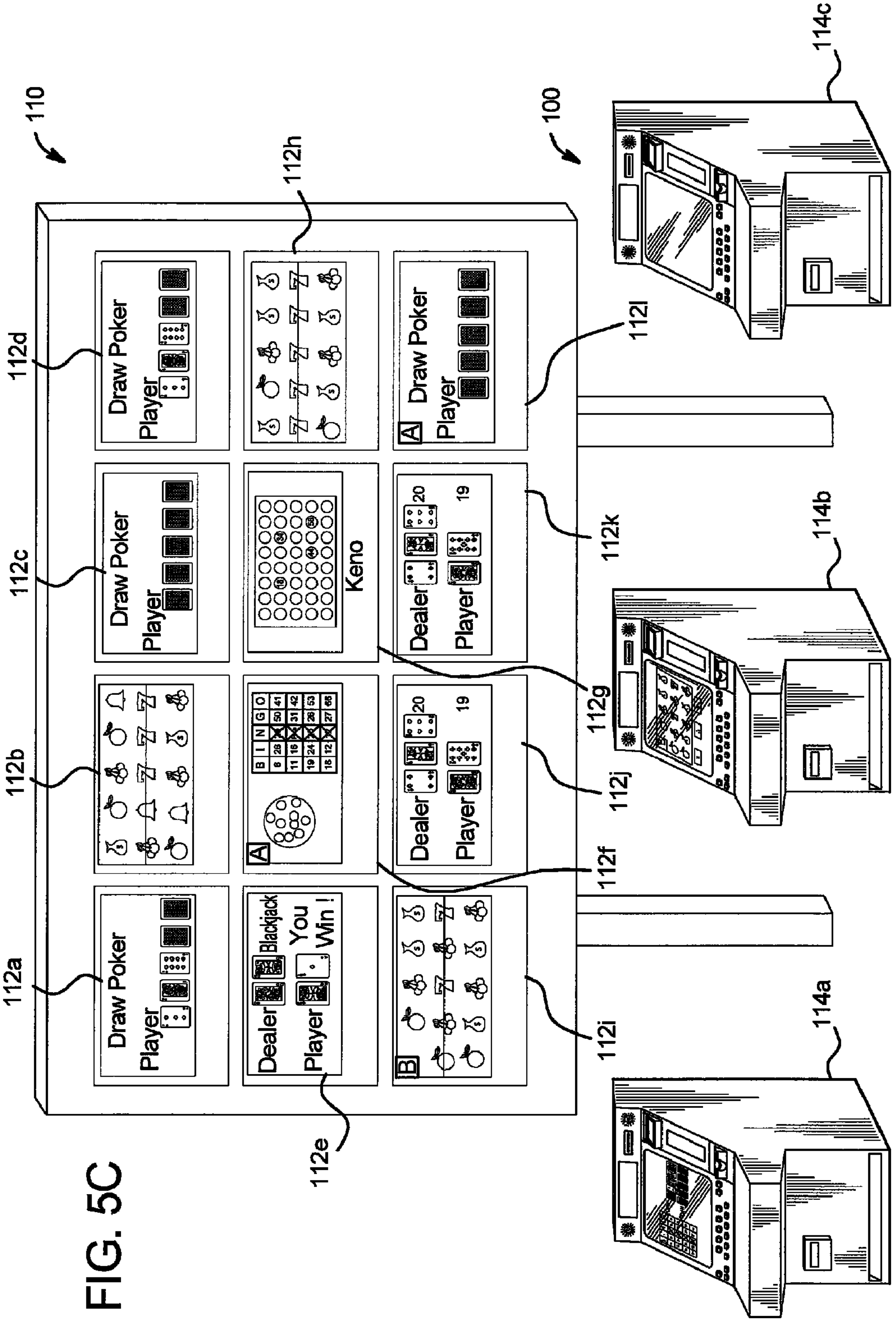

As illustrated in FIG. 5C, the first player picks the display segment displaying bingo 112*f* and one of the display segments displaying poker 112l, as indicated by the letter "A" in the upper left-hand corner of the two display segments. The second player picks one of the display segments 112*i* displaying a slot game as indicated by the letter "B" in the left hand corner of the display segment 112*i*. It should be appreciated that the players may choose the same, different or overlapping games in any suitable manner. It should also be appreciated that the gaming system may indicate the associated display segments to the players in any suitable manner including but not limited to: color coordination (i.e., the player holds a green remote control and the associated display segment displays a green border); letter coordination (i.e., a player is assigned a letter "A" and the associated display segment displays the letter "A"); number coordination (i.e. a player is assigned number 1 and the associated display segment displays the number "1"); name coordination (i.e. each player station enables the player at that player station to enter a name using an input device or through a player tracking card) or any other suitable method.

Figure 5D:
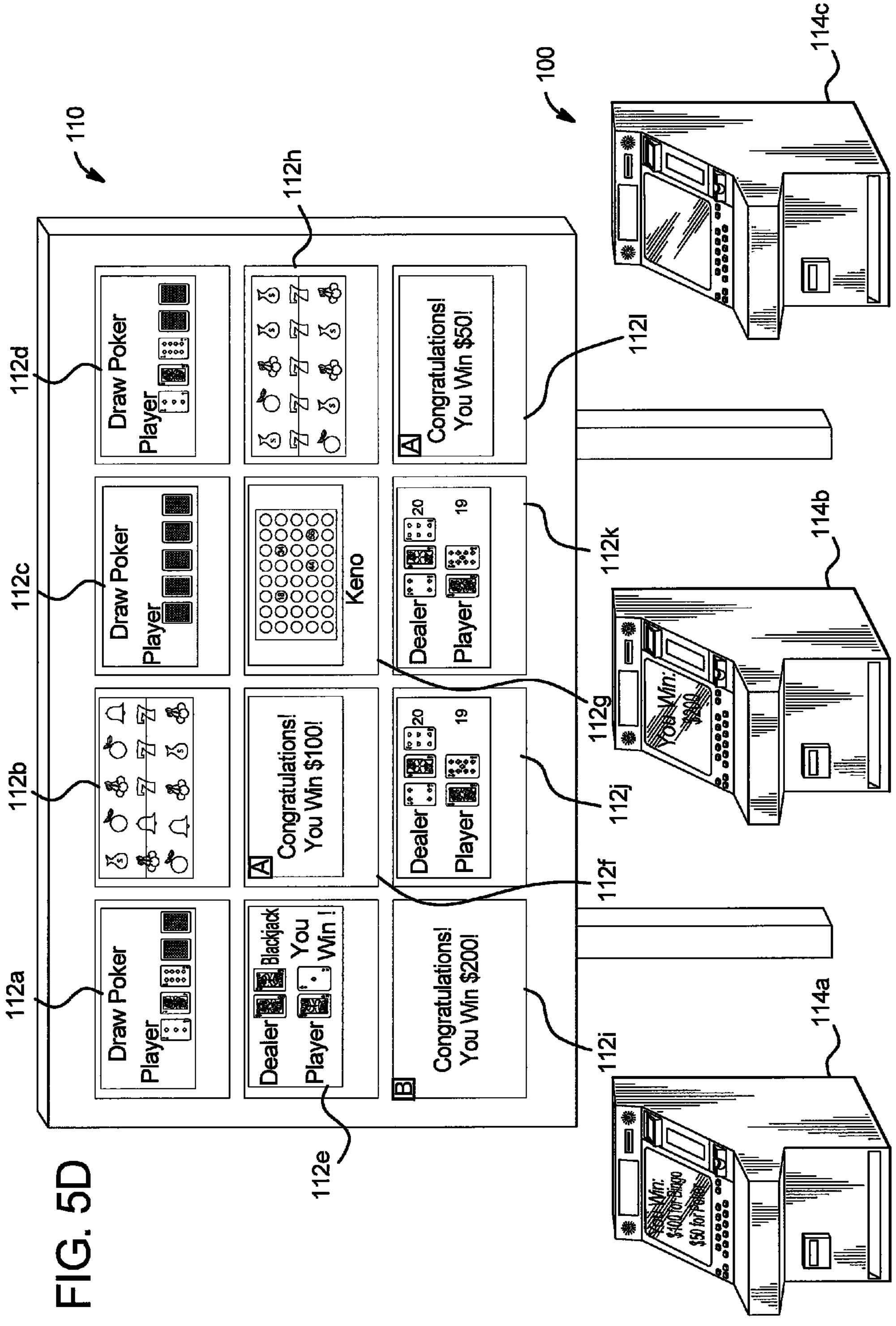

The central controller determines an outcome for each of the games. As illustrated in FIG. 5D, this outcome is communicated to the player via the central display 110 and the individual player stations 114*a* and 114*b*. The central controller determines that the first player wins $100 for the bingo game as illustrated on the display segment 112*f* and on the player station 114*a*. The central controller determines that the first player wins $50 for the poker game as illustrated on the display segment 1121 and on the player station 114*a*. The central controller determines the second player wins $200 for the poker game as illustrated on the display segment 112*i* and the display device of the player station 114*b*. It should be appreciated that in other embodiments the display segments only display the game outcomes and that the individual player stations display the player's game results.

It should be appreciated that game selection and/or display segment selection may occur in any suitable manner. For example, certain player stations may be associated with certain display segments. For example, in one embodiment, the gaming system includes the same number of display segments as the number of player stations or remote controls. Each of the player stations or remote controls is associated with one of the display segments. In another embodiment, the player stations may be associated with a plurality of the display segments and the gaming system enables the player to pick a display segment from the associated display segments. For example, Player Station 1 is associated with a first column of display segments, Player Station 2 is associated with a second column of display segments, Player Station 3 is associated with a third column of display segments and Player Station 4 is associated with the first and third columns of display segments. For example, the player at Player Station One is only enabled to select a display segment from the first column, and the player at Player Station 2 is only enabled to select a display segment from the second column, etc.

In one embodiment, the central controller and the player station enable the player to choose one or more display segments. In another embodiment, the central controller and the player station enable the player to choose the display segment and then choose one or more games to play on the chosen display segment. In another embodiment, information from a player tracking card determines the display segment played by the player. That is, the player station enables the player to insert a player tracking card or other identification means (e.g., entry of an identification number, biometric information or entry of a name or any other suitable means) the central controller determines which display segment the player plays. In another embodiment, the central controller enables players to reserve one or more display segments and/or one or more player stations. In another embodiment, the gaming system enables the player to reserve the whole gaming system for a group of people to play. In another embodiment, upon a wager by the player, the central controller randomly associates at least one display segment with one game for the player.

In another embodiment, the central controller and the player station enable a plurality of players to simultaneously play one or more games as a group. That is, one or more players may play the same primary game or the same bonus game together. As illustrated in FIGS. 6A, 6B, 6C and 6D, in one such embodiment, the game played by the players is an autonomous game with the outcome automatically determined by the central controller. That is, the game does not require player control, input or decision making to provide the players with a game result except for the wagering information entered by the player. After game initiation, the central controller provides the players a result. This embodiment enables players to play a game individually or with another player. However, if a player is individually playing a game, other players can view that player's game results. It should be appreciated that the autonomous gaming may include one or more predetermined strategies or autoplay strategies for each game. These predetermined strategies provide the optimal result for the players of the game.

As illustrated in FIGS. 6A, 6B, 6C and 6D, in one embodiment, the central controller and the player stations enable one or more players to play a game with another player. In one embodiment, each player playing the same game achieves the same game outcomes as the other players participating in the play of the group game, creating an atmosphere of camaraderie and companionship among the players.

The central controller and the player stations enable the players to input wagers to play a group game with another player or to play an individual game. In this embodiment, the central controller and the player stations enable players to make inputs to determine which game they want to play, how many display segments they want to play and which player station they want to play with if they are playing a group game. In the illustrated embodiment, the gaming system requires a higher wager to play a single game on multiple display segments. It should be appreciated that the gaming system may enable a player to play one game on multiple display segments in any suitable manner.

As illustrated in FIGS. 6A, 6B, 6C and 6D, in one embodiment the gaming system 118 includes a central display 120 which includes a plurality of display segments 122*a*, 122*b*, 122*c*, 122*d*, 122*e*, 122*f*, 122*g*, 122*h*, and 122*i*. In this embodiment, the gaming system 118 includes a plurality of player stations or player stations: Player Station #1, 124*a*, Player Station #2, 124*b* and Player Station #3, 124*c*. The central display 120 displays an attract message on three display segments 122*a*, 122*d* and 122*g*, informing players that they may place a wager to play a game with another player. In the second column, the display segments 122*b*, 122*e*, and 122*h*, display other games such as bingo, poker and slots, respectively. All of the display segments 122*c*, 122*f*, and 122*i*, in the last column of the central display include slot games. The player stations include individual display devices that prompt the player to place a wager to play alone or with another player.

Figure 6A:
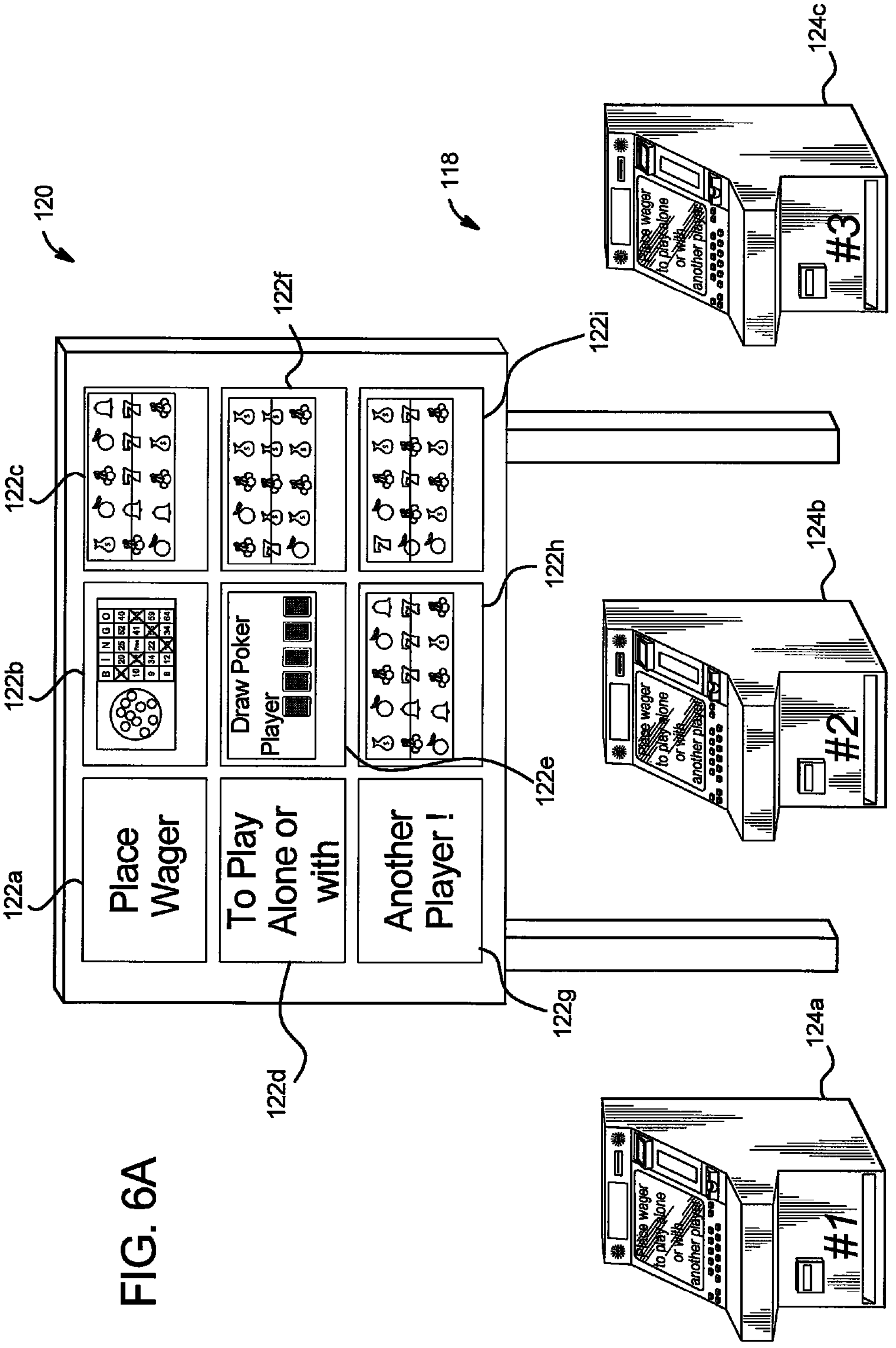
FIGS. 6A, 6B, 6C, and 6D are perspective views of one multi-player group game embodiment of the disclosed gaming system that includes a plurality of player stations and a central display.
Figure 6B:
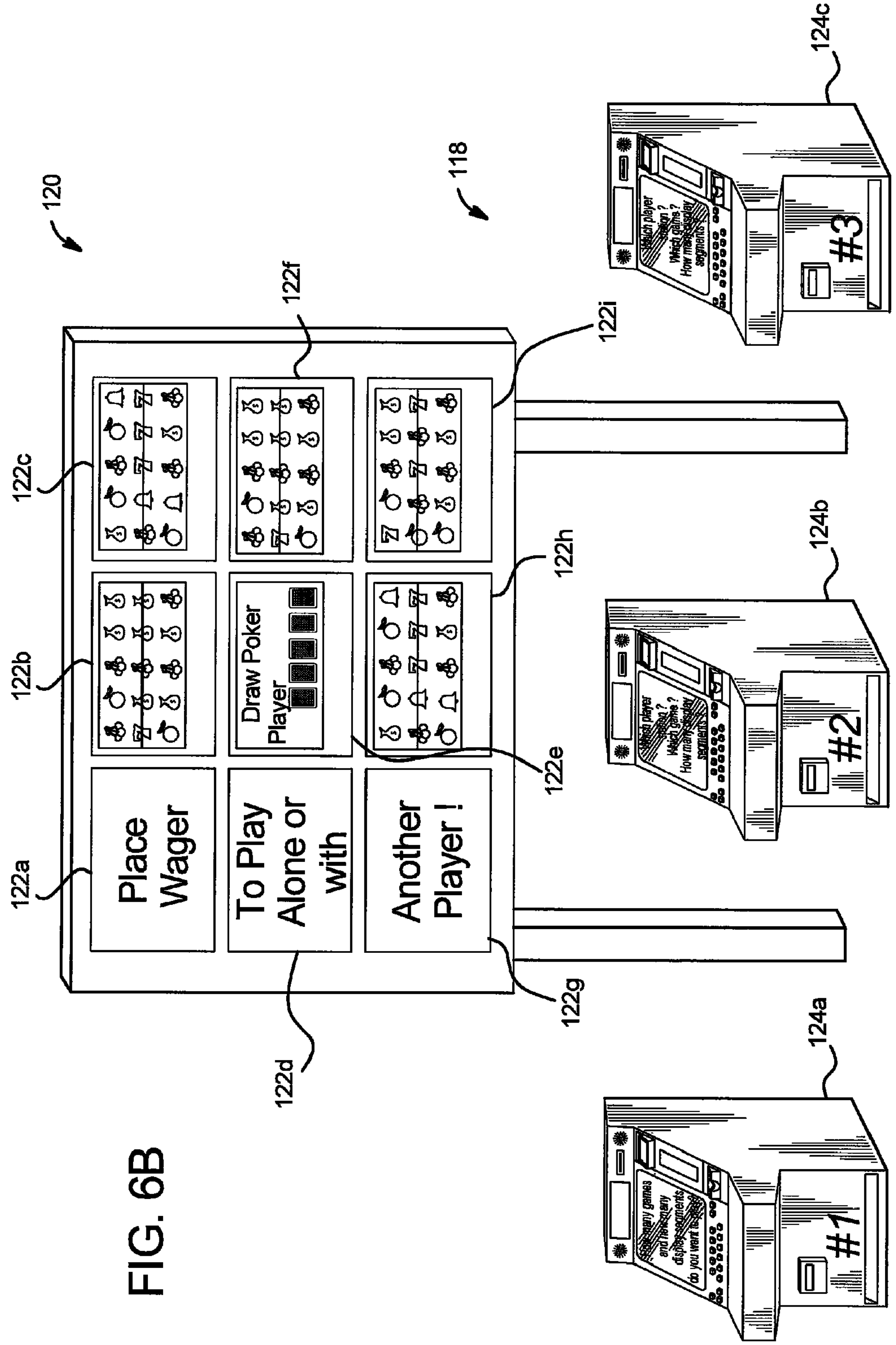

As illustrated in FIG. 6B, in one embodiment, a player of Player Station #1, 124*a*, decides to play a game individually. In this embodiment, the gaming system enables a player to play more than one display segment based on a player's wager. In this illustrated embodiment, the player of Player Station #1 122*a* determines to play a single slot game on three display segments and enters the appropriate wager. In one embodiment, the player must wager more to play a game on multiple display segments. It should be appreciated that a player may choose a game and/or play more than one display segment based on any suitable factor or as provided by the gaming system.

As further illustrated in FIG. 6B, the players of the Player Station #2, 124*b*, and Player Station #3, 124*c*, decide to play a group game. Upon an appropriate wager input, the central controller prompts the players via Player Station #2 and Player Station #3 to input the number of the player station that they are going to play with. The central controller and the player stations additionally prompt the players to input which group game they want to play and on how many display segments. Accordingly, the players enter the number of the player station, a slot game and one display segment (not illustrated). In one embodiment, upon the activation of one of the player stations by the appropriate player input, the central controller instructs each of the player stations to instruct potential players that a group game will begin soon. The player stations can produce audio-visual, audio, or visual information to inform potential players that a game will be initiated or started in a designated time period. This information informs other potential players if they would like to participate in the play of the game, they will need to make the appropriate wagers on the game. It should be appreciated that any type of suitable queuing method can be used, such as a countdown of time to enable the players to make the required inputs and wagers.

Figure 6C:
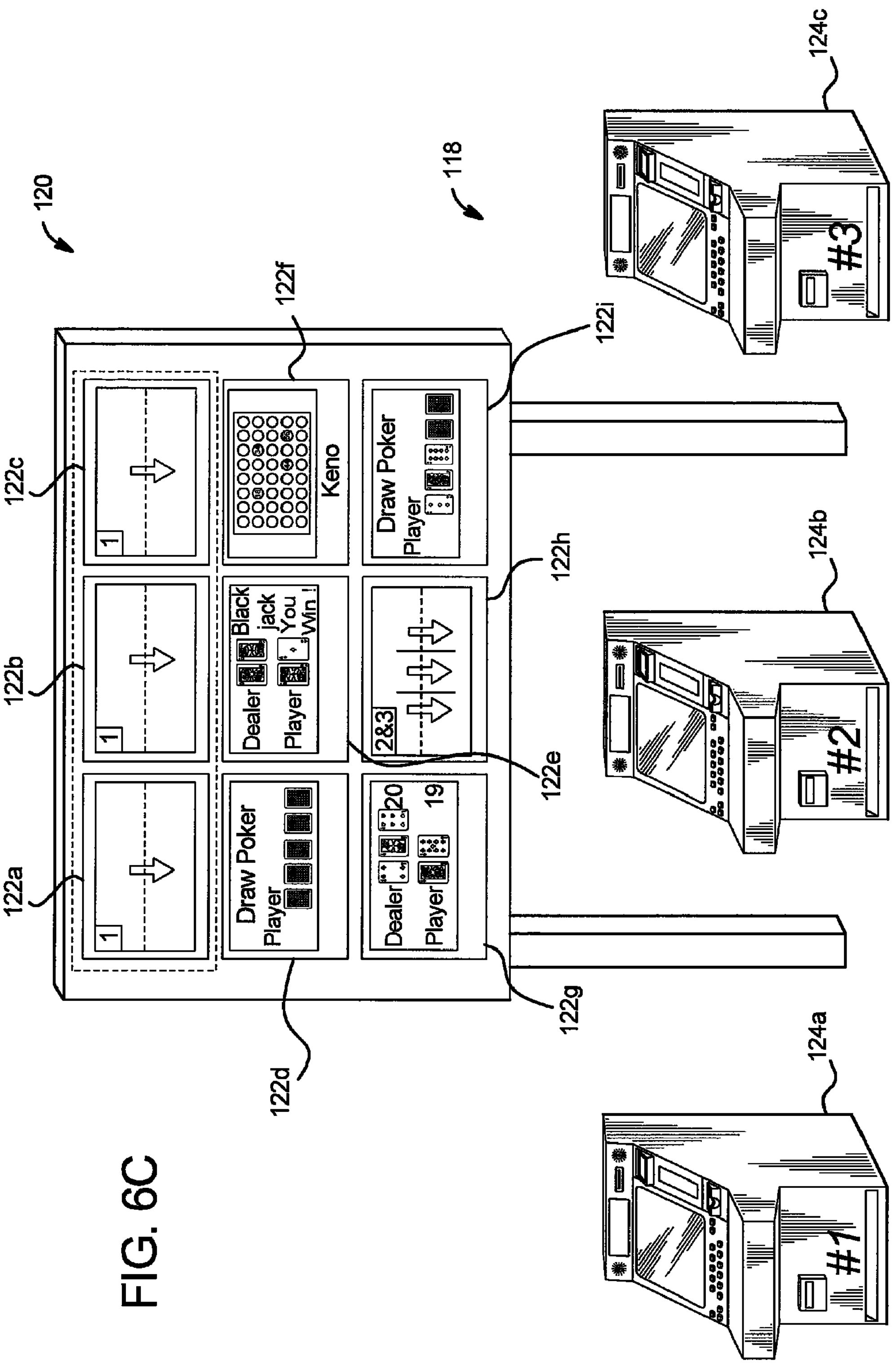

As illustrated in FIG. 6C, the central display 120 displays the selected games to the players. The association of the top three display segments 122*a*, 122*b* and 122*c* to Player Station #1 is indicated to the player in FIG. 6C with a 1 displayed in the upper corner of the three display segments of the first row 122*a*, 122*b*, and 122*c*. Each of the display segments 122*a*, 122*b* and 122*c* display a single slot reel spinning. It should be appreciated that if the player chose to play on a single display segment, the slot game could be displayed on a single display segment.

As illustrated in FIG. 6C, the game of Player Station #2, 124*b*, and Player Station #3, 124*c*, is displayed on a single display segment 122*h*. This association is indicated on the upper left-hand corner of the associated display segment 122*h*. The display segment displays a plurality of spinning slot reels.

Figure 6D:
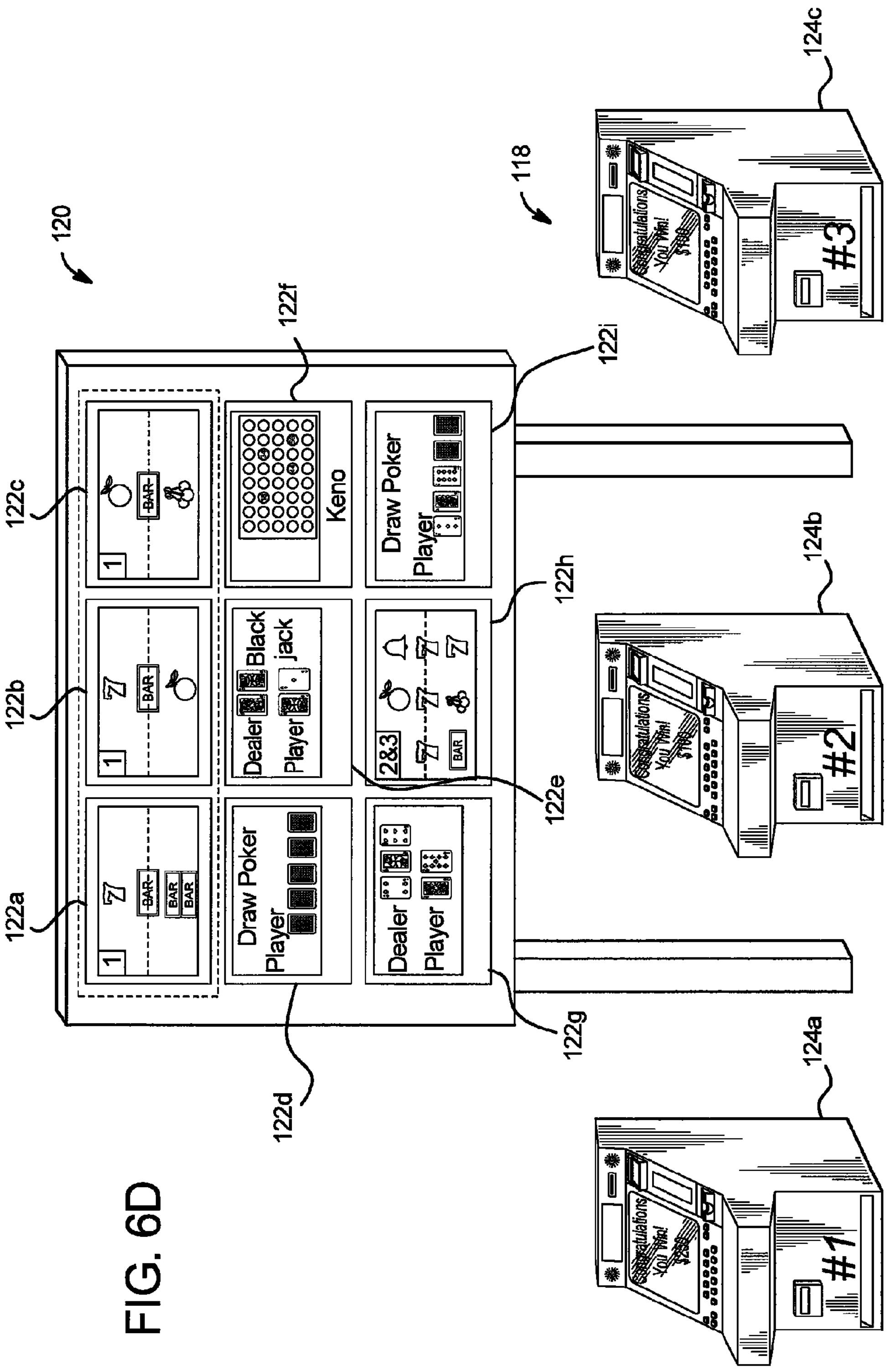

The central controller determines an award for each of the players. As illustrated in FIG. 6D, on the display segments of the first row, each of the display segments 122*a*, 122*b*, and 122*c* generates a bar on the payline, generating a winning combination for the player. As illustrated in FIG. 6D, the gaming system provides the player of Player Station #1, 124*a*, an award of $250.

As illustrated in FIG. 6D, the display segment 122*h* associated with Player Station #2 and Player Station #3 displays a 7 7 7 on the payline. As illustrated in FIG. 6D, the players of Player Station #2 and Player Station #3 each receive an award of $100.

As illustrated in FIGS. 7A, 7B, 7C, and 7D, in another embodiment, player interaction and control is required during an interactive group game. For example, in some embodiments of video poker, players are required to decide which cards to hold and which cards to discard. In these multi-player embodiments which include interactive games, any appropriate method may be employed to determine which player controls the game.

Figure 7A:
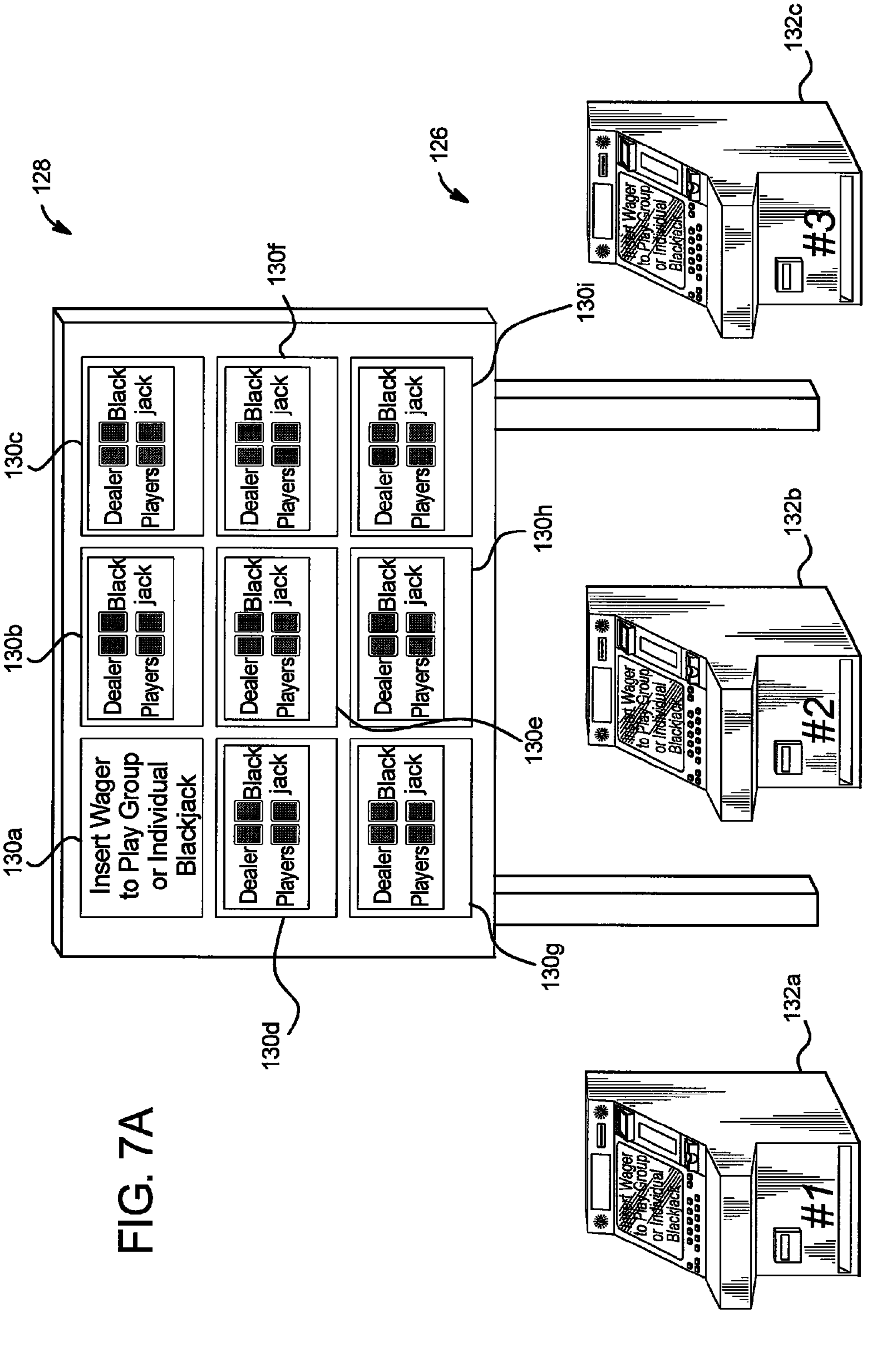
FIGS. 7A, 7B, 7C, 7D, 7E, 7F, and 7G are perspective views of one multi-player interactive group game embodiment of the disclosed gaming system that includes a plurality of player stations and a central display.

As illustrated in FIG. 7A, the player stations prompt potential players to insert a wager to play group blackjack or individual blackjack.

Figure 7B:
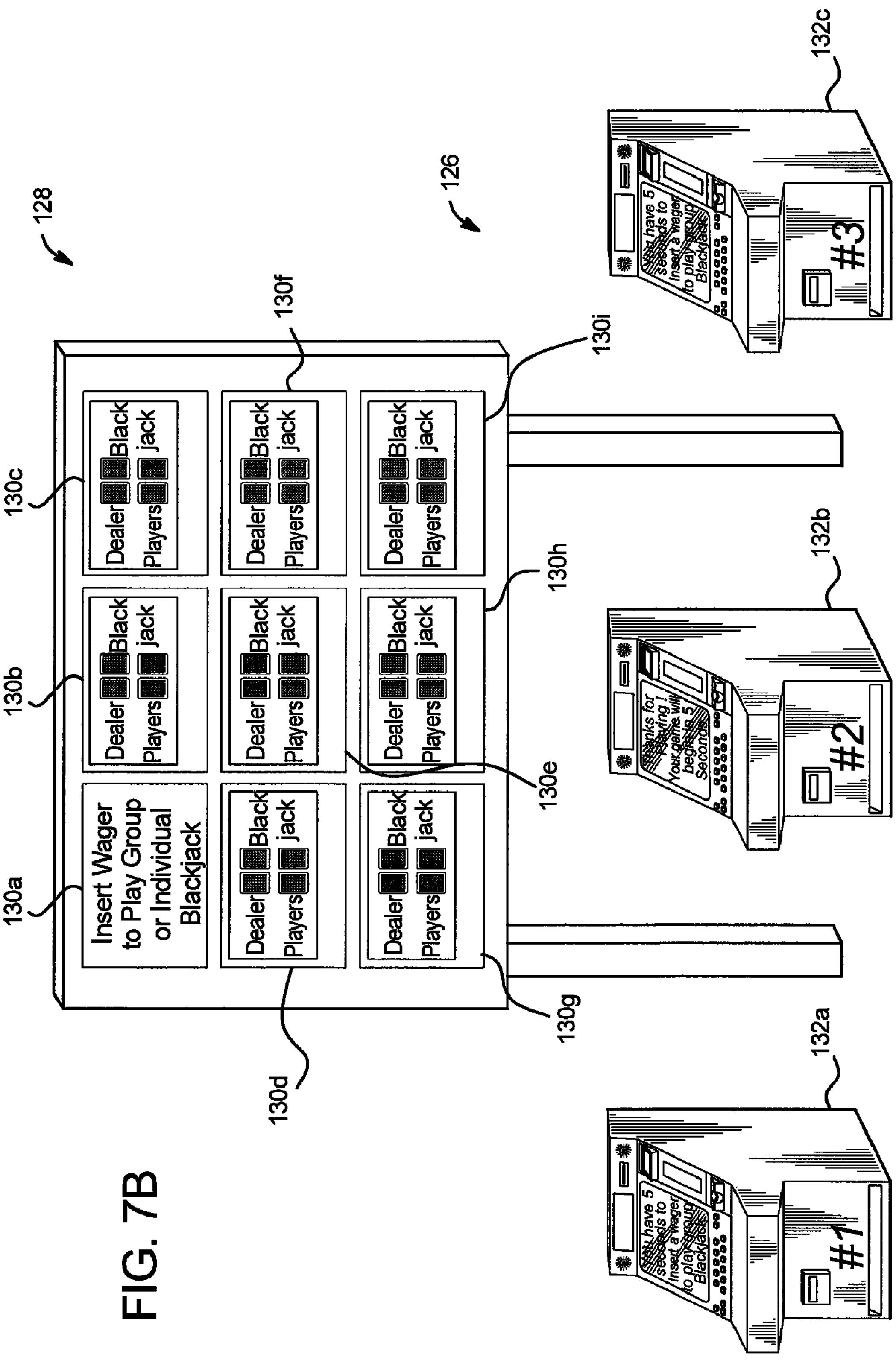

As illustrated in FIG. 7B, upon the activation of one of the player stations by the appropriate player input to play group blackjack, the central controller instructs each of the player stations to instruct potential players that an interactive group game will begin soon. A player at Player Station #2, 132*b*, appropriately funds one of the player stations by placing a wager to play group blackjack. The central processor initiates a queuing sequence displayed by each of the other Player Stations, 132*a*, and 132*c* respectively. Each of the player stations initiate a countdown from 5 to 0 enabling potential players time to place a wager and play the interactive group game on one of the unoccupied player stations. The central controller then determines which of the player stations are in an active state after the countdown sequence terminates. That is, the central controller determines which player stations will participate in the first interactive group game which includes the multiple players who have placed the wager in the designated time period.

Figure 7C:
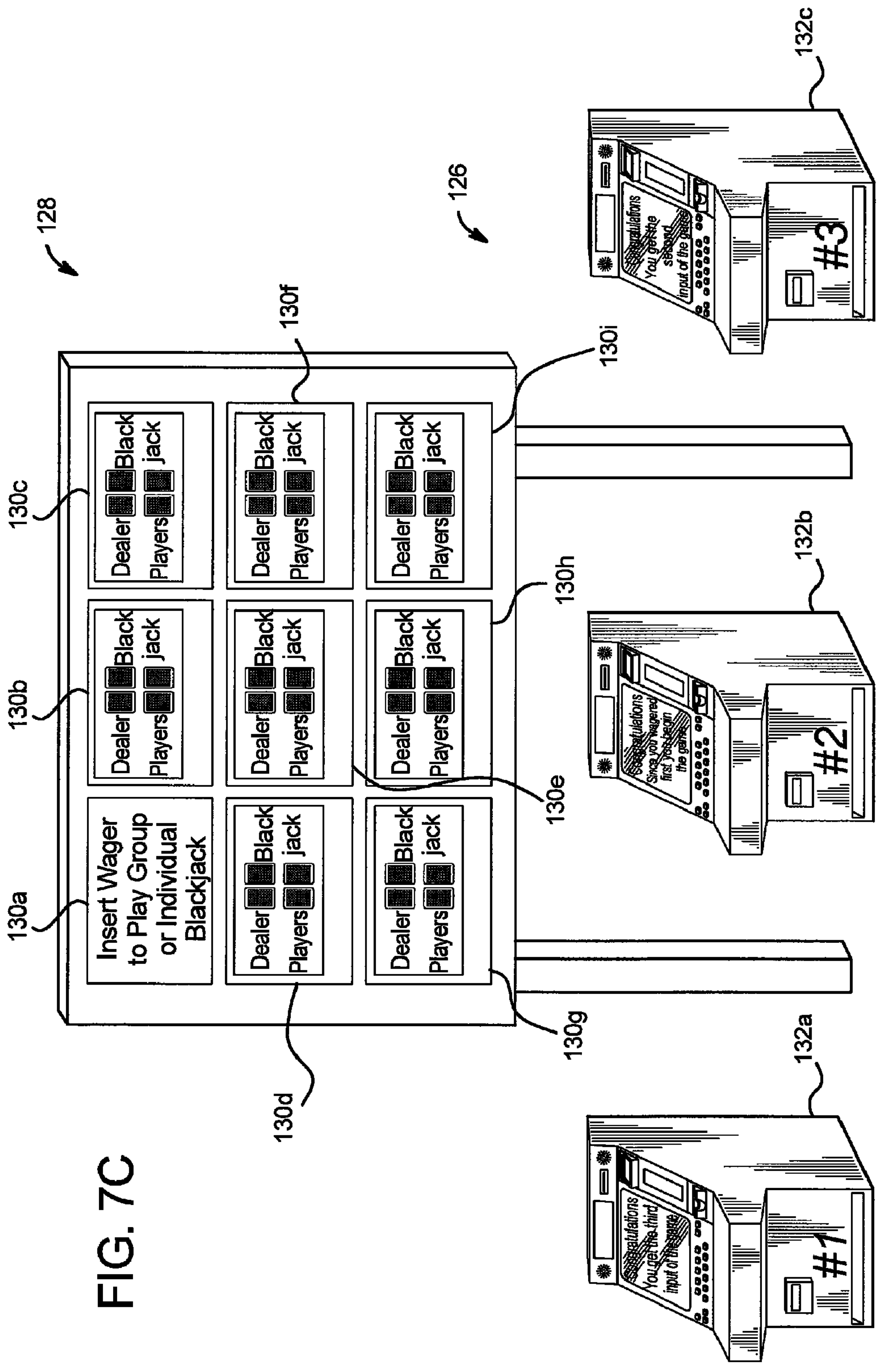

As illustrated in FIG. 7C, in this example, the player placed the designated wager at Player Station #2, 132*b*. Two other players placed wagers at Player Station #1, 132*a* and Player Station #3, 132*c* during the queuing sequence or participation period. Therefore, each player station participates in the group game.

The central controller determines which player to enable to control the group game. In the illustrated example, the central controller enables a participating player to make one choice or input and then another participating player to make one choice or input beginning with the player who placed the first wager, for as long as the group game lasts. That is, as indicated in FIG. 7C, each player station informs the player when they will be enabled to make a group game decision by making an input for their control turn.

For example, as illustrated in FIG. 7C, the player of Player Station #2 placed a wager first. Therefore, the display of Player Station #2 displays, "Congratulations! Since you wagered first, you begin the game." After the first player, the control rotates clockwise to the next player, in this illustrated embodiment. The display of Player Station #3 displays, "Congratulations! You get the second input of the game." Therefore, the central controller and the player station will enable the second player to make the first input, the third player to make the second input, the first player to make the third input, and the second player to make the fourth input, etc.

Figure 7D:
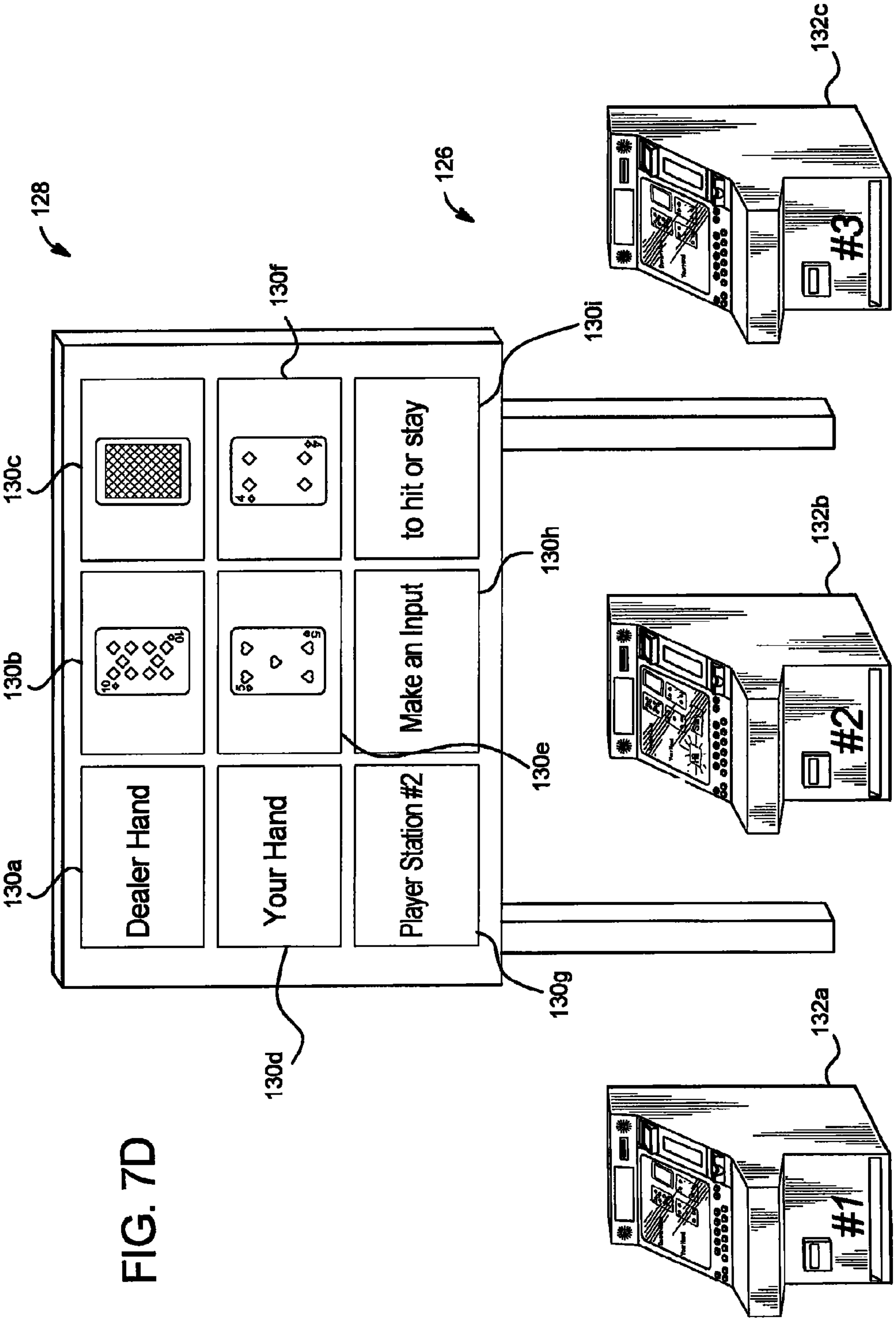

As illustrated in FIG. 7D, the central display 128 begins the group game by displaying one card of the dealer's hand and both cards of the players' hand. In one embodiment, the gaming system displays the group game on the whole central display 128. That is, each display segment 130*a*, 130*b*, 130*c*, 130*d*, 130*e*, 130*f*, 130*g*, 130*h*, and 130*i*, either displays a portion of the group game or nothing at all. However, in other embodiments, the gaming system displays the group game on less than all of the display segments so that the central display can be used for other games and by other players. It should be appreciated that the number of the display segments used in the group game may be based on the number of participating players and/or on the amount wagered per player or the total amount wagered.

As illustrated in FIG. 7D, the central controller causes the central display 128 to initiate the blackjack game. In the game, the dealer is dealt cards totaling a numerical value of 10 with one card face down and the player is dealt cards totaling a numerical value of 9. The central display displays the message "Player Station #2—make an input to hit or stay." The player at Player Station #2 can make an input to hit to get dealt another card or to stay, to not get dealt another card. The player makes an input at Player Station #2 to hit because a numerical value of 9 is less than a numerical value of 10 and neither number value is over 21.

Figure 7E:
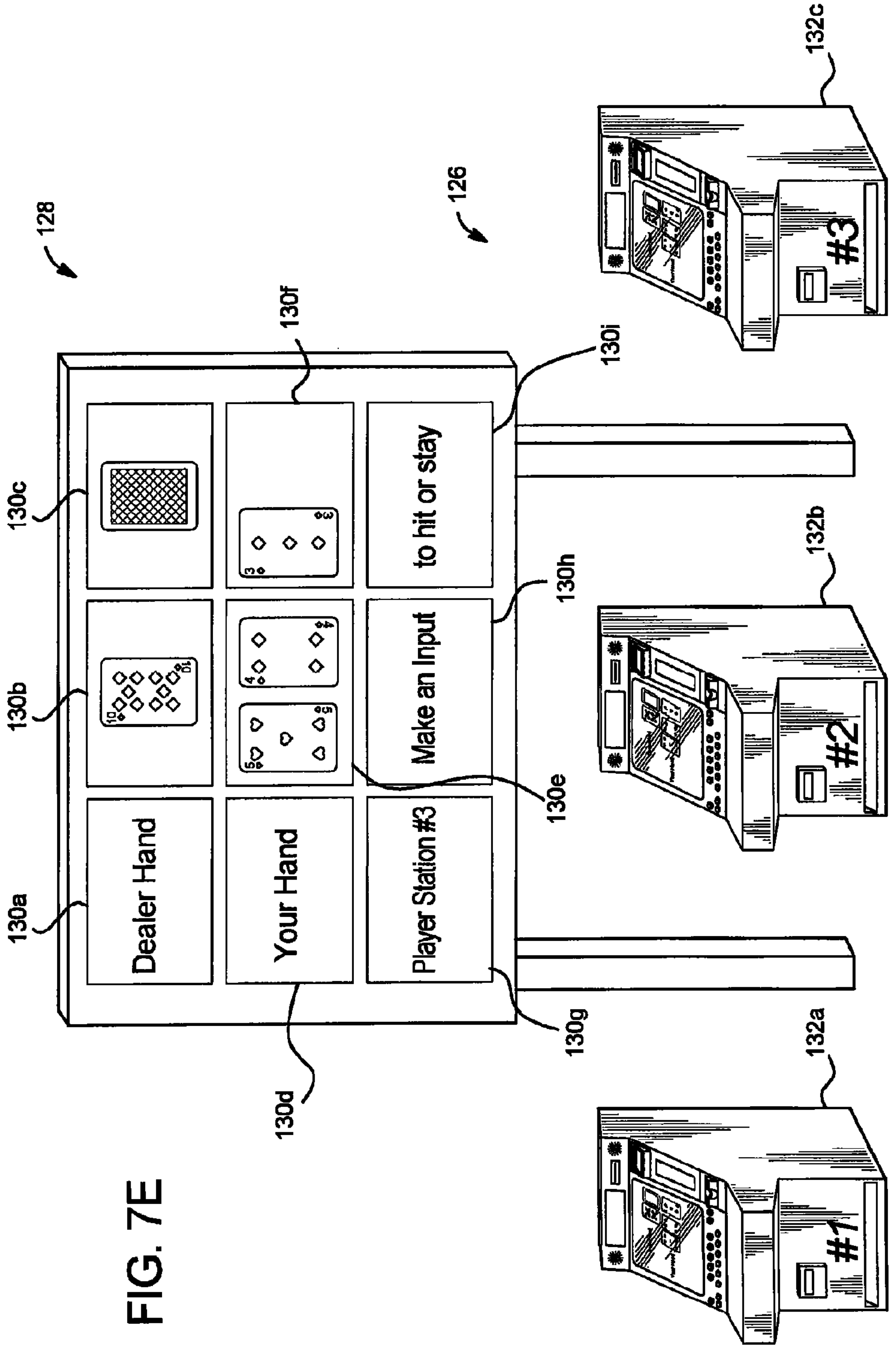

As illustrated in FIG. 7E, the central controller selects a 3 as the next card to give to the players' hand in the game. The central display 128 displays a 5 of hearts, a 4 of diamonds and a 3 of diamonds. The central display displays the message "Player Station #3—make an input to hit or stay." The player makes an input at Player Station #2 to hit.

Figure 7F:
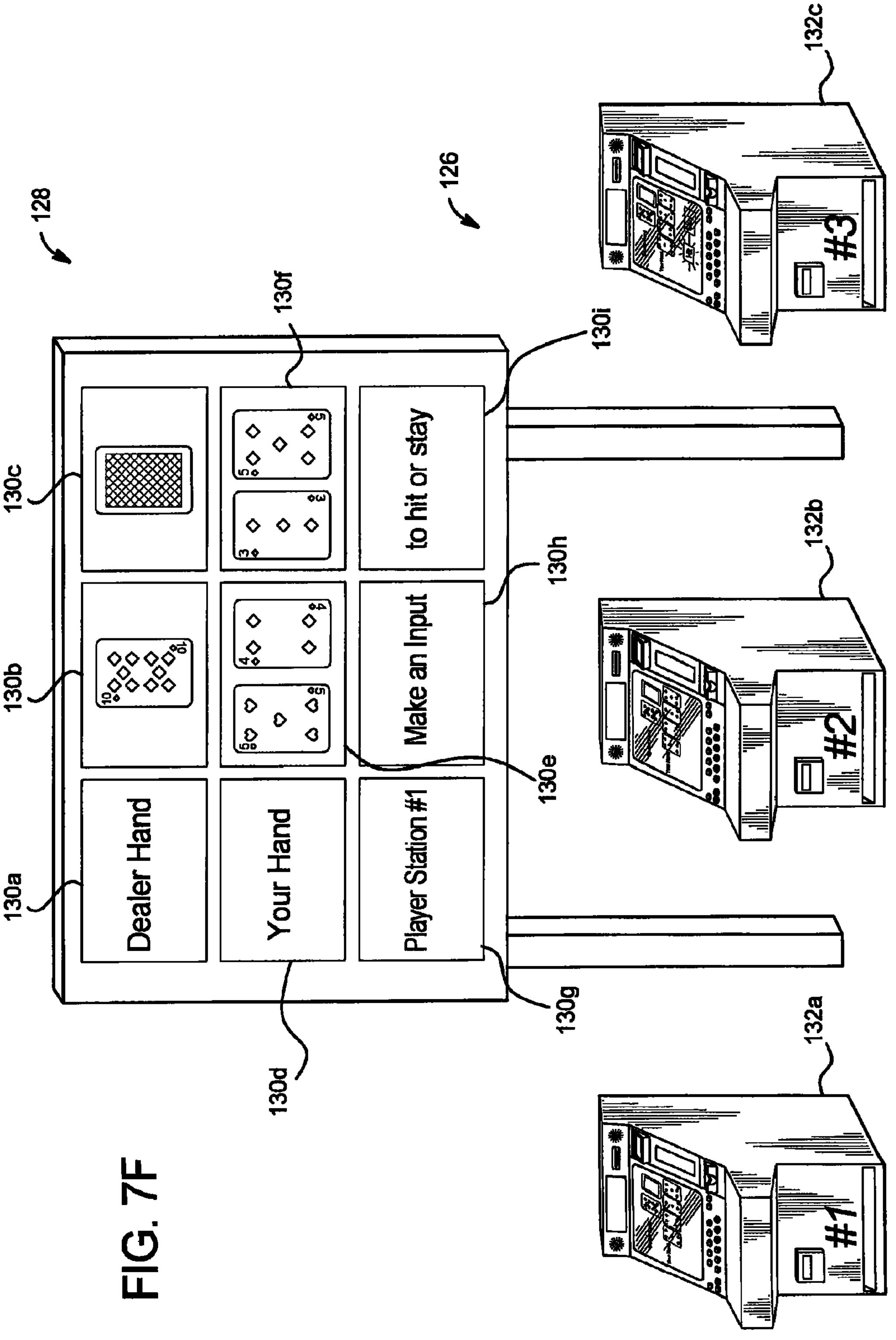

As illustrated in FIG. 7F, the central controller selects a 5 of diamonds as the next card to give to the players' hand in the game. The central display 128 displays a 5 of hearts, a 4 of diamonds, a 3 of diamonds and a 5 of diamonds. The central display displays the message "Player Station #3—make an input to hit or stay." The player makes an input at Player Station #3 to hit.

Figure 7G:
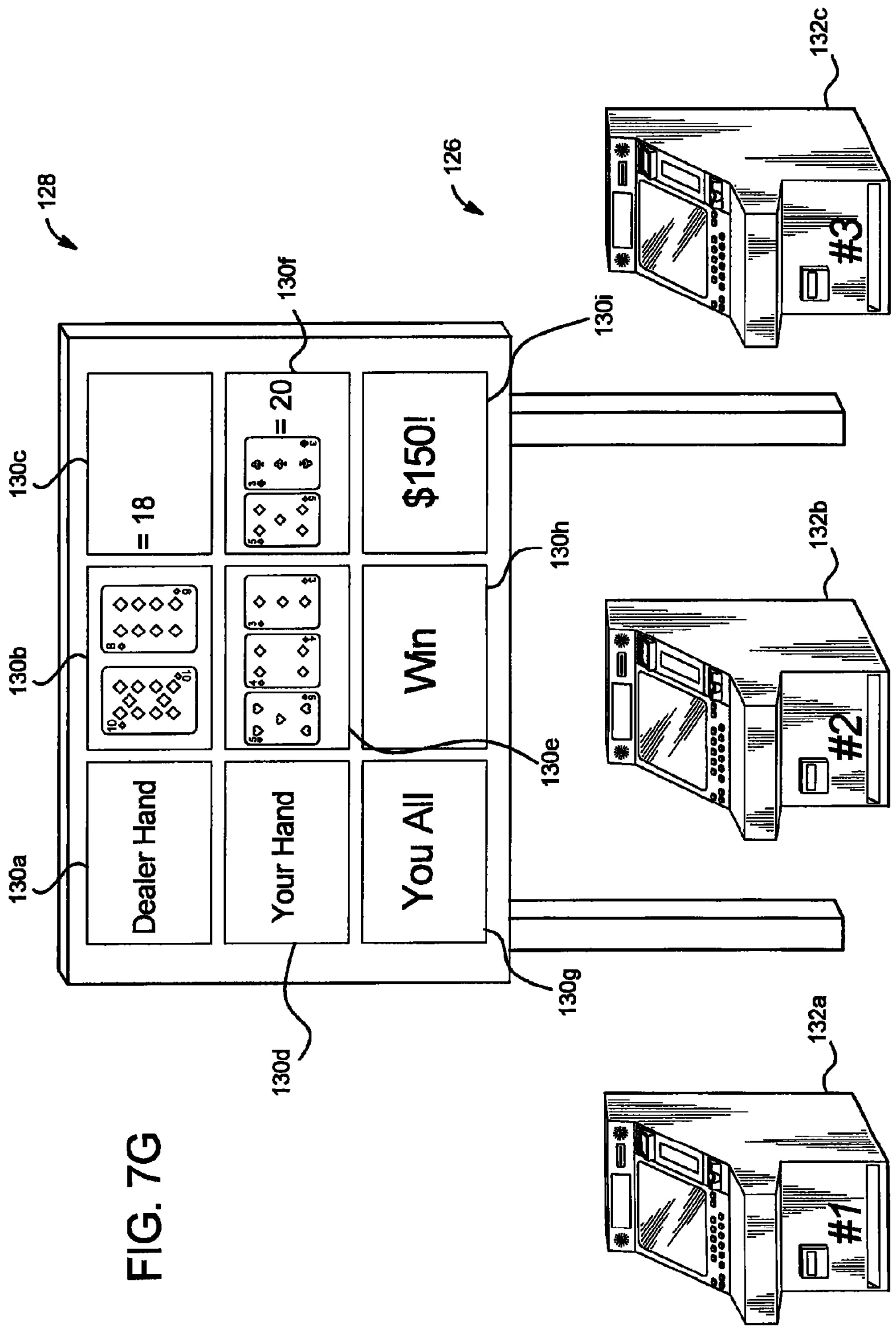

As illustrated in FIG. 7G, the central controller selects a 3 of clubs as the next card to give to the players' hand in the game. The central display 128 displays a 5 of hearts, a 4 of diamonds, a 3 of diamonds, a 5 of diamonds a 3 of clubs. The central display displays the message "You each win $150!" The players reached a numerical total of 20 and the dealer only had numerical total of 18. Therefore, the central controller causes each of the player stations to provide the players an award of $150.

It should be appreciated that in a multi-player interactive group game, which player or which player station controls the group game or the order that the players control the group game can be determined in any suitable manner.

In one embodiment, the central controller randomly chooses the player from the plurality of players to control the interactive game.

In one embodiment, the central controller and the player station enable the person with the highest overall wager for the group game to control the entire game. For example, in a group interactive game, a single player makes the highest wager. The central controller and the player station enable that player to control the interactive group game and make all of the inputs for the game. In one such embodiment, if two players tie and make the same highest wager, the players share control of the game, each player making every other required group game decision. In another such embodiment, if two players tie and make the same highest wager, the central controller randomly determines which player controls the game. In another embodiment, if two players tie, the central controller and the player station enable the players to play a tie breaker to determine control of the game. It should be appreciated that any suitable tie breaker may be used to determine control of the game. In another embodiment, in the event of a tie for control of the game, the player with the last control of the group game controls the game. It should be appreciated that the player may be determined according to any suitable criteria such as but not limited to: (a) the longest playing player; (b) the player with the highest player rank; (c) the player with a highest single win; (d) player with the highest wins over a range of time; (e) any suitable player tracking criteria; (f) the player who played the most simultaneous display segments; and (g) a random determination. In one embodiment, a player who wins or obtains control of the game may appoint another player to control the game.

In another embodiment, as illustrated above, the gaming system enables a plurality of the players to control the game. In one such embodiment, the central controller and the player stations enable each of the players to control the group game sequentially, in a predetermined order. In another embodiment, the central controller randomly determines which player to enable to control the group game after the previous player controls the game. In another embodiment, the central controller randomly chooses which player controls the group game and for what extent of time. In another embodiment, the central controller and the gaming system enable a player to control the group game until the player loses or makes a poor group game decision. That is, a player controls the group game until a negative outcome occurs in the group game and then another player controls the game.

In another multi-player interactive group game embodiment, the central controller enables the players to determine which player controls the game. The central controller enables the players to determine who controls the group game in any suitable manner. For example, each of the players may vote to determine who controls the game. In one such embodiment, a vote may occur at a certain time interval, i.e. every 5 minutes, to ensure that new players may participate. If the player controlling the group game does not play the group game for the entire time interval, another player may gain control of the group game in any appropriate manner. In another such embodiment, each time a new group game begins, a vote occurs to determine who is in control of the game. In one embodiment, a player's vote is weighted by the amount they wagered. For example, if Player 1 wagered $4 and Player 2 wagered $2 and Player 3 wagered $2, Player 1's vote would count as much as the combined votes of Player 2 and Player 3. The player with the most votes wins. It should be appreciated that in the voting embodiments, each player need not be required to vote. The player may abstain from voting and the vote may not count at all or the central controller may determine a vote, randomly or otherwise, for the player. In another embodiment, the player is not required to vote and instead a vote is made for the player by a predetermined strategy. In another embodiment, the gaming system enables the players to vote on the course of action to take. The gaming system completes the most popular choice. For example, in a video poker game, each player votes whether to hold a card or discard a card. The gaming system implements the decision that receives the greatest number of votes.

In another embodiment, the central controller and the player station enable a plurality of players to control the group game based on a wager amount. That is, a player who wagers the largest amount for a group game obtains a special privilege such as controlling the group game first, controlling the group game for the longest, or choosing what part of the group game to control. In another embodiment, each player controls the group game in the order of highest wager. In one embodiment, a player who wagers the largest amount controls the group game first, a player who wagers the second largest amount controls the group game second, etc. In another embodiment, the amount of time the central controller and the player station enable the players to control the group game is based on the wager. For example, each player gets to control the group game based on the percent the player wagered of the total wager made by all of the players for that game.

In another embodiment, the central controller bases control of the group game on a player tracking criteria. In this embodiment, the central controller and the player station enable each of the players to insert a player tracking card. The central controller bases the control of the group game on a parameter of player tracking, including but not limited to, points, length of membership, amount of play in a certain time period, or an amount wagered in a certain time period.

In another embodiment, one or more different display segments display the decisions made by a player. For example, if there are four players in a group multi-component game, a first display segment displays the group game decision of the first player, and a second display segment displays the group game decision of the second player. In another embodiment, a single display segment displays the decisions of more than one player. For example, each player makes an individual input in a game and each player's decision for a same game decision is displayed on a single display segment. For example, if each player receives a same individual hand of poker against the same hand of a dealer, a first player may decide to discard the first card and the second player may decide to hold the first card. Each of these first decisions is displayed on a single display segment. In one embodiment, a single display segment displays a split screen which displays the different decisions made by the different players. In another embodiment, the display segments each display a certain number of choices, such as three choices made. In another embodiment, the gaming system includes cameras or camcorders and the display segments show live feed or a still picture of the player next to their decision.

In the group games, in one embodiment the gaming system requires each player to place the same wager amount and therefore each player receives a same award upon a winning group game outcome. In another embodiment, the gaming system enables players to wager different amounts and therefore provides players different awards based on their individual wagers upon a winning group game outcome. That is, though the group game outcome is the same group outcome, each player receives individual awards based on individual wagers placed by the players. In another embodiment, the gaming system enables a player to additionally choose a wager or credit denomination to play in.

The group game may be a bonus game triggered upon an event in a base game. In one such embodiment, when one player achieves the bonus triggering event, the gaming system enables each of the other players of the gaming system to participate in a play of the bonus group game. In another embodiment, when one player achieves the bonus triggering event, the gaming system enables each of the other players to participate in a play of the group bonus game subject to a condition, such as wagering a predetermined amount. In one embodiment, display segments work together to display a group bonus.

Figure 8A:
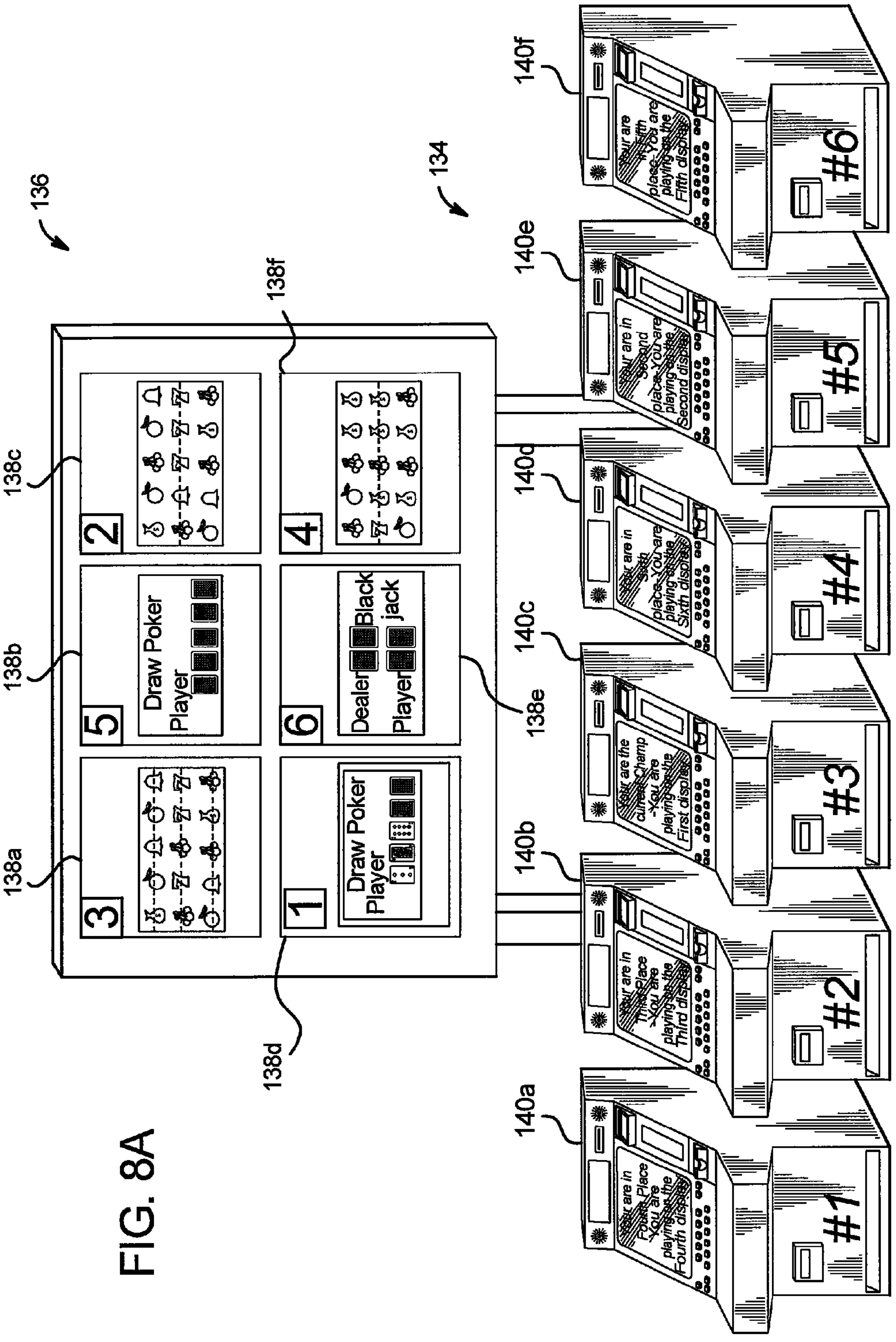
FIGS. 8A and 8B are perspective views of one tournament embodiment of the disclosed gaming system that includes a plurality of player stations and a central display wherein the display segment associated with each player's game is based on a ranking of the players.
Figure 8B:
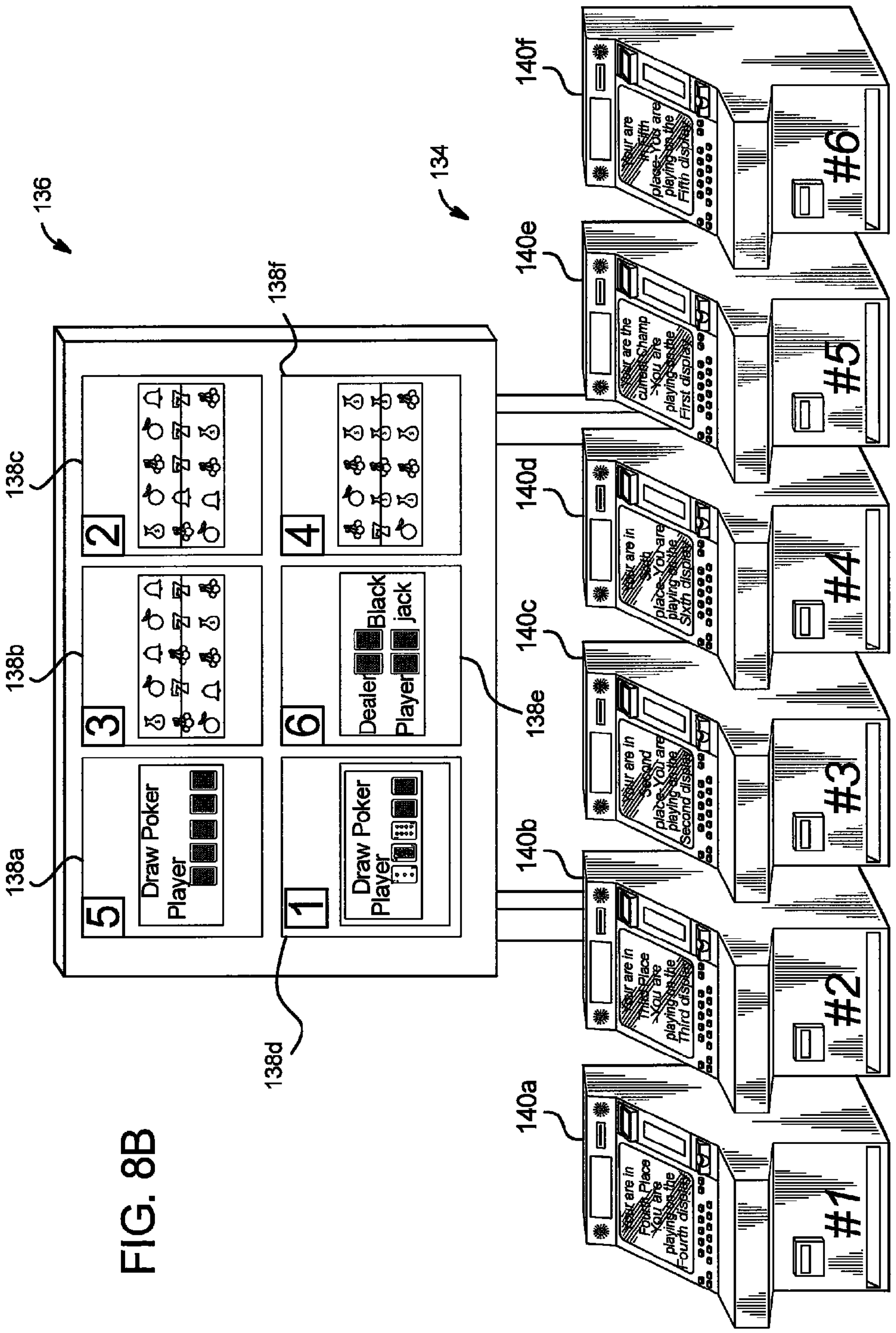

The gaming system may enable the players to play the display segments in any suitable manner. FIGS. 8A and 8B illustrate an alternative embodiment of associating player stations with display segments. Though this illustrated embodiment is directed towards multi-player individual game play, this embodiment can be implemented in multi-player group game play, where players participating in the same game act as teams.

In the illustrated embodiment, the players are in a tournament to play their game on a certain display segment. That is, the central controller associates the display segment with a player station based on a rank of the player playing at that player station. This ranking system may be based on any suitable ranking. For illustrative purposes, the ranking system of FIGS. 8A and 8B is based on the number of games consecutively won by the player.

As illustrated in FIGS. 8A and 8B, the gaming system 134 includes a central display or common display 136. The central display includes six display segments 138*a*, 138*b*, 138*c*, 138*d*, 138*e* and 138*f*. The gaming system includes six player stations 140*a*, 140*b*, 140*c*, 140*d*, 140*e*, and 140*f*. Each of the player stations is associated with one of the display segments based on how many games the player at that player station has consecutively won. The player at Player Station #3 is currently ranked first as illustrated on the display device of Player Station #3 which displays, "You are the current champion and you are playing the first display." As illustrated on the first display segment 138*a*, the 3 in the upper corner illustrates the association between Player Station #3 and the display segment 138*a*. The player of Player Station #5 is in second place and therefore the central controller associates Player Station #5 with the second display segment 138*b*. The second display segment 138*b* includes a 5 in the left hand corner, displaying the association. The player of Player Station #2 is in third place and therefore the central controller associates the player of Player Station #2 with the third display segment 138*c*. The third display segment 138*c* includes a 2 in the left hand corner, displaying the association. The player of Player Station #1 is in fourth place and therefore the central controller associates Player Station #1 with the fourth display segment 138*d*. The fourth display segment 138*d* includes a 1 in the left hand corner, displaying the association. The player of Player Station #6 is in fifth place and therefore the central controller associates Player Station #6 with the fifth display segment 138*e*. The fifth display segment 138*c* includes a 6 in the left hand corner, displaying the association. The player of Player Station #4 is in last place and therefore the central controller associates Player Station #4 with the sixth display segment 138*f*. The sixth display segment 138*f* includes a 4 in the left hand corner, displaying the association. Each time a player at one of the player stations plays a new game, the rank order of the player stations and the associations of the display segments may change.

As illustrated in FIG. 8B, upon a new game outcome, the player of Player Station #5 is now in first place and the player of Player Station #3 is now in second place. The central controller associates Player Station #5 with the first display segment 138*a* and Player Station #3 with the second display segment 138*b*. That is, the players are in a tournament to get associated with a certain display segment.

In one embodiment, the central controller provides awards to the players based on the associated display segment. In one embodiment, once every time interval, the central processor determines an award to provide to one or more players. For example, once every half hour, the central controller and the player station provide an award for the player playing the player station that is associated with a designated display segment, such as the first display segment. In another embodiment, the central controller and the player station provide an award for every player playing the player station associated with a certain number of display segments. The central controller determines an award to provide to one or more players for a certain player rank, such as the top three ranked players, and causes the player stations to provide them with the award. In one embodiment, the amount a player receives is weighted based on the player's rank.

It should be appreciated that this tournament display segment format can be based on any suitable type of ranking. In one embodiment, the players are ranked according to total amount wagered. In another embodiment, the players are ranked according to the amount wagered per game or their rate of play. In another embodiment, the players are ranked according to a game scoring method. In another embodiment, the players are ranked according to a player tracking statistic. In another embodiment, the players are ranked according to an element of one or more bonus games. In another embodiment, the players are ranked according to a rate of play.

It should be appreciated that the gaming system of the present disclosure may provide any type of bonus to any player based on that player's associated display segment or any other of the display segments. In one embodiment, upon a bonus win by one player, one or more other players playing a game achieve a bonus. In another embodiment, all active players are enabled to play a group bonus upon a bonus triggering event in one of the player's games. In another embodiment, the player station provides all of the players an award based on the combination of wins or losses displayed on the display segments.

It should be appreciated that any suitable tournament may be implemented on the gaming system. In one embodiment, a scheduled tournament is played with each player or a certain number of top players each playing their game on the display segments of the central display.

In another embodiment, instant tournaments are run for everyone who is currently playing. That is, each player playing the display segments is prompted to choose to enter a tournament. In one such embodiment, each player determines to enter the tournament by buying into the tournament or may decide not to play. The gaming system runs a tournament. The tournament may be any type of tournament. In one embodiment, the tournament is a time based tournament, where the person with the most points or the most credits at the end of a predetermined amount of time (e.g., 5 minutes) wins the tournament. In another embodiment, the tournament is game based and each player receives a certain number of games to play (e.g., 25 games) and the player with the most points or credits after 25 games wins.

In another embodiment, a tournament provides an advantage for certain players. For example, a player who has won the most credits that day chooses the game for the tournament. In another embodiment, the player with the most pending credits chooses the game for the tournament. In another embodiment, the number of simultaneous games a player is enabled to play is based on the number of display segments the player plays. For example, at the time of the tournament message, if the player is playing five display segments, they get to play five display segments for the tournament, increasing their chances of winning. In another example, the player is enabled to play the number of display segments they play on average over a certain period of time, such as one day. The gaming system enables the players to play that determined number.

It should be appreciated that the tournament may require any suitable entry or qualification. For example, tournament participation may require a buy-in, a bonus credit, a certain number of games played at the central display, a certain player rank, a certain number of games played in a casino, a certain average wager, a certain wager at the time of the tournament, a certain number of wins or a certain number of losses, or a certain game played at the central display. In one embodiment, the tournament is a live money tournament where the players wager their own money and whichever player wins the most credits after a designated number of games or in a certain time period wins the tournament.

It should be appreciated that the tournaments may be associated with any suitable prize and there may be any suitable number of winners. The prizes may include monetary prizes, vacations, vehicles, gift certificates or any other suitable award. It should also be appreciated that the tournaments may be multiple rounds. In one such embodiment, preliminary rounds of the tournament are played on gaming machines and the final round of the tournament is played on the central display. It should be appreciated that the tournament may be an automated tournament where the gaming system controls the games displayed on the display segments. In another embodiment, control of one or more display segments is determined in any suitable manner, including but not limited to the manners described herein.

It should be appreciated that the tournament may be any suitable game including but not limited to slots, poker, blackjack and bingo. It should also be appreciated that a plurality of tournament players play the same games. For example, a first player plays the tournament on display segments #1, #2 and #5 and a second player plays the tournament on #2 and #6. The players may play the tournament on the same number or a different number of display segments. It should be appreciated that the number of display segments provided to the player to play may depend on any suitable factor. It should be appreciated that the players may each be enabled to play some but not all of the display segments, or the players of the tournament could all have the same tournament score.

Figure 9:
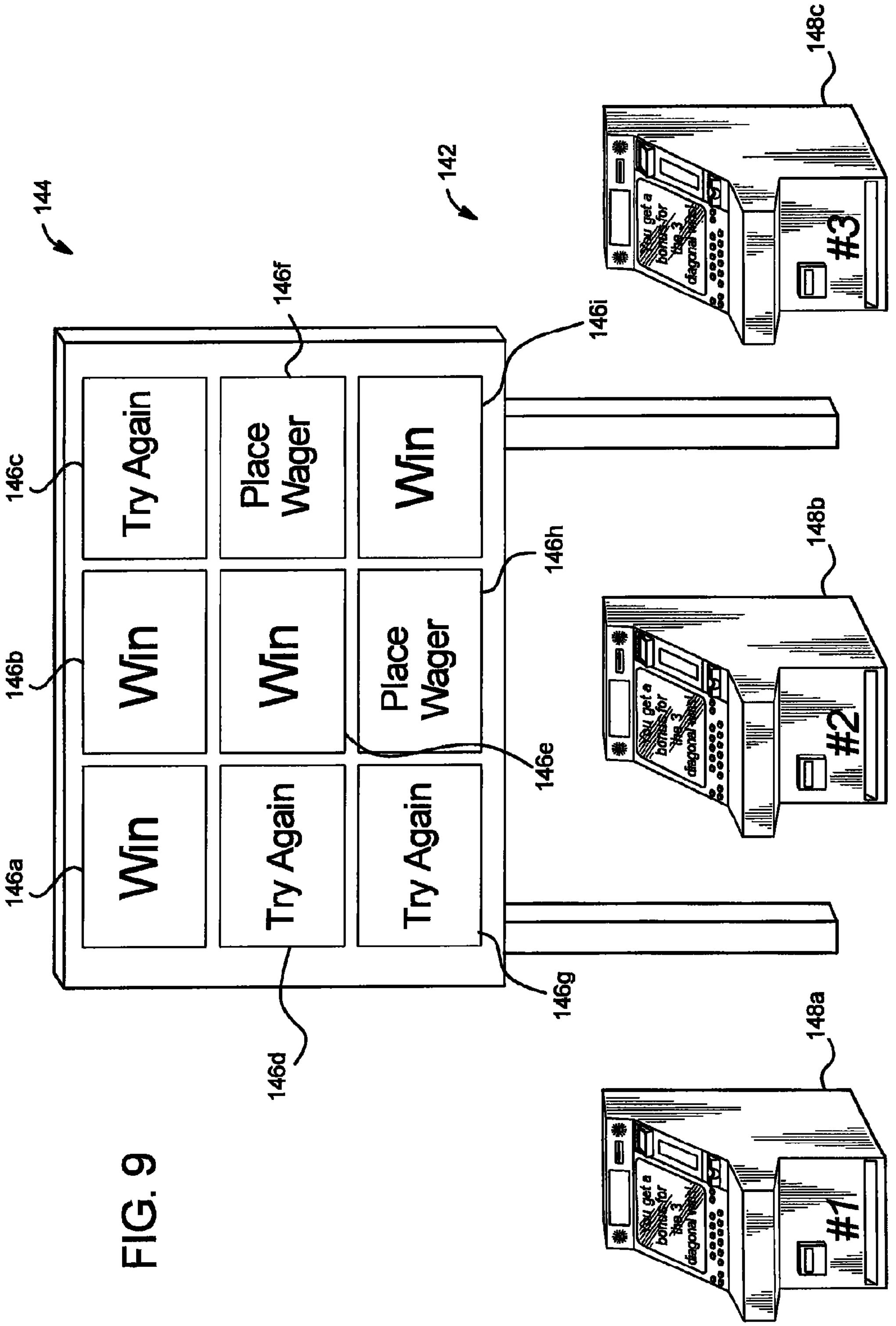
FIG. 9 is a perspective view of one embodiment of the disclosed gaming system which provides a bonus award to the players based on multiple game results displayed on multiple display segments of the central display.

As illustrated in FIG. 9, the gaming system of the present disclosure may provide one or more players an award based on the game results of other display segments. In the illustrated embodiment, if a certain group of display segments all display or result in a winning game outcome, one, a plurality or all of the active players receive an award.

As illustrated in FIG. 9, the gaming system of the present disclosure may provide one or more players an award based on the game results of other display segments. In the illustrated embodiment, if a certain group of display segments all display a winning game outcome, one, a plurality or all of the active players receive an award.

In FIG. 9, the gaming system 142 includes a central display 144 which includes a plurality of display segments 146*a*, 146*b*, 146*c*, 146*d*, 146*e*, 146*f*, 146*g*, 146*h* and 146*i*. In one embodiment, if the display segments display a certain pattern or a certain combination of display segments display certain outcomes, the gaming system awards each of the players an award. In the illustrated embodiment, the winning pattern is a "tic-tac-toe" configuration. That is, anytime three display segments in a row display a winning game result at the same time, in one embodiment, each player of the gaming system receives an award. As illustrated in FIG. 9, three of the display segments 146*a*, 146*e* and 146*i* diagonally display winning game outcomes. Therefore, each of the player stations 148*a*, 148*b* and 148*c* each display a message informing the players that they receive a bonus award for the diagonal wins. In another embodiment, only the players playing the winning display segments win an award. It should be appreciated that a certain group of players may only receive an award if a minimum bet is made by the player. In other embodiments, awards are only provided to the players if a minimum bet is made by each of the player's playing the winning display segments.

It should be appreciated that this embodiment can be implemented for any pattern or any combination of winning or non-winning game outcomes of the display segments. This combination can include any active or non-active display segments. In one embodiment, only the players that are playing the display segments that form the winning pattern receive an award.

Figure 10A:
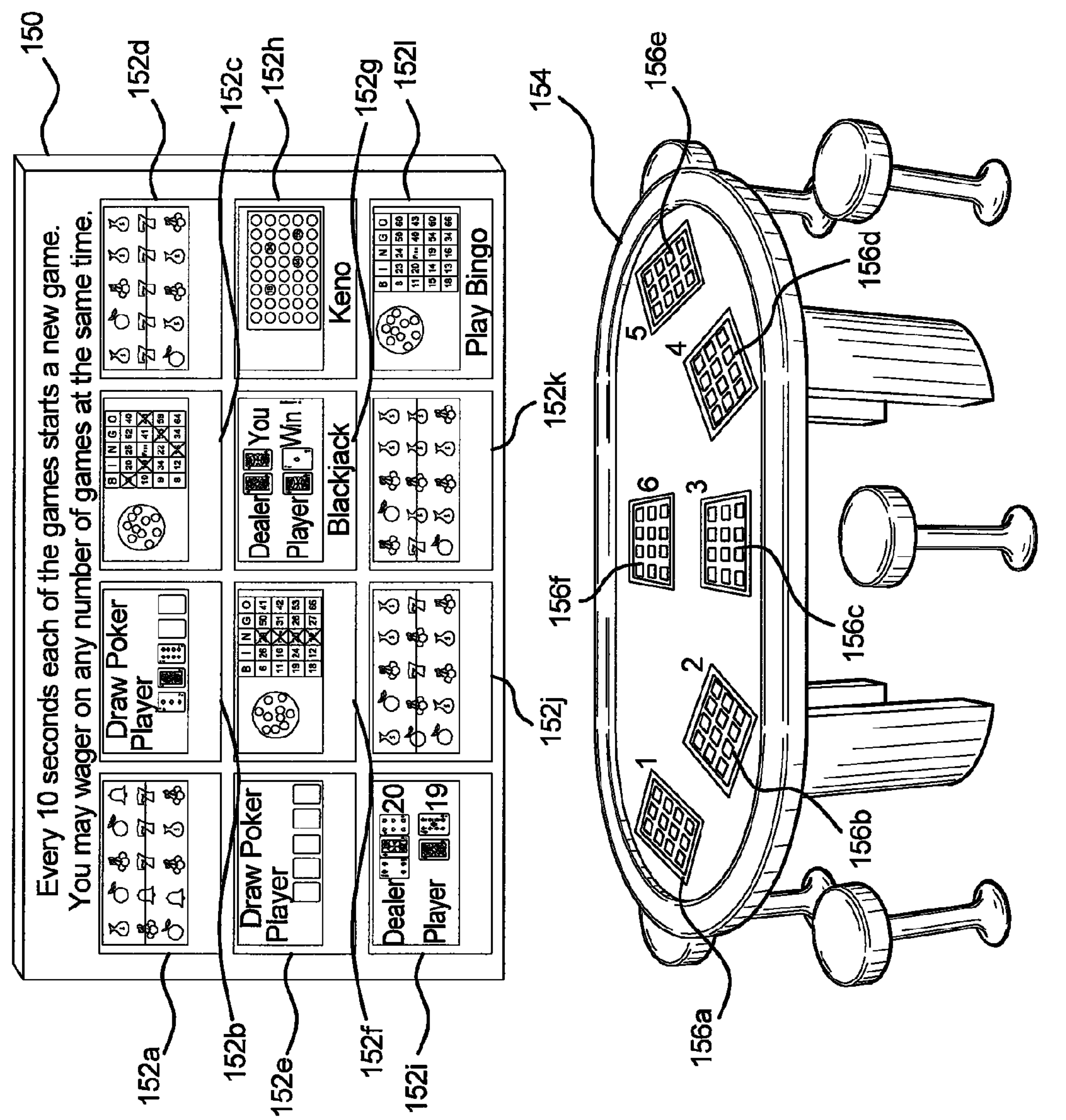
FIGS. 10A, 10C, 10G, 10H and 10I are perspective views of one embodiment of the disclosed gaming system that includes a plurality of player stations at a table and a central display, wherein the gaming system enables players to participate in the displayed games for a participation period and after a participation period ends, the gaming system simultaneously generates and displays a game outcome for each of the displayed games.

In another embodiment, as illustrated in FIGS. 10A, 10B, 10C, 10D, 10E, 10F, 10G, 10H, and 10I, the gaming system has a participation period and enables the players to wager on one, a plurality or all of the games during the participation period. The gaming system then initiates simultaneous game play for all of the games at the end of the participation period. This embodiment produces fast-paced gaming enabling players to quickly and simultaneously wager on multiple games. As illustrated in FIG. 10A, the gaming system includes a central display 150. The central display includes a plurality of different games 152*a*, 152*b*, 152*c*, 152*d*, 152*e*, 152*f*, 152*g*, 152*h*, 152*i*, 152*j*, 152*k* and 152*i*. The gaming system includes a table 154 including a plurality of different player stations 156*a*, 156*b*, 156*c*, 156*d*, 156*e* and 156*f*.

Figure 10B:
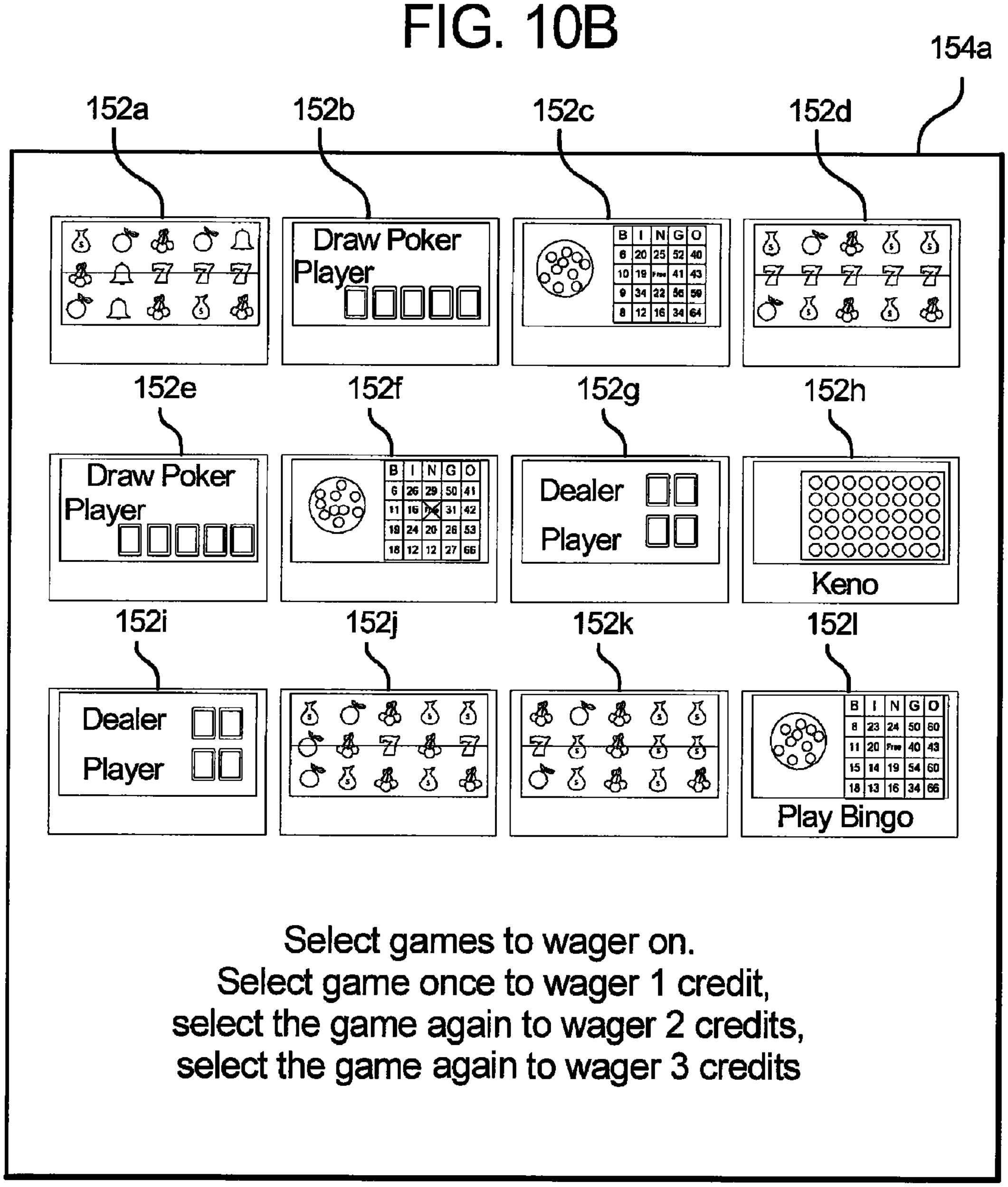
FIGS. 10B, 10D, 10E and 10F are screen shots of the display devices of a plurality of the player stations of FIGS.

In one embodiment, as illustrated in FIG. 10B, each of the player stations includes or displays a betting display or betting menu enabling the player to select which games to wager on. For example, FIG. 10B illustrates a screen shot of the display device which includes a touch screen of Player Station 1 156*a*. The display device informs the player to select the games to wager on. In one embodiment, the display device enables the player to touch the game or games to wager on and to touch that game another time to wager another credit on that game. For example, the player selects a game to wager on and wagers one credit on that game by touching the corresponding game icon on the touch screen once. To wager two credits on that game, the player must touch that same game icon twice. To wager three credits on that game, the player must touch that same game icon three times. It should be appreciated that the gaming system may enable the player to select games and to select wager amounts in any suitable manner.

Figure 10C:
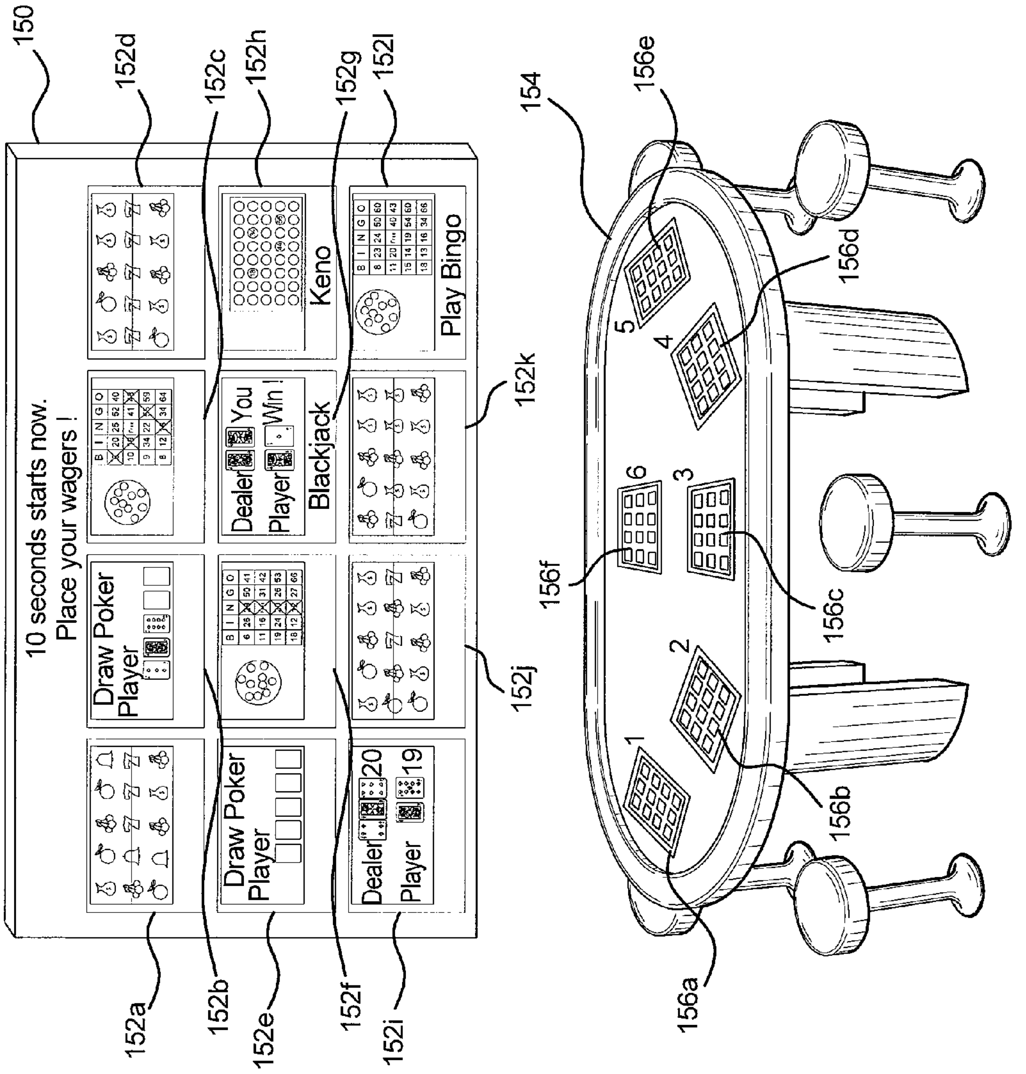

As illustrated in FIG. 10C, in the illustrated embodiment, the participation period is time period of 10 seconds. The gaming system enables players to wager on games for 10 seconds and then simultaneously displays a game result for each of the games 152*a*, 152*b*, 152*c*, 152*d*, 152*e*, 152*f*, 152*g*, 152*h*, 152*i*, 152*j*, 152*k* and 152*i*.

Figure 10D:
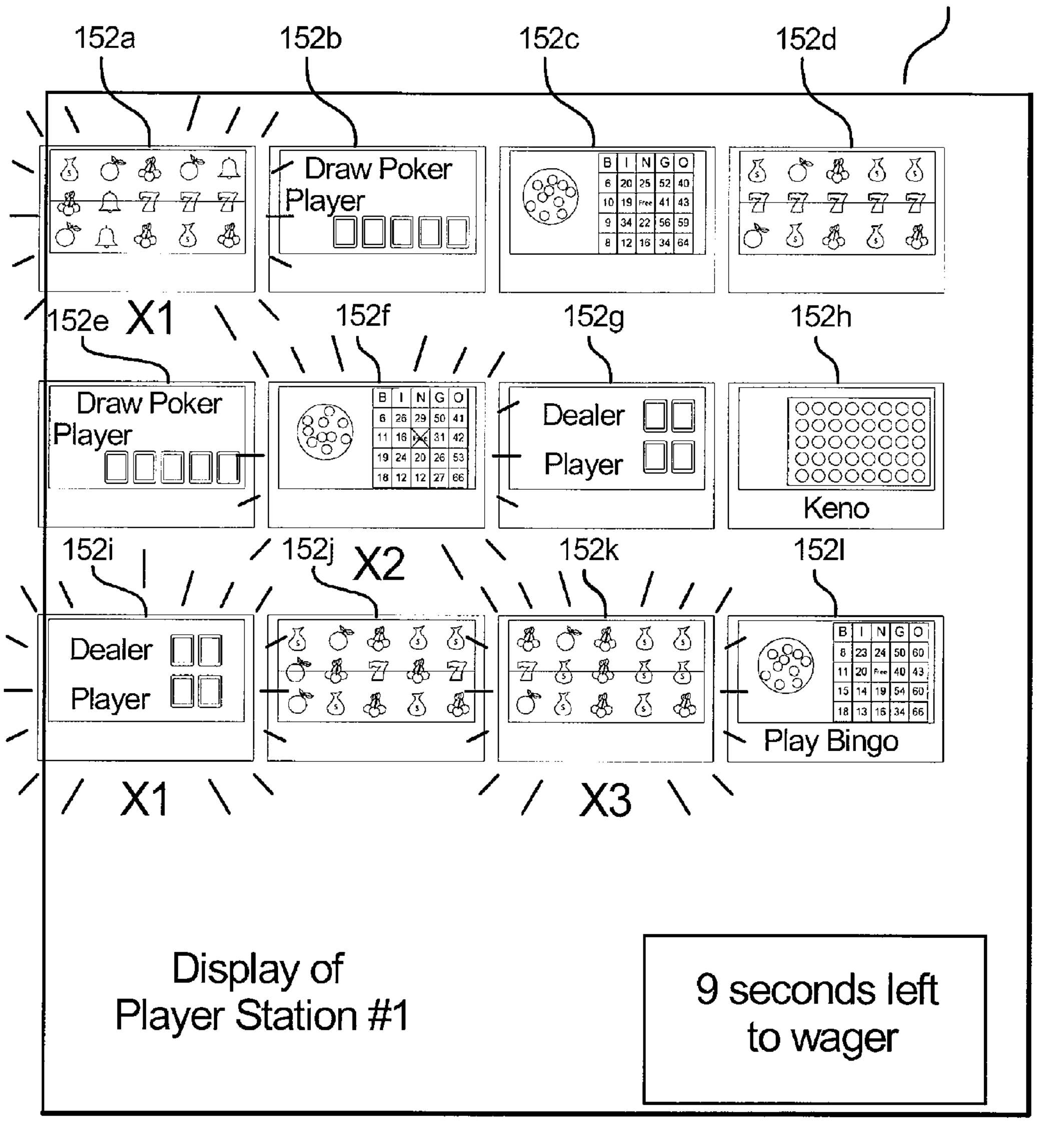

FIG. 10D is a screen shot of the display device of Player Station 1 156*a* illustrating the selections of an individual player at Player Station 1 156*a*. The player wagers one credit on a slot game 152*a*, two credits on a bingo game 152*f*, one credit on a blackjack game 152*i* and three credits on a slot game 152*k*. In one embodiment, the display device informs the player of the participation count down.

Figure 10E:
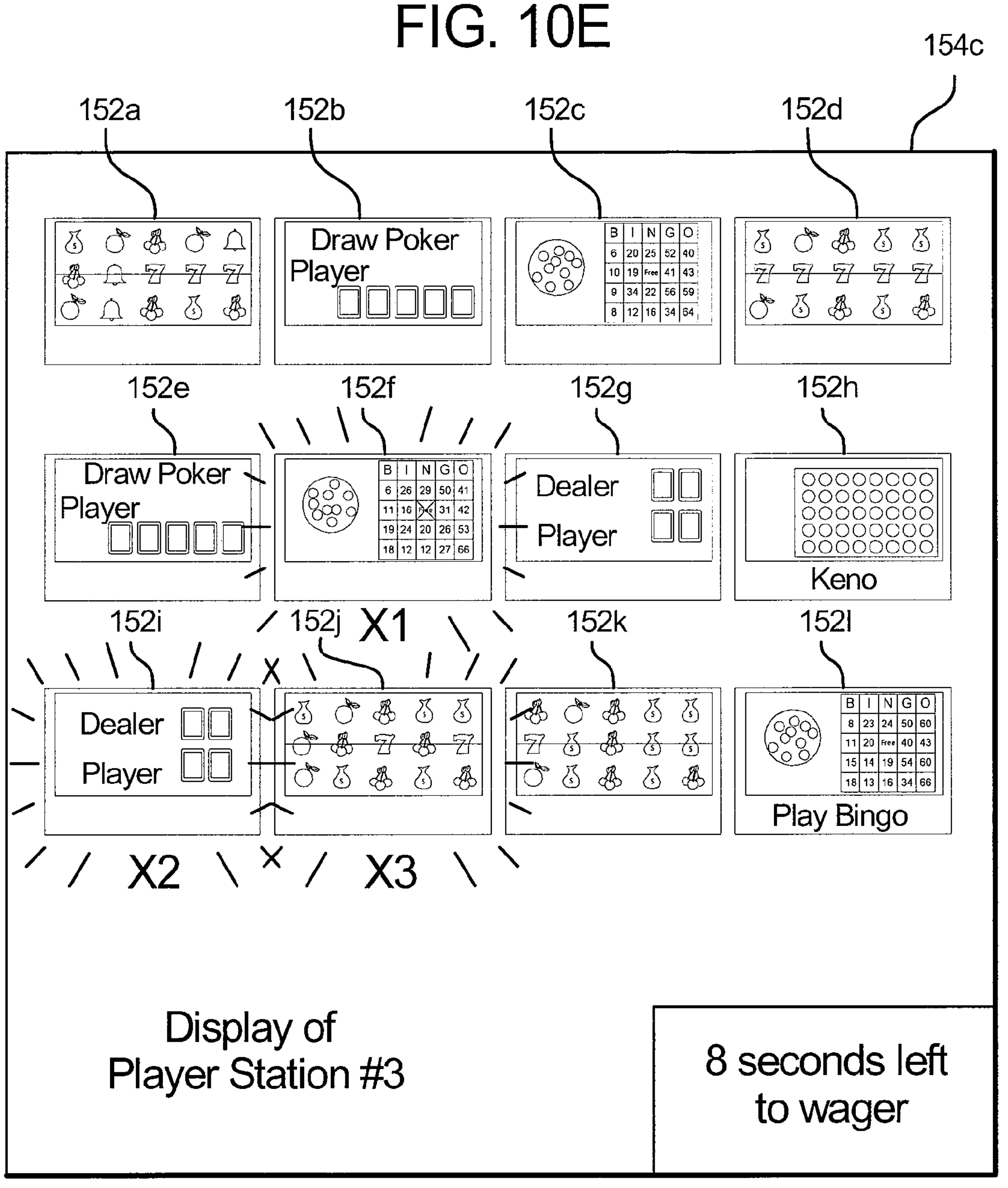

FIG. 10E is a screen shot of the display device of Player Station 3 156*c* illustrating the individual selections of a player at Player Station 3 156*c*. The player wagers one credit on a bingo game 152*f*, two credits on a blackjack game 152*i* and three credits on a slot game 152*l*. As illustrated, in one embodiment, the display device informs the player of the participation count down and how much time they have left to make their selections.

Figure 10F:
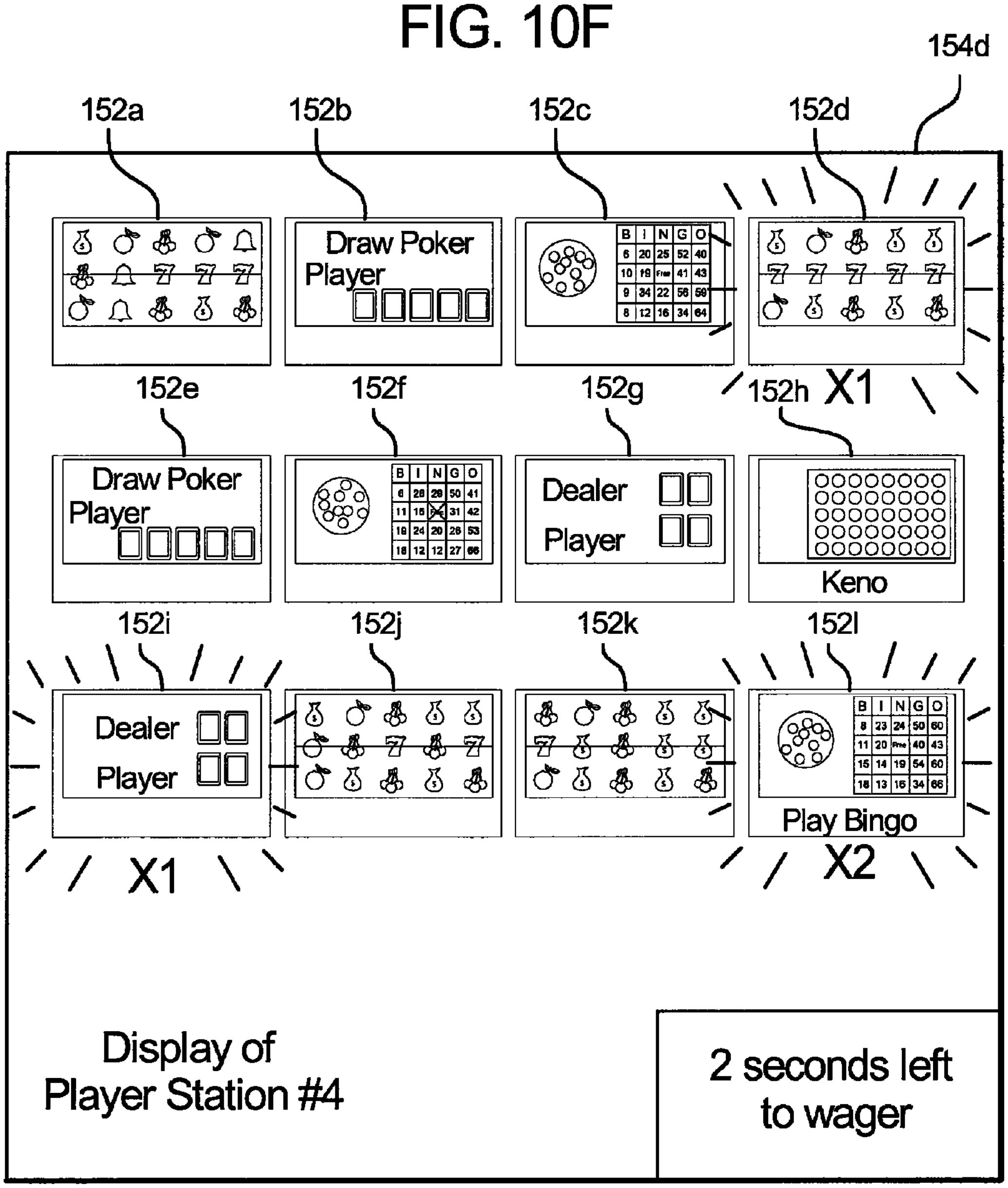

FIG. 10F illustrates the selections of a player at Player Station 4 156*d*. The player wagers one credit on a slot game 152*d*, two credits on a blackjack game 152*i* and two credits on a bingo game 152*l*.

It should be appreciated that some of the players are simultaneously wagering on the same games. The same game outcome will thus provide the participating players with a same game outcome, creating a feeling of excitement at the table. However, of players wager on different features of the same game, for example, different paylines, each of the players could have a different individual game result resulting from the same game outcomes. Any awards provided to the players are additionally based on the amount wagered by that player.

Figure 10G:
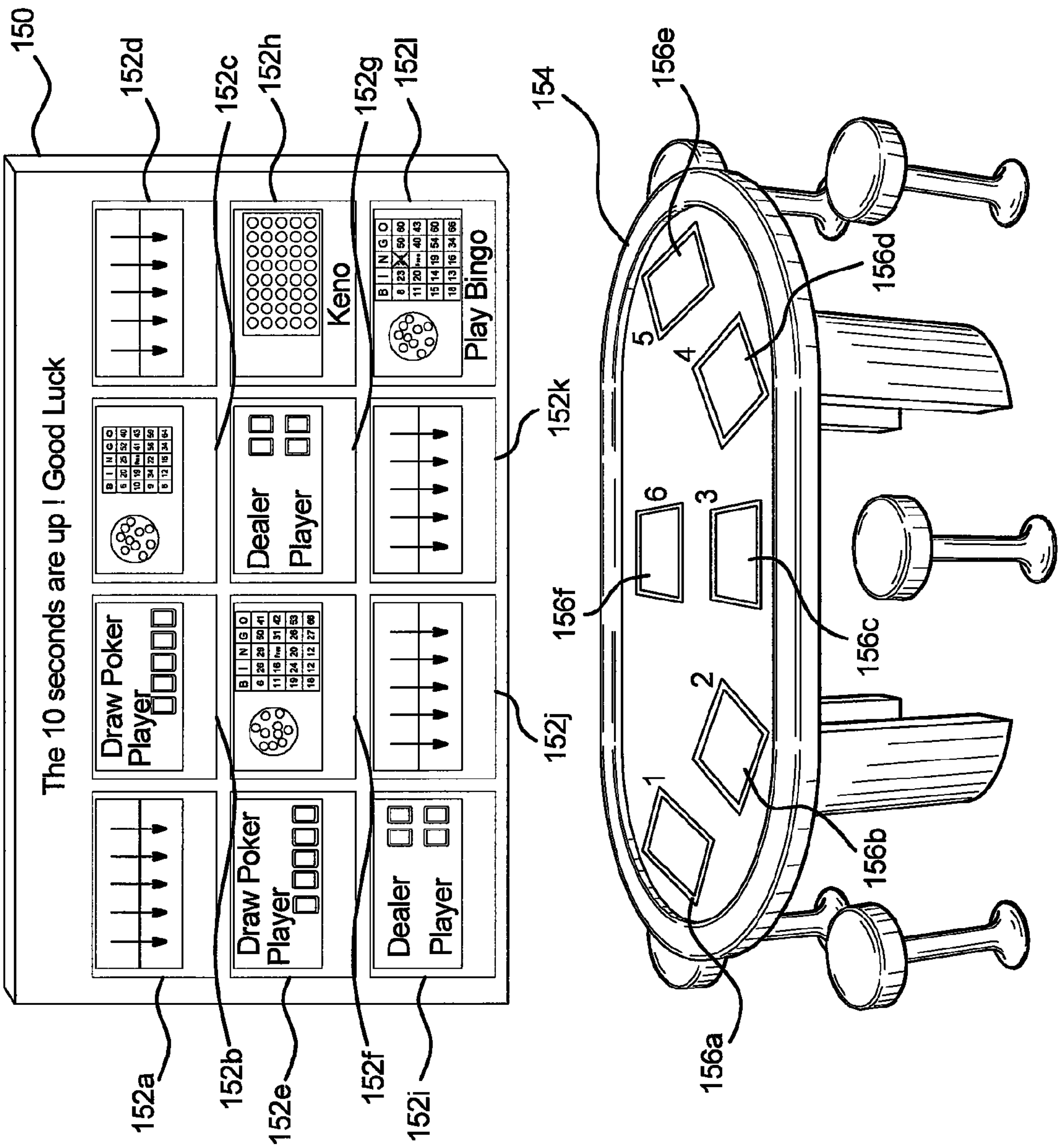

As illustrated in FIG. 10G, the participation period of the countdown of 10 seconds is over. The central display displays each of the games 152*a*, 152*b*, 152*c*, 152*d*, 152*e*, 152*f*, 152*g*, 152*h*, 152*i*, 152*j*, 152*k* and 152*l* generating a game outcome.

Figure 10H:
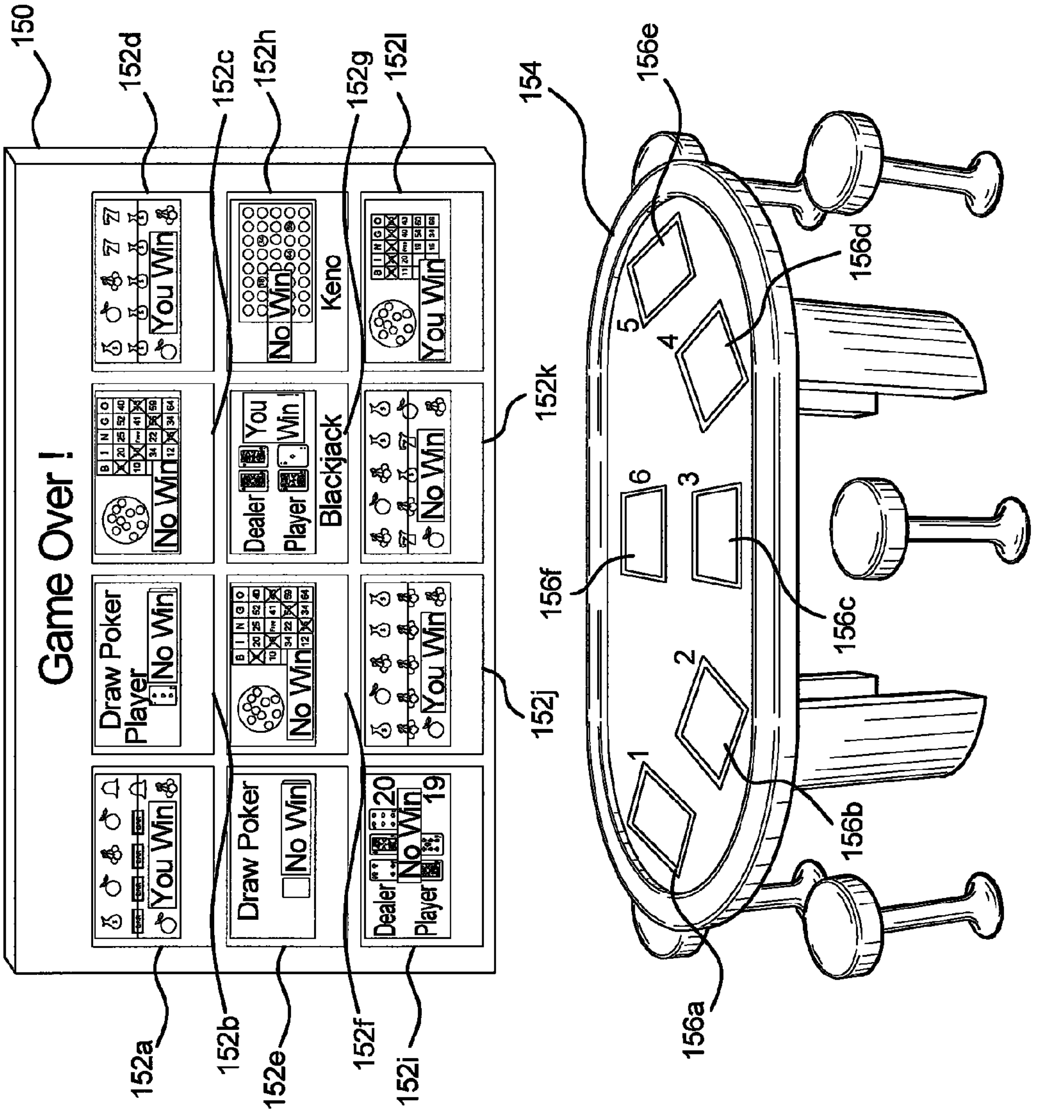

As illustrated in FIG. 10H, the central display displays an outcome for each of the games 152*a*, 152*b*, 152*c*, 152*d*, 152*e*, 152*f*, 152*g*, 152*h*, 152*i*, 152*j*, 152*k* and 152*l*. The gaming system generates winning game outcomes for a plurality of the games.

Figure 10I:
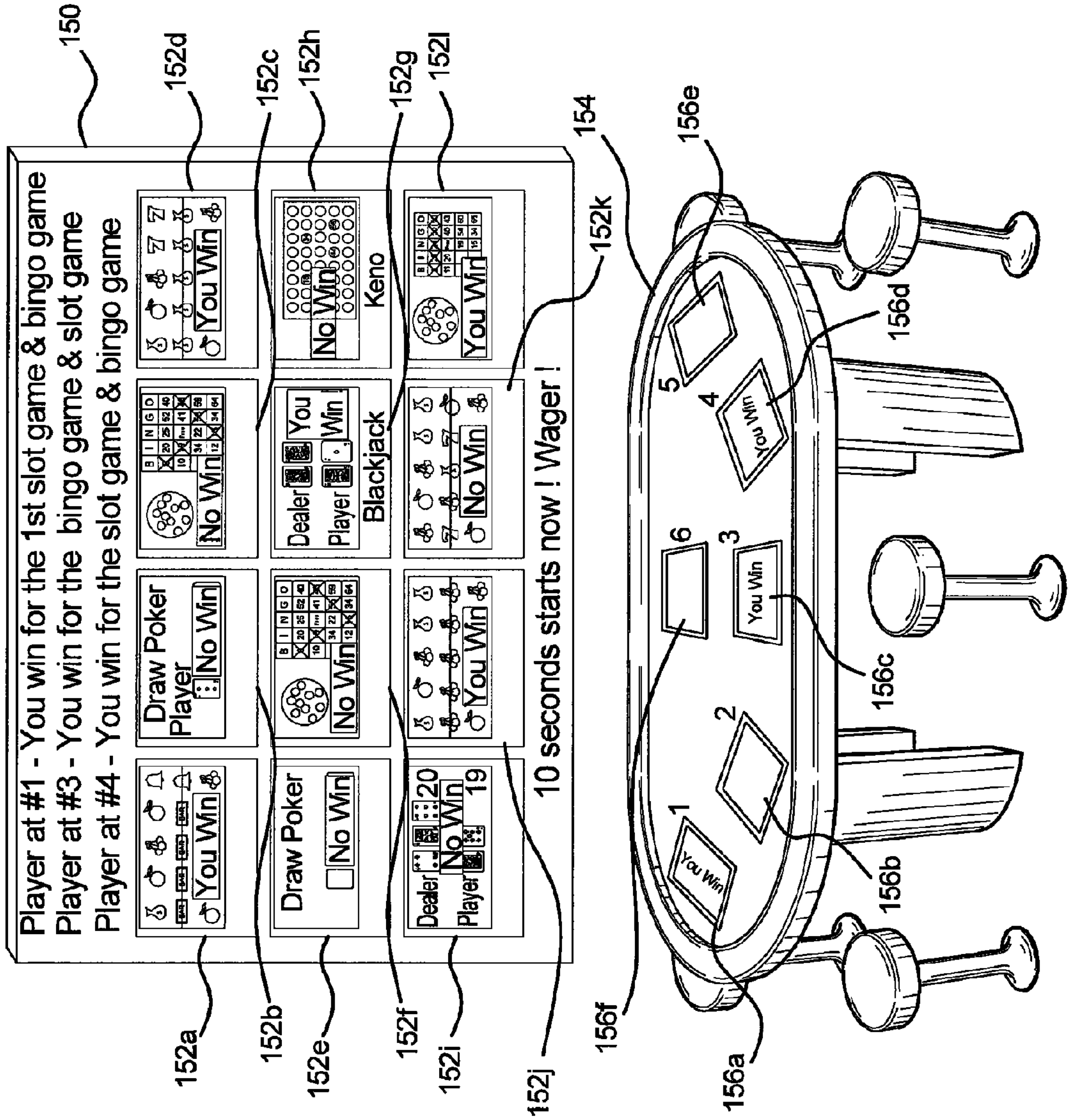

As illustrated in FIG. 10I, each of the players wins a plurality of the games. The player at Player Station 1 won for the bar-bar-bar-bar symbol combination on the payline of the first slot game 152*a* and for the four corners generated in the bingo game 152*f*. The player at Player Station 3 won for the four corners in the bingo game 152*f* and for five cherries in the slot game. The player at Player Station 3 won for the five money bag symbols generated in the slot game 152*d* and for the bingo win 152*l*.

As illustrated in FIG. 10I, the gaming system begins the participation period over again.

It should be appreciated that the participation periods may be implemented in any suitable manner. In one embodiment, the participation period begins after all of the games have been played that were wagered on in the prior participation period. In another embodiment, a next participation begins before the end of the play of the games or before the awards are displayed to the player resulting from the games that were wagered on in the prior participation period. That is, in certain embodiments, game play and participation periods overlap. It should be appreciated that different participation periods may be determined in any suitable manner. In one embodiment, the participation periods overlap. In another embodiment, the participation periods are staggered. For example, participation periods are for different games or different groups of games overlap and/or are staggered. For example, a participation period for games 1, 2, and 3 is from 12:00 to 12:02. A participation period for games 3, 4, and 5 is from 12:01 to 12:03. A participation period for games 6 and 7 is from 12:04 to 12:08. In another embodiment, for a single gaming system some participation periods overlap and some participation periods are staggered. The participation periods for different games may be determined in any suitable manner. The participation periods may be any suitable length of time and different participation periods may include the same amount of time or different amounts of time. In one embodiment, the participation period is determined by an occurrence of a triggering event, such as a predetermined amount wagered on a play of a game or by a predetermined number of players wagering on a play of a game. For example, when $100 is wagered on a play of a game, the participation period for that game ends. In another example, when 10 people wager on a play of a game, the participation period for that game ends. In another embodiment, one or more triggering events starts a countdown for a participation period, for example, when 5 people wager on a play of a game and the total amount wagered on that play of the game is over $25, the gaming system ends the participation period in 30 seconds from that triggering event, enabling other players to place their wagers.

In another embodiment, as illustrated in FIGS. 11A, 11B, 11C, 11D and 11E, each of the games of the central display includes a game number. The gaming system enables the players to select a game and determine a wager denomination (e.g., a penny, a nickel, a quarter or a dollar), enter a wager and press a button to join in. The gaming system informs them of the game number they will participate in. The gaming system generates a game outcome on the display segments and displays the game results on the player the player stations.

Figure 11A:
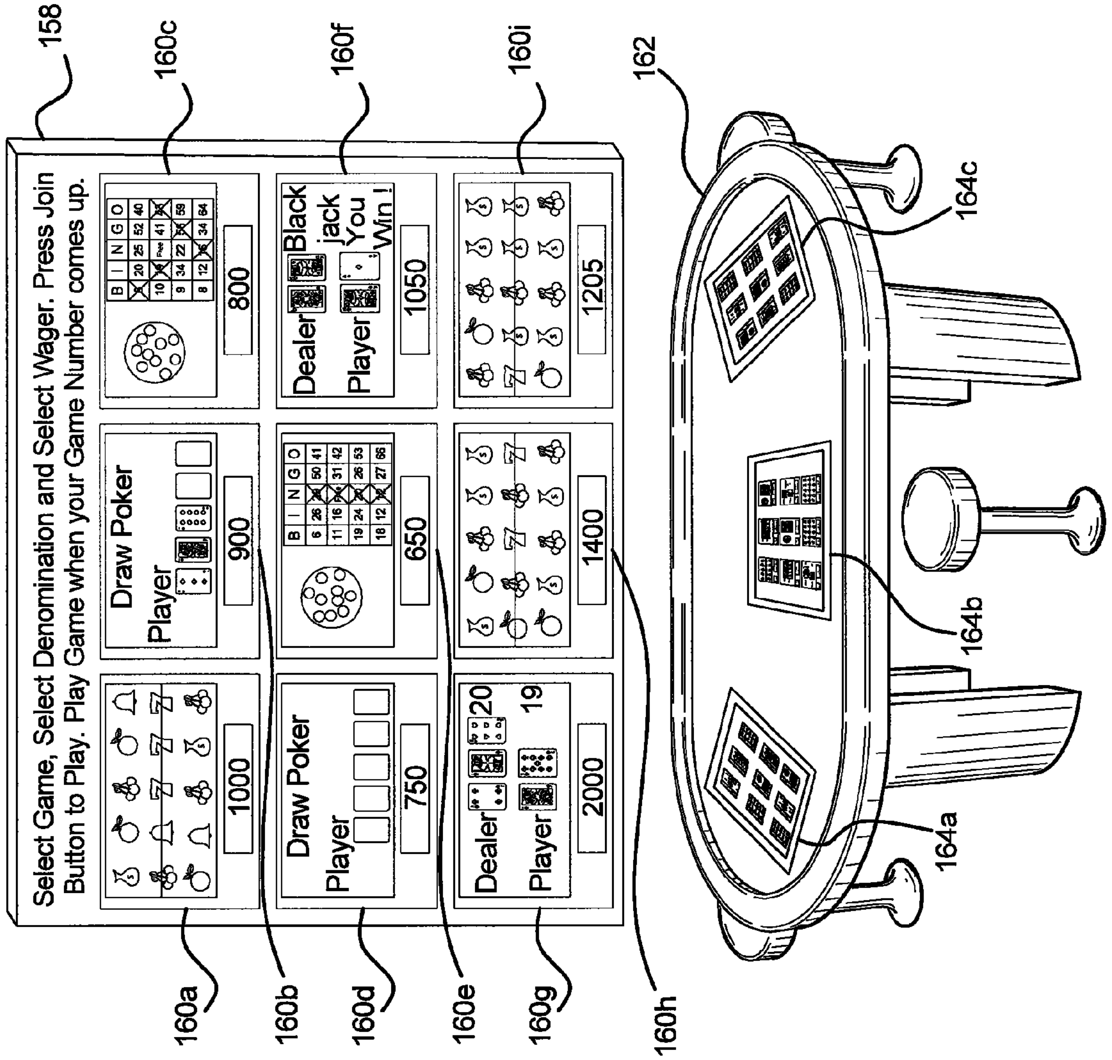

As illustrated in FIG. 11A, the gaming system includes a central display 158. The central display 158 includes a plurality of display segments 160*a*, 160*b*, 160*c*, 160*d*, 160*e*, 160*f*, 160*g*, 160*h* and 160*i* that each display a single game. In one embodiment, each display segment displays a game number. For example, the first display segment 160*a* displays game number 1000 and the second display segment 160*b* displays game number 900. It should be appreciated that the game numbers may be indicated to the players in any suitable manner. The game numbers inform the players of the current game being played on that display segment. In one embodiment, each of the games automatically start. The gaming system includes a table 162 including a plurality of player stations 164*a*, 164*b*, and 164*c*. In one embodiment, each of the player stations displays a game index or grid. In one embodiment, the game index displays each of the games of the central display or displays a representation of the games currently being played on the central display. To participate in one or more of the displayed games, the player simply has to make an entry at the player station to choose one or more games, choose a wager denomination and make a wager and press the join button. The player station then informs the player of which number game they will be eligible to play.

Figure 11B:
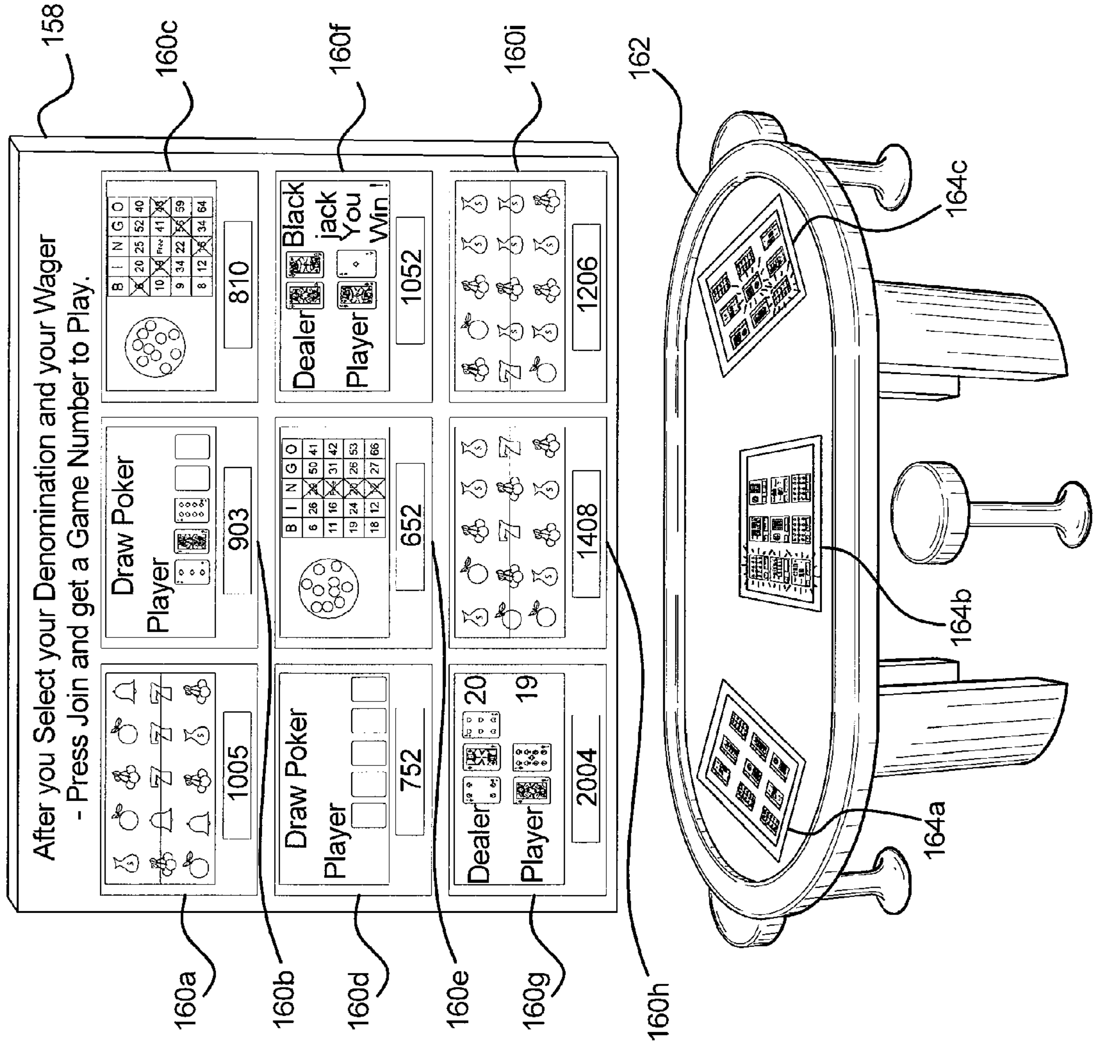

In one embodiment, as illustrated in FIG. 11B, players at the second 164*b* and the third 164*c* player stations each make an input to play two games. In one embodiment, a touch screen of the player station enables the player to touch the game on the game index to choose the games. It should be appreciated that the gaming system may enable the player to choose their games in any suitable manner.

Figure 11C:
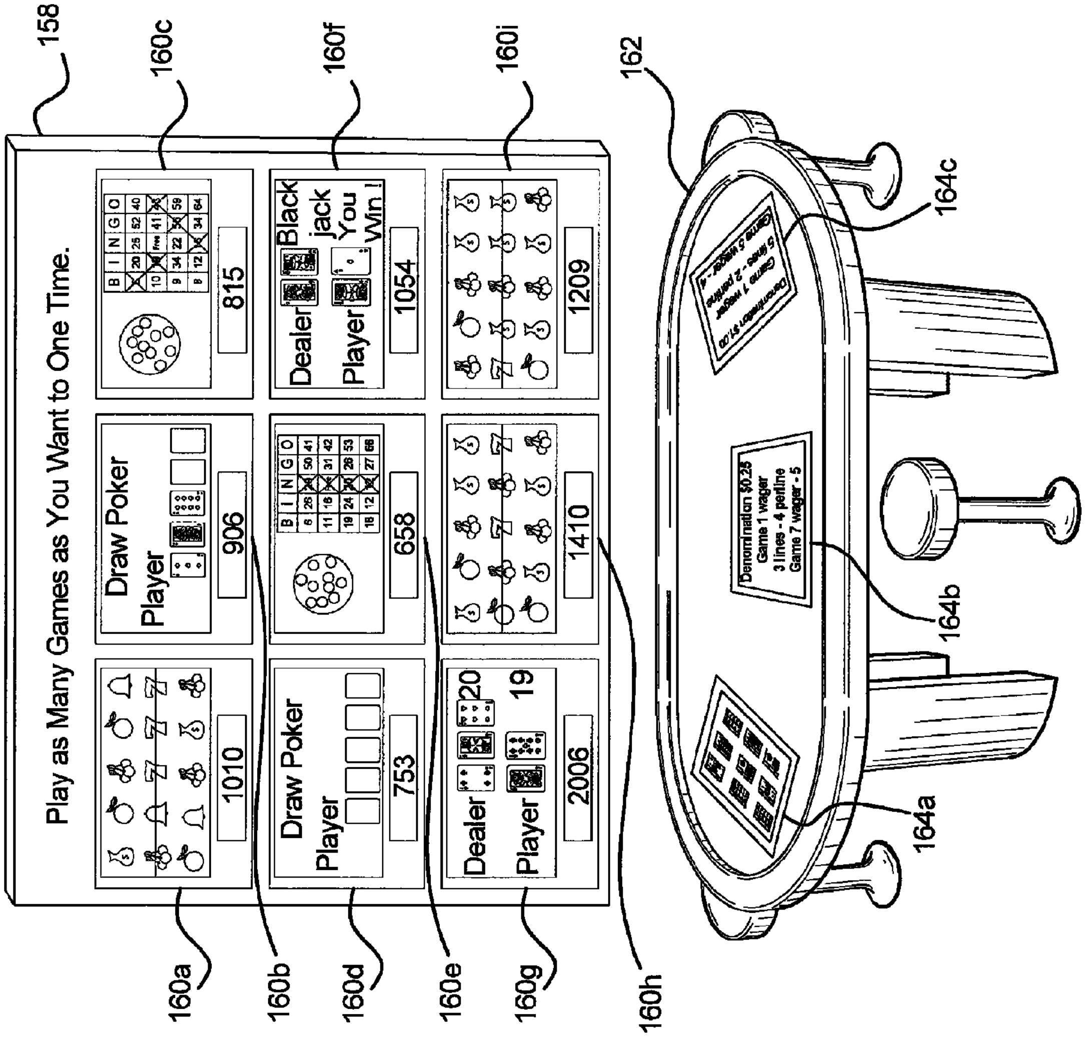

As illustrated in FIG. 11C, in the illustrated embodiment, the player stations enable the players to place their wagers. The player at the second player station 164*b* chooses or picks the wager denomination of $0.25 and wagers on three paylines and wagers four credits per payline in the first game 160*a* and wagers five credits on the blackjack game 160*g*. The player at the third player station 164*c* chooses a wager denomination of $1.00 and wagers on 5 paylines and wagers two credits per payline in the first game 160*a* and wagers four credits in the fifth game 160*e*.

Figure 11D:
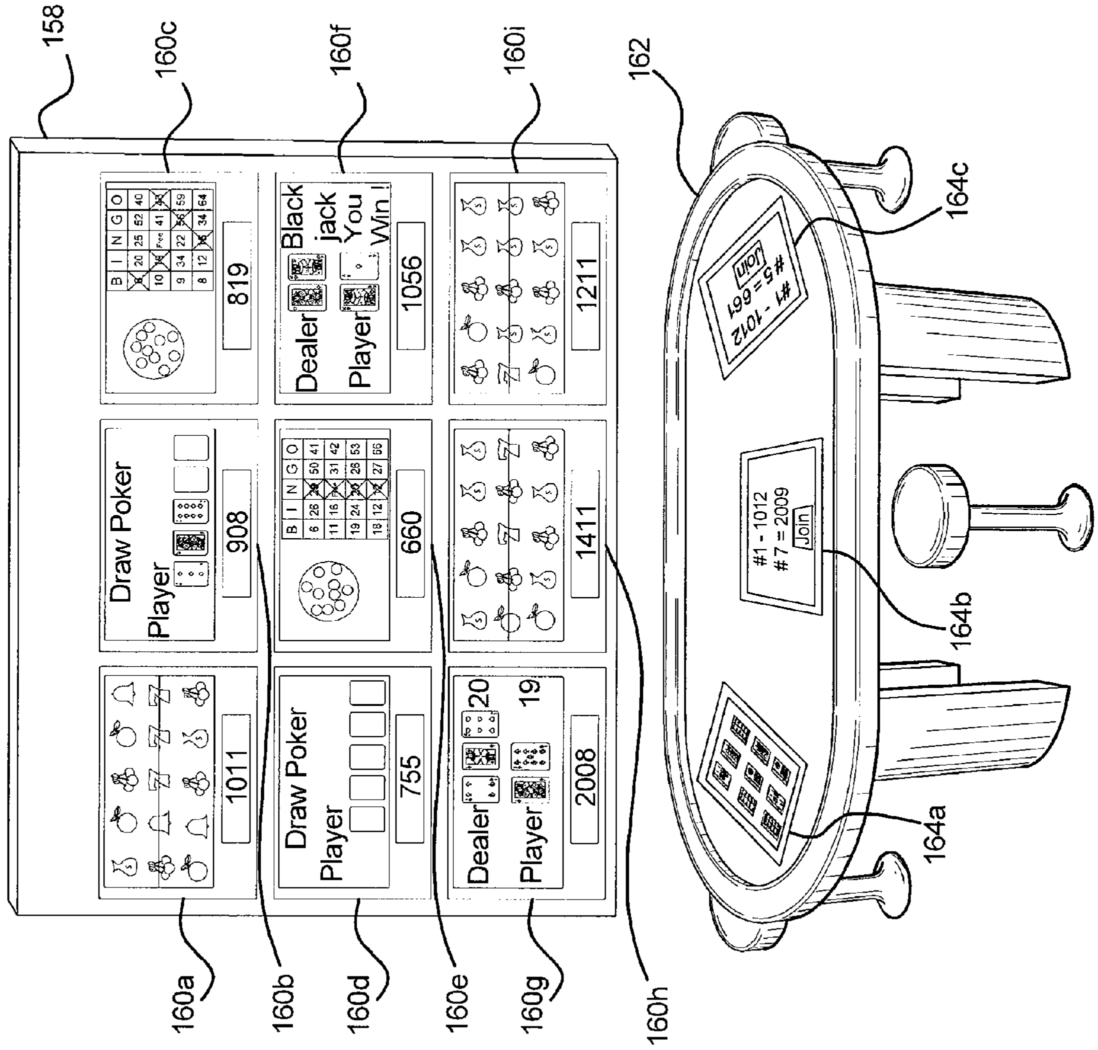

As illustrated in FIG. 11D, the player stations inform the players of which games they will play. For example, the second player station 164*b* informs the player that the player will play game number 1012 on the first display segment 160*a*, which is currently at game 1011. The second player station 164*b* informs the player that they will additionally play the next blackjack game at game number 2009. Likewise, the third player station 164*c* informs the player that the player will play the first display segment at game 1012 and the fifth display segment at game 661.

Figure 11E:
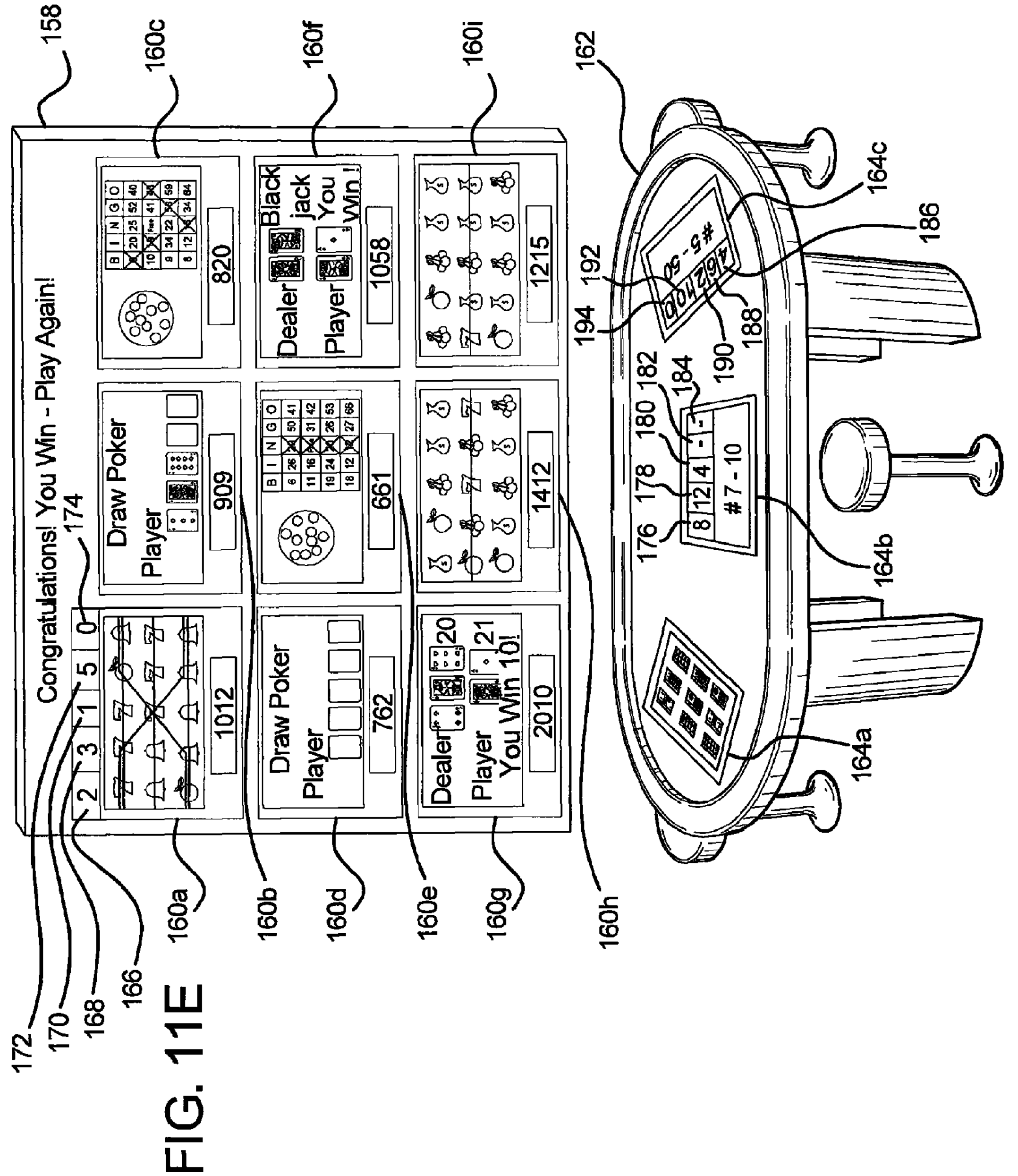

As illustrated in FIG. 11E, both of the players won. In one embodiment, one or more of the display segments displays the outcomes of the game. As illustrated in FIG. 11E, the first display segment 160*a* displays a row with five boxes 166, 168, 170, 172 and 174 above the game display. Each of these boxes corresponds to the game outcomes for each payline based on a one credit wager. Therefore, players can easily tell which paylines are winning and how much they won. For example, an award of two credits is associated with the first payline as illustrated in the first box 168 displayed on the first display segment 160*a*. In one embodiment, each of the players then win the amount they wagered multiplied by the payline win. The credits displayed in the boxes on the first display 160*a* are general credits that are then transferred to the denominations chosen by the players. As illustrated in the FIG. 11E, the display device of the second player station displays a plurality of game result boxes, displays or areas 176, 178, 180, 182 and 184 that correspond to the paylines of the first display segment the player at the second player station won eight credits for the first payline. Each credit is worth $0.25 because that was the credit denomination chosen by the player. Since the player wagered 4 credits for the first payline the player wins 8 quarters or two dollars. Likewise, the player wins twelve $0.25 credits (3×4) for the second payline as displayed in the second box 178 of the player station 164*b* and four $0.25 credits (1×4) for the third payline, as indicated in the third box 180 display of the player station 164*b*. The player of the second player station 164*b* also won 10 $0.25 credits for winning blackjack. It should be appreciated in some embodiments the gaming system enables players to choose different denominations for different games or different denominations for the same game. The player of the third player station 164*c* won four $1.00 credits, (2×2 credits bet per line) for the first payline as displayed in the first box 186, six $1.00 credits (3×2) for the second payline as displayed in the second box 188, two $1.00 credits (1×2) for the third payline as displayed in the third box 190, ten 1.00 credits (5×2) for the fourth payline as displayed in the fourth box 192 and did not win any credits for the fifth payline as displayed in the fifth box 194.

It should be appreciated that the gaming system may inform the players of eligible games in any suitable manner. In one embodiment, the player stations inform the player of which game they are playing. In another embodiment, the display segments indicate which player is playing which game. For example, the numbers of the player stations which are playing that game are displayed on that display segment. In another embodiment, an icon or nickname of a player is displayed on the display segment when they are playing that display segment. In one embodiment, a player may choose to play the display segments confidentially and nothing is displayed associating a particular player with a particular display segment.

It should be appreciated that the gaming system may inform the players of the player's game results and awards in any suitable manner. In one embodiment, each display segment displays the game outcomes to the players and the particular winnings of the player, based on the wagers, are displayed to the players on their player stations. In one embodiment, each display segment displays the game outcomes to the players and the player's game results are illustrated on the player's player station. In another embodiment, the wins and/or the game results are displayed to the players on the display segments. For example, after a game determination, the display segment displays a screen illustrating each of the wins for the game, such as Player 1 won 5 credits and Player 50 won 100 credits. In another embodiment, the display segments display game results and all monetary wins and denominations are displayed on the player stations. It should be appreciated that the central controller and/or the player stations may determine part or all of a game outcome or award.

In another embodiment, as illustrated in FIGS. 12A, 12B, 12C, 12D and 12E, a central display 198 includes a plurality of display segments 200*a*, 200*b*, 200*c*, 200*d*, 200*e* and 200*f*. In the illustrated embodiment, each of the display segments displays a single game. The gaming system includes a gaming table 202 that includes a plurality of player stations 204*a*, 204*b* and 204*c*. In one embodiment, the gaming system includes a plurality of different player stations. As illustrated in FIG. 12A, the first player station 204*a* is a hand held device and the second and third player stations 204*b* and 204*c*, include larger touch screen tablets. The player stations may be wireless and need not be played at the gaming table 202 but are shown at the gaming table 202 for illustration purposes. In one embodiment, the gaming system enables the player to configure one or more aspects of the display of their player station. For example, the player can request that the player station provide the player with one or more simulations of actual game outcomes, just the game results for that player, one or more actual game replications, the outcome of every game, every individual player result, just win amounts, with no display of the game so the player can play on the central display only (only use player station to make wagers), or any other suitable display. It should be appreciated that the player's customizable display choices may be limited depending on the type of player station the player is using.

As illustrated in FIG. 12B, the gaming system prompts the players to select their games and place their wagers. The player at the first player station 204*a* selects the first game. The player at the second player station 204*b* selects the first game and the second game. The player at the third player station 204*c* selects the third game.

FIG. 12C illustrates an enlarged view of the gaming table 202. The player at the first player station 204*a* wagers four credits on the first payline of the first game. The player at the second player station 204*b* wagers three credits on the first and second paylines of the first game and five credits on the second game. The player at the third player station 204*c* wagers 10 credits on the third game.

As illustrated in FIG. 12D, each of the games generates a game outcome. The central display 198 displays the outcome for each game and the individual player stations display the game results for each of the players in the customized or configured format chosen by the player. It should be appreciated that while a plurality of players wager on the same game and the game has a single game outcome, each of the players may have different game results by wagering on different aspects of the game, such as by wagering on different paylines.

FIG. 12E illustrates the display of the game results customized on each of the player stations. For example, the player at the first player station 204*a* customized the handheld display to only display how much the player won per line. That is, that player customized the display to only display his or her personal wins and not to replicate a game outcome. As illustrated in FIG. 12E, the player station 204*a* displays three numbers representing each of the three paylines of the game displayed by the first display segment 200*a*. The players win amounts are shown below. In the illustrated embodiment, the first payline did not result in a win and therefore the player did not win. The second player chose to replicate the games that the player wagered. In one embodiment, the entire game is replicated. In another embodiment, only the game outcome is displayed or replicated. As illustrated in FIG. 12E, the slot game and the poker game outcomes that the player wagered on are split on the display device of the player's tablet player station 204*b*. The player won 50 credits for the three cherries on the second payline of the first game and did not win in the second game. In one embodiment, the gaming system highlights winning outcomes to the player that the player did not wager on. For example, in FIG. 12E, the third payline had a winning combination of four sevens and this third payline is highlighted by being darker on the player's player station. The player at the third player station 204*c* customized the player station to tell the individual game result and win amount. Therefore, the player's player station informs the player that the player achieved four corners in the bingo game and won 50 credits.

It should be appreciated that in certain embodiments, the player may customize the display of central display information and in other embodiments the player is not enabled to customize the display of central display information. In one embodiment, the ability to customize information is based on some aspect of the player such as the frequency the player plays the games of the central display, the amount wagered on the games of the central display or a player tracking rank of the player. It should be appreciated that the ability to customize the player station display may be based on any suitable factor. It should also be appreciated that in certain embodiments, the player may customize one or more aspects of the display of information on the player station (e.g., how game results are displayed) but may not have the ability to customize other information (e.g., advertisements displayed on the player station). It should be appreciated that the player may customize the player station in any suitable manner. It should also be appreciated that a player may customize the display of games to only view a game on a display segment.

In another embodiment, the gaming system does not enable the players to customize the player station game or outcome displays. The player stations may be configured to display (a) the wins for that player; (b) the game outcomes for that player; (c) the wins and losses for that player; (d) a replication of the game with that player's highest wager; (d) one or more active games wagered on by the player; (e) one or more active games not wagered on by the player; and (f) additional content, such as advertisements. The display of the player station may additionally be based on the type of player station. For example, a hand-held player station may not be operable to display as much content as a larger screen of a tablet display or a gaming device. In one such embodiment, the gaming system may only enable a player to view games and game outcomes on the central display.

It should be appreciated that the display segments may include any suitable display device. As illustrated in FIGS. 13A, 13B, 13C, 13D and 13E, the central display 206 of the gaming system displays six display segments 208*a*, 208*b*, 208*c*, 208*d*, 208*e* and 208*f*. In the illustrated embodiment, the upper three display segments 208*a*, 208*b* and 208*c* are mechanical wheels, though it should be appreciated that the wheels may be any suitable type of mechanical or video symbol generator. The lower three display segments 208*d*, 208*e* and 208*f* each display a slot game. Every six seconds the gaming system enables the players to wager on one, two or three of the slot games. Upon a bonus event, the gaming system spins one of the bonus wheels. In the illustrated embodiment, if the player is playing more than one game at the time of the bonus win, the player receives a multiplier, which is the number of games the player was playing. For example, if the player is playing all three slot games and achieves a bonus wheel spin, the player will receive the amount of the bonus wheel spin generated multiplied by three.

Figure 13A:
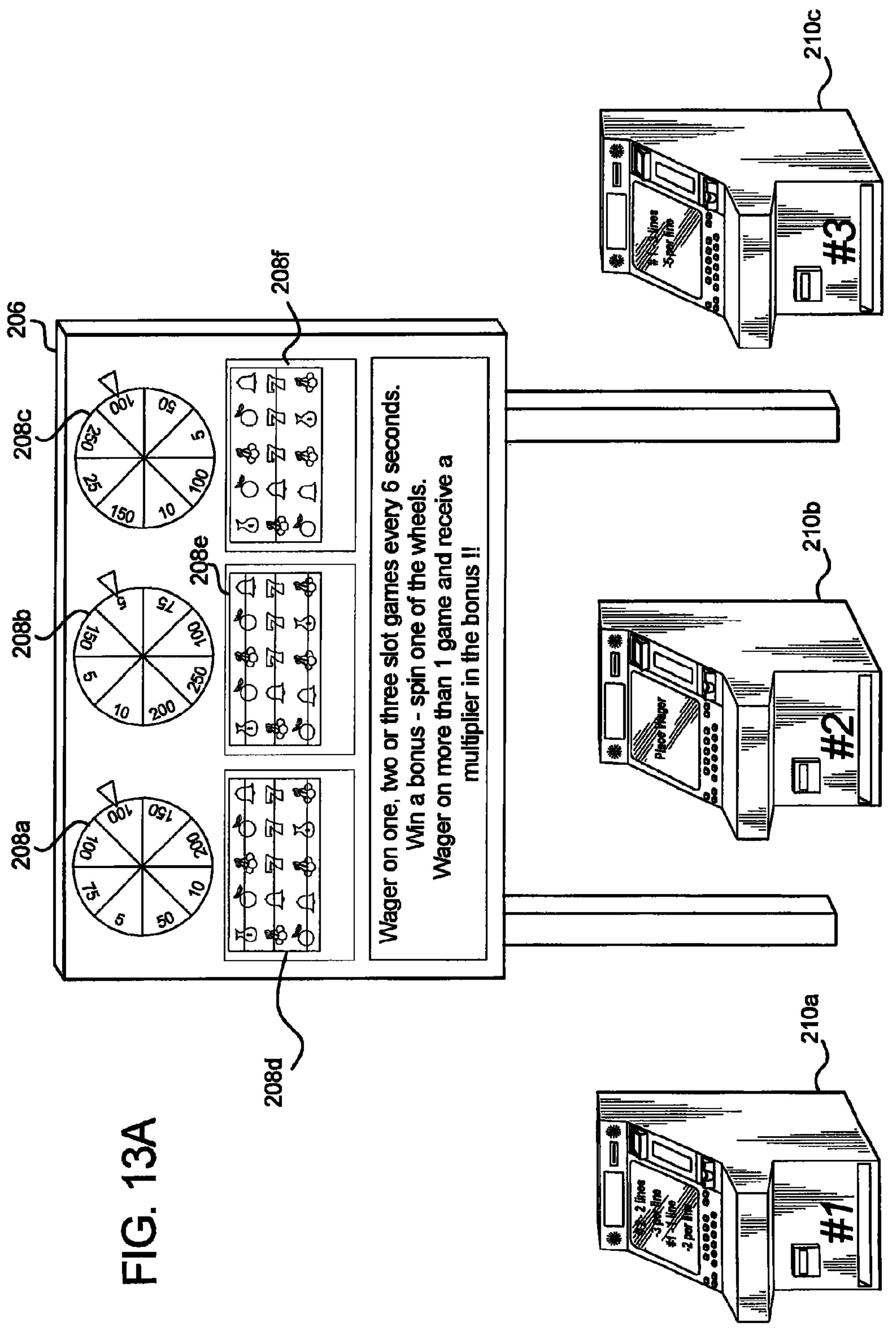

As illustrated in FIG. 13A, the player at the first player station 210*a* wagered three credits per payline on two paylines of the game displayed by the second display segment 208*e* and two credits on one payline of the first slot game displayed by the first segment 208*d*. The player at the third player station 210*c* wagered on three paylines of the first slot game and wagered five credits per payline.

Figure 13B:
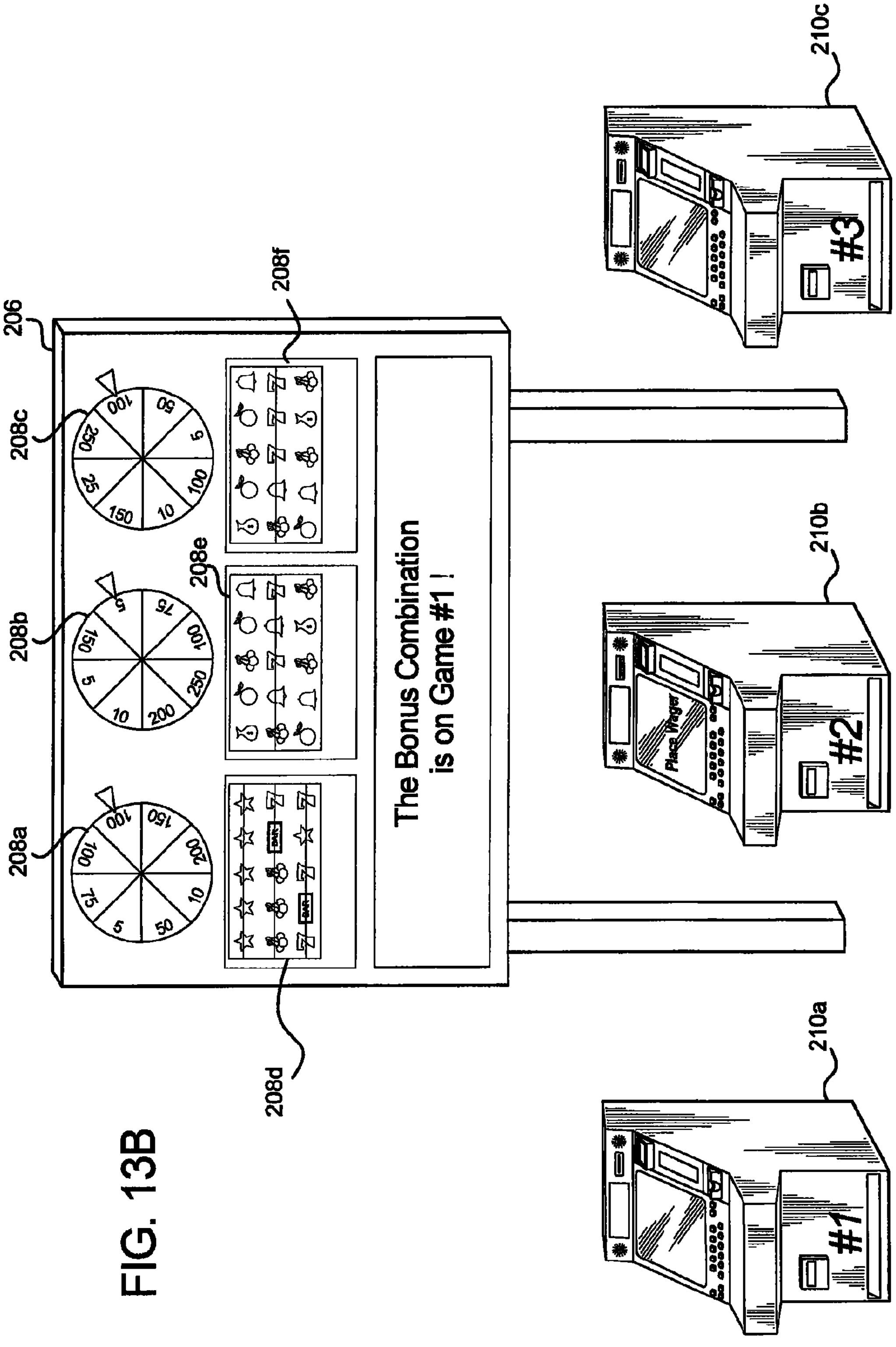

As illustrated in FIG. 13B, the first game generated five stars on the first payline. In the illustrated embodiment, five stars is the winning bonus combination. Since the players at the first and third player stations 210*a* and 210*c* both wagered on the first payline, both players will receive a bonus spin of one of the wheels.

Figure 13C:
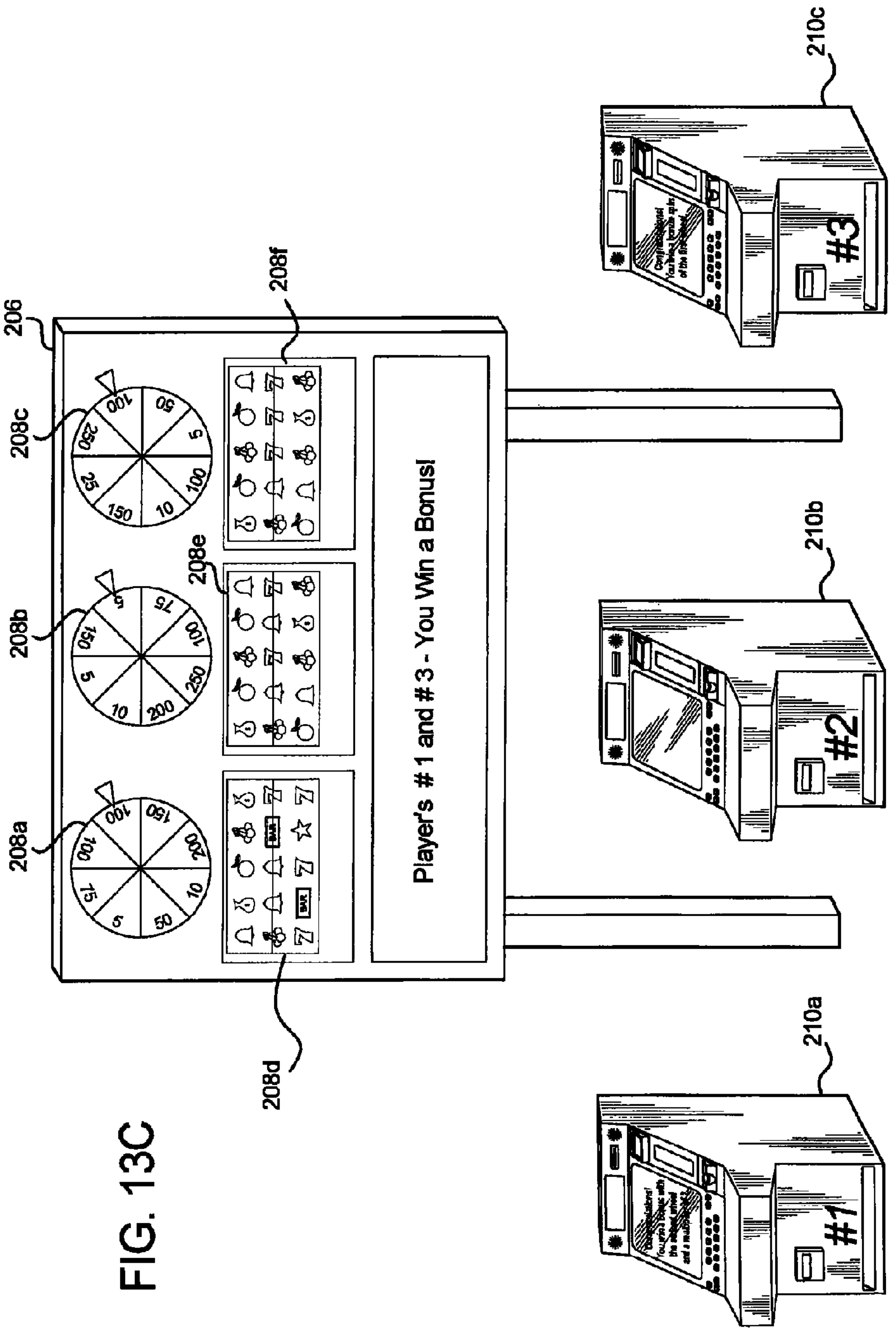

As illustrated in FIG. 13C, the player of the first gaming machine will play the bonus game on the first wheel with a multiplier of two because the player wagered on two of the slot games. The player of the third gaming machine will play the bonus game on the first wheel with no multiplier.

Figure 13D:
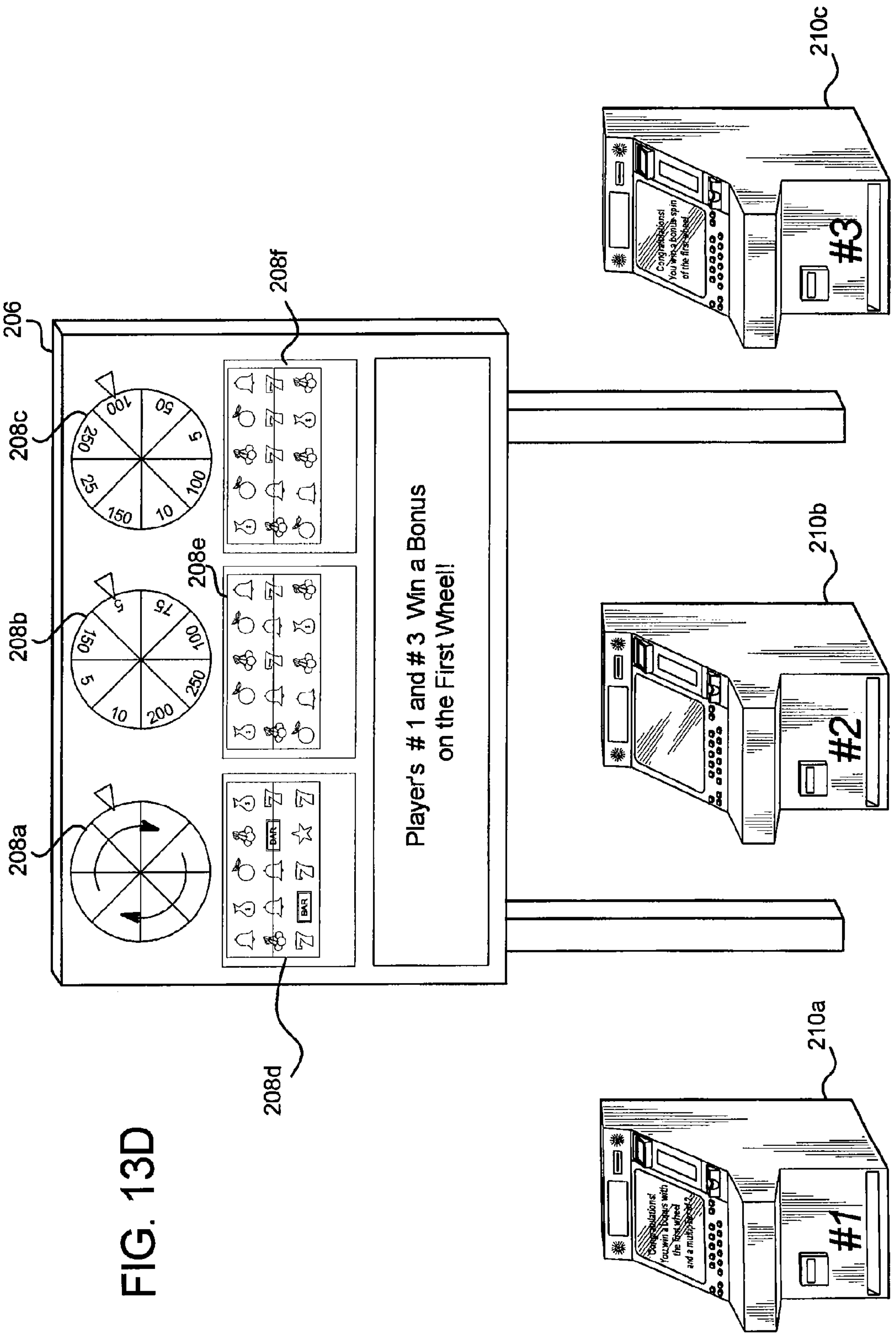
Figure 13E:
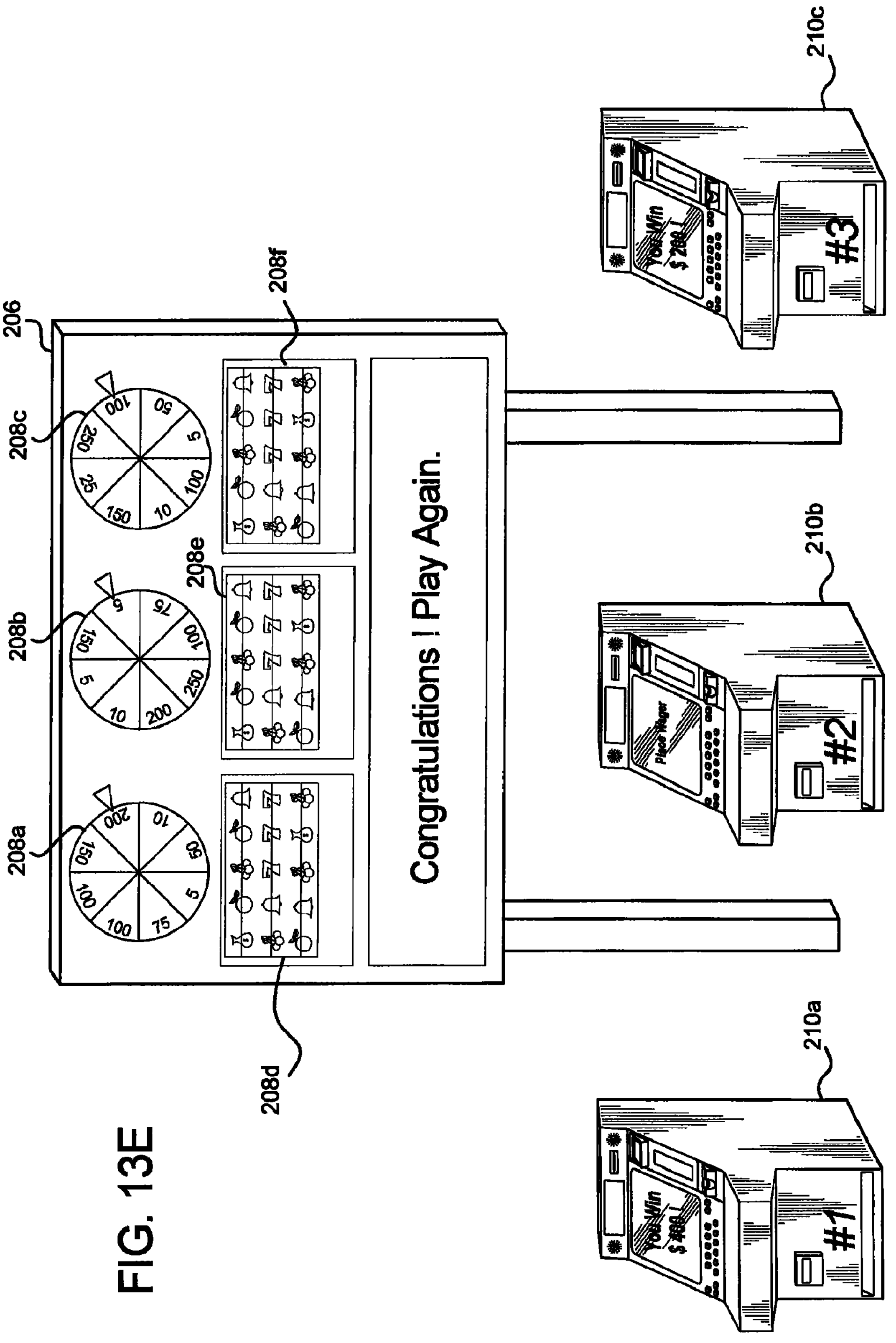

FIG. 13D illustrates the first bonus wheel 208*a* spinning. As illustrated in 13E, the first bonus wheel stopped on the 200 and therefore the player of the third player station receives an award of 200 credits. The player of the first gaming machine receives and award of 400 (200×2).

It should be appreciated that the bonus symbol generators may be allocated to the players in any manner. In one embodiment, the symbol generators are each associated with one of the display segments. For example, the first symbol generator 208*a* is associated with the first slot segment 208*d* and the second symbol generator 208*b* is associated with the second slot segment 208*e*. Therefore, when a player wins a bonus round on a display segment, the associated symbol generator determines the bonus award. In one such embodiment, the players who wagered on the game or payline resulting in a bonus receive the same bonus game outcome from the same spin of the same symbol generator. For example, if the second display segment generates a bonus round, one spin of the second bonus symbol generator determines the game outcome for each of the players but the players may receive different awards based on any suitable factor (e.g., amount wagered, multipliers, or player tracking characteristic). In another embodiment, each player with the same occurrence of the bonus triggering event receives an individual generation of the same symbol generator. In another embodiment, the player station enables a player who receives a bonus round to make an input to determine the symbol generator. In another embodiment, the symbol generator that provides the bonus is randomly determined.

It should be appreciated that any of the embodiments may include any type of suitable symbol generator for a primary or base game including but not limited to wheels, reels, dice, or spheres. There may be any suitable number of symbol generators located on or associated with the central display. In one embodiment, the central display only includes one bonus symbol generator. In another embodiment, the central display does not include a bonus symbol generator but is associated with a symbol generator located next to the central display. In another embodiment, a plurality of different types of bonus symbol generators are displayed on, part of or associated with the central display.

It should be appreciated that the games of the display segments may or may not have bonus rounds. If the games of the display segments do have bonus rounds, the bonus rounds may be implemented in a variety of ways. In one bonus round embodiment, the bonus round is played on the same display segment that triggered the bonus round. In one such interactive bonus game embodiment, one or more of the players may control play of the bonus game in any suitable manner. The bonus round may be a group bonus round for each of the players participating in the triggering play of the display segment. In another embodiment, the display segments may include dedicated bonus display segments. In one such embodiment, each of the primary games of the display segments begins at a certain time and therefore the transfer of the bonus game to a dedicated bonus display segments keeps the primary games on schedule. In another embodiment, the bonus round is displayed on the player's player stations only. Thus, the display segments continue being available for wagers and multi-player game play.

It should be appreciated that the bonus outcomes and awards and the may be determined by the central controller and/or the player stations. In one embodiment, each player station includes an RNG to individually generate a bonus round outcome. In another embodiment, the central controller determines the outcome of the bonus game and the player station determines the actual award given to the player. In another embodiment, the central controller determines both the outcome of the bonus game and the actual award given to the player.

FIGS. 14A, 14B, 14C, 14D, 14E and 14F illustrate one embodiment of a gaming system 212 including a central display 214 which includes a plurality of display segments 216*a*, 216*b*, 216*c*, 216*d*, 216*e*, 216*f*, 216*g*, 216*h* and 216*i*. In this embodiment, each of the games are slot games. In one such embodiment, the most popular slot games of the casino are displayed on the central display or gaming wall. In another such embodiment, the most popular slot games are displayed on a plurality of display segments and a new game is introduced on at least one of the display segments. The gaming system 212 includes a plurality of player stations 220*a*, 220*b* and 220*c* situated around a table 218. However, if should be appreciated that the gaming system may include any suitable type and number of player stations.

As illustrated in FIG. 14A, in this embodiment, the gaming system activates each of the games after a certain predetermined period of time. In this embodiment, after the games each generate and display a game outcome there is a ten second betting period or participation period in-between the games to enable players to make wagers. Therefore, if the slot games each take eight seconds to generate a game outcome from start to finish, every eighteen seconds all of the games simultaneously begin.

As illustrated in FIG. 14B, the player at the first player station 220*a* selects two of the games to play and a player at the third player station 220*c* selects two of the games to play.

FIG. 14C illustrates one embodiment of how the gaming system enables the players to place wagers. As illustrated in FIG. 14C the first and the third player stations enable the players to select denominations to wager in include $0.25, $0.50, $1.00 and $2.00. As illustrated in FIG. 14C, the first player at the first player station selects the wager denomination of $0.50 and the player at the third player station selects the wager of $2.00. Each of the player stations includes a max wager button which enables the players to wager the maximum amount on each of the slot games based on the denominations they choose. The player stations also display an "other wager" selection which in one embodiment would enable the players to wager different amounts other than those displayed. In one embodiment, the player stations enable the players to submit individual wagers for the each payline of each game.

As illustrated in FIG. 14D, the ten second participation period is over and all of the reels of the display segments are spinning. As illustrated in FIG. 14E, in the illustrated embodiment, each of the slot games display a game outcome simultaneously. As illustrated in FIG. 14E, the gaming system begins the ten second betting period after the game outcomes are displayed. The gaming system informs the players that there are ten seconds until the games begin again.

FIG. 14F illustrates an enlarged view of the player stations displaying the individual game results to each player. As illustrated in FIG. 14F, the first player won 40 $0.50 credits for the game #9 and the third player won 40 $2.00 credits for game #9.

It should be appreciated that the gaming system may display the games on the display segments in any suitable manner. In one embodiment, each of the games begins and ends at the same time. In another embodiment, each of the games begins at the same time and then each of the games ends at a staggered time. For example, all of the games begin simultaneously and the first display segment first displays a result, then a second display segment displays a result and then the third display segment displays a result. The gaming system then waits for each display segment to display a result and then starts all of the games in unison over again. In one embodiment, if a player plays a bonus on one of the display segments, the other display segments continue to start new primary games. In another embodiment, if a player plays a bonus on one of the display segments, the other display segments do not enable further play until the bonus game finishes. In another embodiment, each of the games plays at a standard rate based on the game. For example, each slot game begins every five seconds and each poker game begins every seven seconds. In another embodiment, each of the games is staggered in time such that a game is always available to wager on and play. In one embodiment, certain groups of games are played simultaneously. For example the first row of gaming machines is a group. In one such embodiment, the groups are staggered such that new groups are frequently starting new games. For example, the first three games begin every six seconds and the second group of games runs every eight seconds. The display segments may be grouped based on any suitable factor including but not limited to location, type of game, number of player's playing, or the total amount wagered on the games. In certain embodiments, a betting period is included in-between each game played. In another embodiment, the games run continuously and bets are made for a game during a previous play of that game.

The display segments may display a variety of different types of content such as games or other images, symbols, and indicia such as visual representations or exhibition of the movement of objects such as virtual or video reels and wheels, dynamic lighting, video images, images of people, characters, places, and faces of cards, advertisements, tournament information, casino information, live television, player profiles, live players playing the display segments, or display live action from other parts of the casino.

The games that are displayed by the display segments may change or be determined in any suitable manner. In one embodiment, the gaming system includes player tracking which tracks which games are played the most on the central display. The gaming system then switches games based on play. For example, the least played game or the lowest grossing game is switched to the most played game or the highest grossing game. The least played game may be switched to the most played game based on any suitable factor such as total amount wagered or period of time. The games may be server based and the display segments may quickly switch to a new game in response to instructions from the server. That is, the next game is displayed on a display segment without any down time and there are not any dead screens while downloading. In one embodiment, a player can determine the game to change out and make an input to change one or more of the displayed games. In another embodiment, the gaming system includes a queuing system to change out one or more of the games upon an event. In one embodiment, there are more games downloaded than display segments. For example, there are twelve display segments and the gaming system includes fifteen games. Therefore, the gaming system may quickly switch games without any down time. In one embodiment, the games are switched according to a time of day. In another embodiment, one or more players are enabled to select a game to play. For example, if a player continuously plays the display segments for an hour or wagers the most on the display segments for an hour, the gaming system enables that player to select a game to play on a certain display segment for a certain period of time. In another embodiment, a player who wagers the most for a certain time period or on a single game may select which game to play on one or more of the display segments. In one embodiment, big wins are highlighted by the display segments. That is, one or more display segments highlight a big win to the other players and spectators of the central display. In one such embodiment, display segments that are displaying a game play pause the game play to display a big win. In another embodiment, the gaming system enables players to access the internet while one or more games are being scored. It should be appreciated that the gaming system may enable a player to select a game based on any suitable factor or criteria.

Additionally, in different embodiments, the player may interact with the central display. In one embodiment, the central display includes one or more touch screens and one or more players are enabled to play the display segments directly. In one embodiment, a gaming establishment representative makes an input for a player. Direct or indirect interaction with the central display may be the result of an award, such as a bonus win, a type of game, or any other suitable factor.

In one embodiment, the gaming system includes one or more progressive games. It should be appreciated that the progressive games may be any suitable type of progressive game. In one embodiment, the gaming system includes a progressive meter displayed by the central display. In one embodiment, the progressive is a symbol drive progressive where a player who generates a designated symbol combination or game outcome, wins the progressive award. In one embodiment, the progressive is a mystery progressive. That is, the player wins the progressive award but the requirements for winning the progressive award are not known to the player. For example, the gaming system determines a progressive amount from a range of progressive amounts. When a player places a wager that places the progressive award at the predetermined amount, the player wins the progressive award.

It should be appreciated that any suitable style of wagering or combination of styles of wagering may be implemented in the various embodiments of the gaming system disclosed herein. In one embodiment, the wager for each game is predetermined, such as $1 a game. In another embodiment, the gaming system requires different wagers for different games. For example, the gaming system could require $0.50 wager for slots and a $1.00 wager for video poker. In one embodiment, the gaming system enables the player to determine a wager amount from a plurality of predetermined choices. In another embodiment, the gaming system enables the player to determine a denomination amount. In one embodiment, the denomination amounts may be different for one or more games. In another embodiment, the gaming system enables a player to wager different denominations on different games played at the same time. In one embodiment, the gaming system enables the players to wager in a roulette style of wagering. In one such embodiment, the gaming system enables the player to choose a wager denominations, such as: $0.25, $1, $5, $10, and $25. In one embodiment, the gaming system enables the players to make as many different bets and types of bets as the player wants. In one embodiment, the player is only enable to wager one amount per whole display segment. In another embodiment, the player is enabled to place partial bets, such as $25 on display segment one and display segment two and wins if either or both of the display segment one or display segment two generate winning outcomes In one embodiment, the gaming system enables the player to wager on a group of games. That is, the player can make one input to wager on multiple games. For example, the player can wager on all of the games in column one with a single input. In another example, the player can press a button to wager on every game displayed on the central display.

In one embodiment, the gaming system enables the player to input wager denomination preferences prior to the game play, such as on the internet or at a kiosk into a player tracking system or other suitable system. The display segments may display a generic credit win that functions for each individual differently based on their chosen credit denominations. In one embodiment, the display segments do not display any credits won by the players but the player stations display the credits won. In another embodiment, the display segments display only winners' awards. In another embodiment, each game has a predetermined denomination and the player's must play the predetermined denomination for the game.

In one embodiment, the gaming system enables known gaming and betting techniques such as "back betting" in which one or more individuals bet behind a single actual bettor. In one embodiment, the gaming system also facilitates proxy betting in which a single bettor has the power to place wagers on behalf of others.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a display device including a plurality of display segments, each display segment configured to display one of a plurality of different games;

a plurality of player stations, each player station including at least one input device and at least one player station display device;

at least one processor; and at least one memory device storing a plurality of instructions, which when executed by the at least one processor, cause the at least one processor to operate with the display device and the player stations to:

(a) during a participation period, for each of a plurality of players at one of the player stations, for each of the different games displayed by the display segments, enable the player using the at least one input device of that player station to make at least one input to individually wager on a play of said different game;

(b) after termination of the participation period, for each of the displayed different games:

(i) randomly determine a game outcome; and (ii) independently determine if said randomly determined game outcome is a winning game outcome or a losing game outcome, wherein each of the determined game outcomes can be the winning game outcome or the losing game outcome;

(c) simultaneously display said plays of the displayed different games including displaying the randomly determined game outcomes on the display segments of the display device; and (d) for each wagered on play of the displayed different games, cause the player station where any wager was placed on said play of said game to:

(A) display said randomly determined game outcome associated with said wagered on play of said game; and (B) display any awards based on said displayed game outcome and an amount the player wagered on said game.

2. The gaming system of claim 1, wherein the display device is a single device.

3. The gaming system of claim 1, wherein at least one of the games is an interactive game.

4. The gaming system of claim 3, wherein the at least one memory device stores the plurality of instructions, which when executed by the at least one processor, cause the at least one processor to operate with the display device and the player stations to enable a single player to control the interactive game.

5. The gaming system of claim 3, wherein the at least one memory device stores the plurality of instructions, which when executed by the at least one processor, cause the at least one processor to operate with the display device and the player stations to enable multiple players to control the interactive game.

6. The gaming system of claim 1, wherein the at least one input device of each of the player stations enables the player at said player station to select which of the plurality of plays of the games to play and the amount to wager per play.

7. The gaming system of claim 1, wherein the at least one memory device stores the plurality of instructions, which when executed by the at least one processor, cause the at least one processor to operate with the display device and the player stations to display an indication of at least of one player who received one of the winning outcomes.

8. The gaming system of claim 1, wherein the different games include a plurality of different types of games.

9. The gaming system of claim 1, wherein the at least one memory device stores the plurality of instructions, which when executed by the at least one processor, cause the at least one processor to operate with the display device and the player stations to provide a next participation period to enable a plurality of players to each individually wager using the at least one input device of the player station on the plays of the different games displayed by the display segments, wherein said next participation period begins before any awards are displayed at the player stations for the plays of the wagered on games.

10. The gaming system of claim 1, wherein upon termination of the participation period, the plurality of instructions cause the at least one processor to operate with the display device to simultaneously cause a display of plays of all of the games displayed on the display segments of the display device.

11. A gaming system comprising:

a display device including a plurality of display segments, each display segment configured to display one of a plurality of different games;

a plurality of player stations, each player station including at least one input device and at least one player station display device;

at least one processor; and at least one memory device storing a plurality of instructions, which when executed by the at least one processor, cause the at least one processor to operate with the display device and the player stations to:

(a) for each of a plurality of players, for each of the plurality of different games displayed by the display segments, enable the player to individually wager using the at least one input device of the player station on a play of said different game;

(b) upon initiation of a wager on a play of one of said displayed games, begin a participation period for said play of said wagered on game;

(c) enable other players to place wagers for said play of said wagered on game using the at least one input devices of the player stations during the participation period;

(d) after termination of the participation period, randomly determine a game outcome for said play of said wagered on game;

(e) display said determined game outcome on one of the display segments of the display device;

(f) determine if said displayed game outcome is a winning game outcome, wherein said displayed game outcome can be the winning game outcome or a losing game outcome, wherein the determination of whether said displayed game outcome is the winning outcome is independent from determinations of whether any other game outcomes of plays of other games displayed by the display segments are winning game outcomes; and (e) for each player who wagered on said play of said game, cause the player station where the wager was placed to:

(i) display the determined game outcome associated with said wagered on play of said game; and (ii) provide the player any award based on an amount the player wagered on said play of said wagered on game and said displayed game outcome.

12. The gaming system of claim 11, wherein the display device is a single device.

13. The gaming system of claim 11, wherein each of the games are simultaneously displayable by the display segments.

14. The gaming system of claim 11, wherein at least one of the games is an interactive game.

15. The gaming system of claim 14, wherein the at least one memory device stores the plurality of instructions, which when executed by the at least one processor, cause the at least one processor to operate with the display device and the player stations to enable a single player to control the interactive game.

16. The gaming system of claim 14, wherein the at least one memory device stores the plurality of instructions, which when executed by the at least one processor, cause the at least one processor to operate with the display device and the player stations to enable multiple players to control the interactive game.

17. The gaming system of claim 11, wherein the at least one input device of each of the player stations enables the player to select each of the different games to play and the amount to wager per play of each selected game.

18. The gaming system of claim 11, wherein the at least one memory device stores the plurality of instructions, which when executed by the at least one processor, cause the at least one processor to operate with the display device and the player stations to display at least one winner of at least one of the plays of the games on the display device.

19. The gaming system of claim 11, wherein the different games include a plurality of different types of games.

20. The gaming system of claim 11, wherein upon termination of the participation period, the plurality of instructions cause the at least one processor to operate with the display device to simultaneously cause a display of plays of all of the games displayed on the display segments of the display device.

21. A gaming system comprising:

a display device including a plurality of display segments, each display segment configured to separately display one of a plurality of different games;

a first player station and a second player station, each player station including at least one input device and at least one player station display device;

at least one processor; and at least one memory device storing a plurality of instructions, which when executed by the at least one processor, cause the at least one processor to operate with the display device and the first player station and the second player station to:

(a) during a participation period, enable a first player at the first player station to use the input device at the first player station to place a wager on a first payline and a second payline of a designated one of the displayed different games, and to wager on each of the other displayed different games;

(b) during the participation period, enable a second player at the second player station to use the input device at the second player station to place a wager on the first payline and the second payline of said designated game, and to wager on each of the other displayed different games;

(c) upon termination of the participation period, display (i) a play of said wagered on designated game on one of the display segments of the display device including displaying a randomly determined game outcome of said wagered on designated game;

(ii) for each of the other displayed different games, display a play of said game on one of the other display segments of the display device including a randomly determined game outcome of said game;

(d) independently determine if the said displayed game outcome for the designated game is a winning game result or a losing game result for each of the first player and the second player, wherein the first player and the second player may each have the winning game result or the losing game result based on whether the first player and the second player wagered on the same or different paylines of said designated game;

(e) if said first player's game result is the winning game result, cause the first player station to provide the first player an award based on said displayed game outcome and the wager placed by the first player on said designated game; and (f) if said second player's game result is the winning game result, cause the second player station to provide the second player an award based on said displayed game outcome and the wager placed by the second player on said designated game.

* * * * *

UNITED STATES PATENT AND TRADEMARK OFFICE

CERTIFICATE OF CORRECTION

PATENT NO. : 8,109,821 B2
APPLICATION NO. : 11/847957
DATED : February 7, 2012
INVENTOR(S) : James K. Kovacs et al.

It is certified that error appears in the above-identified patent and that said Letters Patent is hereby corrected as shown below:

IN THE CLAIMS:

In Claim 1, Column 65, Line 36, delete “different.”

In Claim 3, Column 65, Line 61, before “games” insert --different--.

In Claim 4, Column 65, Lines 62 to 63, delete “the at least one memory device stores.”

In Claim 4, Column 65, Line 63, delete “which.”

In Claim 5, Column 66, Lines 1 to 2, delete “the at least one memory device stores.”

In Claim 5, Column 66, Line 2, delete “which.”

In Claim 6, Column 66, Lines 9 to 10, delete “plurality of plays of the.”

In Claim 6, Column 66, Line 10, before “games” insert --different--.

In Claim 7, Column 66, Lines 11 to 12, delete “the at least one memory device stores.”

In Claim 7, Column 66, Line 12, delete “which.”

In Claim 7, Column 66, Line 16, delete “one of,” after “winning” insert --game--, and replace “outcomes” with --outcome--.

In Claim 9, Column 66, Lines 19 to 20, delete “the at least one memory device stores.”

In Claim 9, Column 66, Line 20, delete “which.”

Signed and Sealed this
Fifth Day of June, 2012

David J. Kappos

David J. Kappos
*Director of the United States Patent and Trademark Office*

IN THE CLAIMS:

In Claim 9, Column 66, Line 24, replace “a” with --the--.

In Claim 10, Column 66, Line 33, between “of” and “plays” insert --the--.

In Claim 11, Column 66, Line 51, between “of” and “the” insert --one of-- and replace “station” with --stations--.

In Claim 11, Column 66, Line 52, delete “different.”

In Claim 11, Column 66, Line 54, between “displayed” and “games” insert --different--.

In Claim 11, Column 67, Line 1, between “winning” and “outcome” insert --game--.

In Claim 11, Column 67, Line 3, between “of” and “other” insert --the-- and between “other” and “games” insert --different--.

In Claim 11, Column 67, Line 5, replace “(e)” with --(g)-- and between “said” and “game” insert --wagered on--.

In Claim 11, Column 67, Line 8, move “wagered on” from between “said” and “play” to between “said” and “game.”

In Claim 13, Column 67, Line 15, delete “each of.”

In Claim 13, Column 67, Line 16, before “games” insert --different--.

In Claim 14, Column 67, Line 19, between “the” and “games” insert --different--.

In Claim 15, Column 67, Lines 20 to 21, delete “the at least one memory device stores.”

In Claim 15, Column 67, Line 21 delete “which.”

In Claim 16, Column 67, Lines 26 to 27, delete “the at least one memory device stores.”

In Claim 16, Column 67, Line 27, delete “which.”

In Claim 18, Column 67, Lines 37 to 38, delete “the at least one memory device stores.”

In Claim 18, Column 67, Line 38, delete “which.”

In Claim 18, Column 67, Line 42, between “the” and “games” insert --different-- and between “games” and “on” insert --displayed--.

IN THE CLAIMS:

In Claim 20, Column 67, Line 49, before “games” insert --different--.

In Claim 21, Column 68, Line 28, after “game;” insert --and--.